United States Patent
Lepp et al.

(10) Patent No.: US 8,936,199 B2
(45) Date of Patent: Jan. 20, 2015

(54) UICC APPARATUS AND RELATED METHODS

(75) Inventors: James Randolph Winter Lepp, Ottawa (CA); Jean-Philippe Paul Cormier, Ottawa (CA); Sheldon Terry Schwandt, Wellesley (CA); Oleg Los, Buffalo Grove, IL (US); Petra Braun, Dormagan (DE)

(73) Assignee: BlackBerry Limited, Waterloo, Ontario (CA)

( * ) Notice: Subject to any disclaimer, the term of this patent is extended or adjusted under 35 U.S.C. 154(b) by 243 days.

(21) Appl. No.: 13/453,551

(22) Filed: Apr. 23, 2012

(65) Prior Publication Data

US 2013/0270349 A1    Oct. 17, 2013

Related U.S. Application Data

(60) Provisional application No. 61/624,219, filed on Apr. 13, 2012.

(51) Int. Cl.
*G06K 19/06* (2006.01)
(52) U.S. Cl.
USPC .......................................... 235/492; 235/487
(58) Field of Classification Search
USPC .................. 235/487, 492, 375, 380
See application file for complete search history.

(56) References Cited

U.S. PATENT DOCUMENTS

| | | |
|---|---|---|
| 3,373,481 A | 3/1968 | Lins et al. |
| 3,676,742 A | 7/1972 | Russell et al. |
| 3,825,353 A | 7/1974 | Loro |
| 3,842,189 A | 10/1974 | Southgate |
| D261,760 S | 11/1981 | Dlugos |
| 4,450,024 A | 5/1984 | Haghiri-Tehrani et al. |
| 4,532,419 A | 7/1985 | Takeda |
| 4,535,219 A | 8/1985 | Sliwa, Jr. |
| 4,549,247 A | 10/1985 | Hoppe et al. |
| 4,591,945 A | 5/1986 | Ugon |
| 4,603,249 A | 7/1986 | Hoppe et al. |
| 4,617,605 A | 10/1986 | Obrecht et al. |
| 4,621,190 A | 11/1986 | Saito et al. |
| 4,625,102 A | 11/1986 | Rebjock et al. |

(Continued)

FOREIGN PATENT DOCUMENTS

| | | |
|---|---|---|
| EP | 2595086 | 5/2013 |
| EP | 2624167 | 8/2013 |
| FR | 2989199 | 10/2013 |

OTHER PUBLICATIONS

NOKIA, "Nokia 4FF Proposal and Rationale," based on the discussion and feedback from leading suppliers and manufacturers of SIM card connectors, Aug. 25, 2011, 5 pages.

(Continued)

*Primary Examiner* — Karl D Frech
(74) *Attorney, Agent, or Firm* — Hanley, Flight & Zimmerman, LLC

(57) ABSTRACT

UICC apparatus and related methods are disclosed herein. An example UICC apparatus disclosed herein includes a contact pad having a plurality of electrical contacts positioned or oriented to define a plurality of electrical contact patterns. The plurality of electrical contact patterns defining at least a first electrical contact pattern to communicate with a first input device and a second electrical contact pattern to communicate with a second input device, where the first input device has a dimensional profile that is different than a dimensional profile of the second input device.

38 Claims, 23 Drawing Sheets

(56) References Cited

U.S. PATENT DOCUMENTS

| | | | |
|---|---|---|---|
| 4,639,585 | A | 1/1987 | Haghiri-Tehrani et al. |
| 4,674,175 | A | 6/1987 | Stampfli |
| 4,755,661 | A | 7/1988 | Ruebsam |
| 4,764,803 | A | 8/1988 | Ueda |
| 4,774,633 | A | 9/1988 | Dehaine et al. |
| 4,792,843 | A | 12/1988 | Haghiri-Tehrani et al. |
| 4,803,542 | A | 2/1989 | Haghiri-Tehrani et al. |
| 4,841,134 | A | 6/1989 | Hida et al. |
| 4,860,087 | A | 8/1989 | Matsubara et al. |
| 4,864,383 | A | 9/1989 | Gloton et al. |
| 4,897,534 | A | 1/1990 | Haghiri-Tehrani |
| 4,937,653 | A | 6/1990 | Blonder et al. |
| 4,942,495 | A | 7/1990 | Peres et al. |
| 4,980,802 | A | 12/1990 | Champagne et al. |
| 4,994,659 | A | 2/1991 | Yabe et al. |
| 5,027,190 | A | 6/1991 | Haghiri-Tehrani et al. |
| 5,031,026 | A | 7/1991 | Ueda |
| 5,049,728 | A | 9/1991 | Rovin |
| 5,055,907 | A | 10/1991 | Jacobs |
| 5,055,913 | A | 10/1991 | Haghiri-Tehrani |
| 5,057,460 | A | 10/1991 | Rose |
| 5,067,007 | A | 11/1991 | Otsuka et al. |
| 5,079,673 | A | 1/1992 | Kodai et al. |
| 5,086,216 | A | 2/1992 | Mollet et al. |
| 5,091,618 | A | 2/1992 | Takahashi |
| 5,091,769 | A | 2/1992 | Eichelberger |
| 5,122,860 | A | 6/1992 | Kikuchi et al. |
| 5,126,548 | A | 6/1992 | Sekiguchi |
| D327,883 | S | 7/1992 | Gloton |
| D328,599 | S | 8/1992 | Gloton |
| 5,149,662 | A | 9/1992 | Eichelberger |
| 5,150,193 | A | 9/1992 | Yasuhara et al. |
| D331,922 | S | 12/1992 | Gloton |
| 5,173,055 | A | 12/1992 | Grabbe |
| 5,192,682 | A | 3/1993 | Kodai et al. |
| 5,192,716 | A | 3/1993 | Jacobs |
| D335,663 | S | 5/1993 | Gloton |
| 5,208,450 | A | 5/1993 | Uenishi et al. |
| 5,241,456 | A | 8/1993 | Marcinkiewicz et al. |
| 5,250,843 | A | 10/1993 | Eichelberger |
| 5,255,430 | A | 10/1993 | Tallaksen |
| D342,728 | S | 12/1993 | Gloton |
| 5,272,374 | A | 12/1993 | Kodai et al. |
| 5,280,192 | A | 1/1994 | Kryzaniwsky |
| D344,502 | S | 2/1994 | Gloton |
| 5,289,349 | A | 2/1994 | Nishino |
| 5,296,745 | A | 3/1994 | Shirai et al. |
| 5,304,513 | A | 4/1994 | Haghiri-Tehrani et al. |
| 5,324,687 | A | 6/1994 | Wojnarowski |
| 5,327,834 | A | 7/1994 | Atkeson |
| 5,346,576 | A | 9/1994 | Kobayashi et al. |
| 5,360,941 | A | 11/1994 | Roes |
| D353,135 | S | 12/1994 | Gloton |
| D353,136 | S | 12/1994 | Gloton |
| 5,371,346 | A | 12/1994 | Menoud |
| 5,399,903 | A | 3/1995 | Rostoker et al. |
| D357,242 | S | 4/1995 | Gloton |
| D357,909 | S | 5/1995 | Gloton |
| D358,142 | S | 5/1995 | Gloton |
| 5,434,395 | A | 7/1995 | Storck et al. |
| RE35,119 | E | 12/1995 | Blonder et al. |
| D365,092 | S | 12/1995 | Mundigl et al. |
| 5,486,687 | A | 1/1996 | Le Roux |
| D369,157 | S | 4/1996 | Ohmori et al. |
| 5,506,499 | A | 4/1996 | Puar |
| 5,514,862 | A | 5/1996 | Salzano |
| 5,523,697 | A | 6/1996 | Farnworth et al. |
| 5,531,145 | A | 7/1996 | Haghiri-Tehrani |
| 5,550,402 | A | 8/1996 | Nicklaus |
| 5,550,406 | A | 8/1996 | McCormick |
| 5,554,940 | A | 9/1996 | Hubacher |
| D375,303 | S | 11/1996 | Gaumet |
| 5,581,065 | A | 12/1996 | Mishikawa et al. |
| 5,583,733 | A | 12/1996 | Cronin |
| 5,598,032 | A | 1/1997 | Fidalgo |
| 5,599,203 | A | 2/1997 | Broschard, III |
| 5,612,532 | A | 3/1997 | Iwasaki |
| D379,006 | S | 4/1997 | Gaumet |
| 5,633,780 | A | 5/1997 | Cronin |
| 5,637,858 | A | 6/1997 | Hoppe et al. |
| 5,639,385 | A | 6/1997 | McCormick |
| 5,647,122 | A | 7/1997 | Launay et al. |
| 5,671,525 | A | 9/1997 | Fidalgo |
| D384,971 | S | 10/1997 | Kawan |
| 5,688,716 | A | 11/1997 | DiStefano et al. |
| D387,746 | S | 12/1997 | Ishihara |
| D387,747 | S | 12/1997 | Ishihara |
| D388,066 | S | 12/1997 | Ishihara |
| D389,130 | S | 1/1998 | Ishihara |
| 5,710,421 | A | 1/1998 | Kokubu |
| D393,458 | S | 4/1998 | Merlin et al. |
| 5,757,116 | A | 5/1998 | Nishikawa et al. |
| 5,776,796 | A | 7/1998 | DiStefano et al. |
| 5,796,570 | A | 8/1998 | Mekdhanasarn et al. |
| 5,808,758 | A | 9/1998 | Solmsdorf |
| 5,815,426 | A | 9/1998 | Jigour et al. |
| 5,822,190 | A | 10/1998 | Iwasaki |
| 5,834,340 | A | 11/1998 | Sawai et al. |
| 5,834,755 | A | 11/1998 | Hagiri-Tehrani et al. |
| 5,850,690 | A | 12/1998 | Launay et al. |
| 5,864,463 | A | 1/1999 | Tsukada et al. |
| D405,779 | S | 2/1999 | Huber et al. |
| D406,822 | S | 3/1999 | Huber et al. |
| 5,888,624 | A | 3/1999 | Haghiri et al. |
| 5,891,745 | A | 4/1999 | Dunaway et al. |
| 5,898,223 | A | 4/1999 | Frye et al. |
| D412,164 | S | 7/1999 | Laviron et al. |
| 5,925,445 | A | 7/1999 | Suzuki |
| 5,932,866 | A | 8/1999 | Terada et al. |
| 5,965,866 | A | 10/1999 | Mederski |
| 5,969,951 | A | 10/1999 | Fischer et al. |
| D416,246 | S | 11/1999 | Hileman |
| 5,975,420 | A | 11/1999 | Gogami et al. |
| 5,995,006 | A | 11/1999 | Walsh |
| 6,006,987 | A | 12/1999 | Hoolhorst |
| 6,025,997 | A | 2/2000 | Huber et al. |
| 6,027,028 | A | 2/2000 | Pieterse et al. |
| 6,036,099 | A | 3/2000 | Leighton |
| 6,046,071 | A | 4/2000 | Sawai et al. |
| 6,054,774 | A | 4/2000 | Ohmori et al. |
| D424,043 | S | 5/2000 | Shiroki |
| D424,539 | S | 5/2000 | Shiroki |
| D425,519 | S | 5/2000 | Merlin et al. |
| 6,065,681 | A | 5/2000 | Trueggelmann |
| 6,072,698 | A | 6/2000 | Houdeau et al. |
| 6,076,737 | A | 6/2000 | Gogami et al. |
| 6,081,182 | A | 6/2000 | Tomozawa et al. |
| D427,577 | S | 7/2000 | Haas et al. |
| 6,095,423 | A | 8/2000 | Houdeau et al. |
| 6,109,530 | A | 8/2000 | Larson et al. |
| 6,112,997 | A | 9/2000 | Jelinek et al. |
| 6,141,210 | A | 10/2000 | Iwasaki |
| 6,142,381 | A | 11/2000 | Finn et al. |
| 6,145,035 | A | 11/2000 | Mai et al. |
| 6,147,860 | A | 11/2000 | Iwasaki |
| 6,161,761 | A | 12/2000 | Ghaem et al. |
| 6,175,287 | B1 | 1/2001 | Lampen et al. |
| 6,184,477 | B1 | 2/2001 | Tanahashi |
| 6,191,951 | B1 | 2/2001 | Houdeau et al. |
| 6,193,163 | B1 | 2/2001 | Fehrman et al. |
| 6,197,688 | B1 | 3/2001 | Simpson |
| 6,202,931 | B1 | 3/2001 | Billebaud |
| 6,223,989 | B1 | 5/2001 | Permingeat |
| D443,298 | S | 6/2001 | Webb et al. |
| 6,265,765 | B1 | 7/2001 | DiStefano et al. |
| 6,276,609 | B1 | 8/2001 | Czar et al. |
| 6,288,904 | B1 | 9/2001 | Houdeau et al. |
| 6,293,470 | B1 | 9/2001 | Asplund |
| D450,854 | S | 11/2001 | Lipman et al. |
| 6,313,524 | B1 | 11/2001 | Peuschner et al. |
| 6,320,751 | B2 | 11/2001 | Takeda et al. |
| D452,243 | S | 12/2001 | Wallace |
| 6,326,683 | B1 | 12/2001 | Houdeau et al. |
| 6,329,962 | B2 | 12/2001 | Ying |

(56) References Cited

U.S. PATENT DOCUMENTS

| | | |
|---|---|---|
| D452,864 S | 1/2002 | Wallace et al. |
| D452,865 S | 1/2002 | Wallace et al. |
| 6,343,364 B1 | 1/2002 | Leydier et al. |
| D453,934 S | 2/2002 | Wallace et al. |
| 6,351,405 B1 | 2/2002 | Lee et al. |
| D456,414 S | 4/2002 | Turin |
| 6,369,407 B1 | 4/2002 | Hikita et al. |
| 6,370,029 B1 | 4/2002 | Kawan |
| 6,378,774 B1 | 4/2002 | Emori et al. |
| 6,398,114 B1 | 6/2002 | Nishikawa et al. |
| 6,402,032 B1 | 6/2002 | Huang et al. |
| 6,410,355 B1 | 6/2002 | Wallace |
| 6,429,112 B1 | 8/2002 | Smith et al. |
| 6,433,285 B2 | 8/2002 | Maeda et al. |
| 6,439,464 B1 | 8/2002 | Fruhauf et al. |
| 6,448,638 B1 | 9/2002 | Fidalgo et al. |
| 6,454,164 B1 | 9/2002 | Wakabayashi et al. |
| 6,460,773 B1 | 10/2002 | Kaiya et al. |
| 6,462,273 B1 | 10/2002 | Corisis et al. |
| 6,483,038 B2 | 11/2002 | Lee et al. |
| 6,490,667 B1 | 12/2002 | Ikeda |
| 6,496,381 B1 | 12/2002 | Groeger |
| 6,514,367 B1 | 2/2003 | Leighton |
| 6,542,444 B1 | 4/2003 | Rutsche |
| 6,543,690 B2 | 4/2003 | Leydier et al. |
| 6,568,600 B1 | 5/2003 | Carpier et al. |
| 6,572,015 B1 | 6/2003 | Norton |
| 6,581,122 B1 | 6/2003 | Sarat |
| 6,581,830 B1 | 6/2003 | Jelinek et al. |
| 6,581,840 B2 | 6/2003 | Takeda et al. |
| 6,585,165 B1 | 7/2003 | Kuroda et al. |
| 6,592,042 B1 | 7/2003 | El Yamani et al. |
| 6,601,770 B1 | 8/2003 | Ikefuji et al. |
| 6,612,498 B1 | 9/2003 | Lipponen et al. |
| 6,618,258 B2 | 9/2003 | Goris |
| 6,628,240 B2 | 9/2003 | Amadeo |
| 6,632,997 B2 | 10/2003 | Hoffman et al. |
| 6,634,561 B1 | 10/2003 | Wallace |
| 6,634,565 B2 | 10/2003 | Gray |
| 6,641,049 B2 | 11/2003 | Luu |
| 6,642,611 B2 | 11/2003 | Iwasaki |
| 6,646,885 B1 | 11/2003 | Yu et al. |
| 6,659,355 B1 | 12/2003 | Fischer et al. |
| 6,659,356 B2 | 12/2003 | Kashima |
| 6,669,487 B1 | 12/2003 | Nishizawa et al. |
| 6,694,399 B1 | 2/2004 | Leydier et al. |
| D487,747 S | 3/2004 | Yu et al. |
| 6,712,279 B2 | 3/2004 | Muehlberger et al. |
| D488,818 S | 4/2004 | Lee et al. |
| 6,717,801 B1 | 4/2004 | Castell et al. |
| 6,720,927 B2 | 4/2004 | Bakker et al. |
| D492,688 S | 7/2004 | Wallace et al. |
| D493,798 S | 8/2004 | Yu et al. |
| 6,776,347 B2 | 8/2004 | Nishikawa et al. |
| 6,778,407 B2 | 8/2004 | Fischer et al. |
| 6,793,144 B2 | 9/2004 | Guez et al. |
| 6,797,543 B2 | 9/2004 | Kasahara et al. |
| 6,803,114 B1 | 10/2004 | Vere et al. |
| 6,803,666 B2 | 10/2004 | Takahashi et al. |
| 6,811,082 B2 | 11/2004 | Wong |
| 6,817,533 B2 | 11/2004 | Chen |
| 6,817,534 B2 | 11/2004 | Gray |
| D501,560 S | 2/2005 | Whyte et al. |
| 6,851,606 B2 | 2/2005 | Maenpaa et al. |
| 6,851,618 B2 | 2/2005 | Halope |
| 6,856,235 B2 | 2/2005 | Fjelstad |
| 6,865,086 B2 | 3/2005 | Gochnour et al. |
| 6,870,733 B2 | 3/2005 | Castell et al. |
| 6,896,189 B2 | 5/2005 | Guion et al. |
| 6,910,635 B1 | 6/2005 | Miks et al. |
| 6,922,780 B1 | 7/2005 | Siegel |
| 6,964,377 B1 | 11/2005 | Haghiri et al. |
| 6,970,359 B2 | 11/2005 | Gochnour et al. |
| D512,512 S | 12/2005 | Bell et al. |
| 6,978,940 B2 | 12/2005 | Luu |
| 6,991,172 B2 | 1/2006 | Luu |
| D516,076 S | 2/2006 | Ko |
| 6,994,263 B2 | 2/2006 | Ueda et al. |
| D517,559 S | 3/2006 | Yu et al. |
| 7,019,981 B2 | 3/2006 | Heinemann et al. |
| 7,028,910 B2 | 4/2006 | Reignoux et al. |
| 7,030,316 B2 | 4/2006 | Centofante |
| 7,051,429 B2 | 5/2006 | Kerr et al. |
| D523,435 S | 6/2006 | Takiar et al. |
| 7,059,534 B2 | 6/2006 | Takahashi |
| 7,063,538 B2 | 6/2006 | Chen |
| 7,064,423 B2 | 6/2006 | Okita et al. |
| D525,248 S | 7/2006 | Takiar |
| D525,623 S | 7/2006 | Takiar et al. |
| D525,978 S | 8/2006 | Takiar et al. |
| 7,083,107 B2 | 8/2006 | Sakamoto |
| 7,086,601 B2 | 8/2006 | Dhers et al. |
| 7,088,006 B2 | 8/2006 | Janke et al. |
| 7,094,106 B2 | 8/2006 | Yamamoto et al. |
| 7,094,633 B2 | 8/2006 | Takiar |
| D529,031 S | 9/2006 | Huang et al. |
| 7,102,891 B1 | 9/2006 | Miks et al. |
| 7,121,473 B2 | 10/2006 | Boker |
| 7,135,782 B2 | 11/2006 | Nishikawa |
| 7,137,563 B2 | 11/2006 | Shibamoto et al. |
| D533,556 S | 12/2006 | Yamada et al. |
| 7,152,801 B2 | 12/2006 | Cuellar et al. |
| D534,537 S | 1/2007 | Smith et al. |
| 7,156,313 B2 | 1/2007 | Ou et al. |
| 7,166,914 B2 | 1/2007 | DiStefano et al. |
| D537,081 S | 2/2007 | Takiar et al. |
| 7,176,060 B2 | 2/2007 | Yamada et al. |
| 7,179,129 B1 | 2/2007 | Hwang |
| 7,180,176 B2 | 2/2007 | Endou et al. |
| 7,183,636 B1 | 2/2007 | Boccia et al. |
| D538,286 S | 3/2007 | Takiar et al. |
| 7,193,161 B1 | 3/2007 | Takiar et al. |
| 7,226,318 B1 | 6/2007 | Lee |
| 7,233,499 B2 | 6/2007 | Yu et al. |
| 7,234,644 B2 | 6/2007 | Nishizawa et al. |
| 7,239,973 B2 | 7/2007 | Schahl et al. |
| 7,242,079 B2 | 7/2007 | Nerot et al. |
| 7,252,242 B2 | 8/2007 | Ho |
| D552,098 S | 10/2007 | Nishizawa et al. |
| D552,099 S | 10/2007 | Nishizawa et al. |
| 7,291,903 B2 | 11/2007 | Nishizawa et al. |
| 7,296,754 B2 | 11/2007 | Nishizawa et al. |
| D556,764 S | 12/2007 | Nishizawa et al. |
| 7,303,137 B2 | 12/2007 | Ho |
| 7,336,498 B2 | 2/2008 | Takiar et al. |
| D566,723 S | 4/2008 | Okaro et al. |
| 7,352,588 B2 | 4/2008 | Nishizawa et al. |
| 7,359,204 B1 | 4/2008 | Jang et al. |
| 7,364,090 B2 * | 4/2008 | Cuellar et al. ............... 235/492 |
| 7,364,092 B2 | 4/2008 | Narendra et al. |
| 7,367,503 B2 | 5/2008 | Harai et al. |
| 7,369,982 B2 | 5/2008 | Leaming |
| 7,374,721 B2 | 5/2008 | Hunag et al. |
| D570,800 S | 6/2008 | Chen et al. |
| D571,810 S | 6/2008 | Ikeda |
| 7,388,455 B2 | 6/2008 | Larson, III et al. |
| D573,154 S | 7/2008 | Viegers et al. |
| D574,384 S | 8/2008 | Knoch |
| D574,835 S | 8/2008 | Ho |
| 7,418,272 B2 | 8/2008 | Son |
| 7,425,464 B2 | 9/2008 | Fay et al. |
| 7,427,819 B2 | 9/2008 | Hoen et al. |
| 7,433,196 B1 | 10/2008 | Wang et al. |
| D581,932 S | 12/2008 | Nishizawa et al. |
| 7,458,519 B2 | 12/2008 | Aoki et al. |
| 7,475,818 B2 | 1/2009 | Gallagher et al. |
| 7,485,562 B2 | 2/2009 | Chua et al. |
| 7,486,520 B2 | 2/2009 | Tang et al. |
| 7,494,058 B2 | 2/2009 | Bonalle et al. |
| D588,080 S | 3/2009 | Harnden et al. |
| D589,471 S | 3/2009 | Komatsu |
| 7,511,365 B2 | 3/2009 | Wu et al. |
| 7,552,876 B2 | 6/2009 | Nishizawa et al. |
| 7,557,436 B2 | 7/2009 | Mizuno et al. |

(56) References Cited

U.S. PATENT DOCUMENTS

| | | |
|---|---|---|
| 7,559,469 B2 | 7/2009 | Noda et al. |
| 7,560,806 B2 | 7/2009 | Aoki |
| 7,566,001 B2 | 7/2009 | Yamazaki |
| D598,126 S | 8/2009 | Alvarez-Icaza et al. |
| D599,308 S | 9/2009 | Blumberg et al. |
| D601,168 S | 9/2009 | Barcheck |
| 7,587,756 B2 | 9/2009 | Peart et al. |
| D601,521 S | 10/2009 | Komatsu |
| 7,597,266 B2 | 10/2009 | Benato |
| 7,605,453 B2 | 10/2009 | Stampka et al. |
| 7,606,042 B2 | 10/2009 | Goodwin |
| 7,607,583 B2 | 10/2009 | Berardi et al. |
| 7,615,855 B2 | 11/2009 | Osaka et al. |
| 7,616,452 B2 | 11/2009 | Wehrly, Jr. et al. |
| 7,619,901 B2 | 11/2009 | Eichelberger et al. |
| 7,630,209 B2 | 12/2009 | Kim et al. |
| D608,770 S | 1/2010 | Deguchi et al. |
| 7,655,501 B2 | 2/2010 | Yang et al. |
| 7,662,667 B2 | 2/2010 | Shen |
| 7,663,564 B2 | 2/2010 | Ayala et al. |
| 7,667,318 B2 | 2/2010 | Yang et al. |
| D611,039 S | 3/2010 | Deguchi et al. |
| 7,669,773 B2 | 3/2010 | Nishizawa et al. |
| 7,675,151 B1 | 3/2010 | Boone |
| 7,686,228 B2 | 3/2010 | Oddou et al. |
| 7,719,846 B2 | 5/2010 | Frallicciardi et al. |
| 7,760,513 B2 | 7/2010 | Partridge et al. |
| 7,763,976 B2 | 7/2010 | Tang et al. |
| 7,768,796 B2 | 8/2010 | Cady et al. |
| 7,807,502 B2 | 10/2010 | Kwang et al. |
| 7,810,718 B2 | 10/2010 | Bonneau et al. |
| 7,812,434 B2 | 10/2010 | Yang |
| D628,202 S | 11/2010 | Pomerantz et al. |
| 7,837,122 B2 | 11/2010 | Martinent et al. |
| 7,847,380 B2 | 12/2010 | Huang |
| 7,855,895 B2 | 12/2010 | Kim et al. |
| 7,862,381 B2 | 1/2011 | Miller |
| 7,874,491 B2 | 1/2011 | Janke et al. |
| 7,909,251 B2 | 3/2011 | Yi et al. |
| 7,909,611 B2 | 3/2011 | Miller |
| 7,914,296 B1 | 3/2011 | Howell |
| 7,922,097 B2 | 4/2011 | Yoshikawa et al. |
| D638,431 S | 5/2011 | Pomerantz et al. |
| 7,946,876 B1 | 5/2011 | Huang |
| 7,958,622 B1 | 6/2011 | Ayala et al. |
| 7,961,101 B2 | 6/2011 | Narendra et al. |
| 7,964,946 B2 | 6/2011 | Kwang et al. |
| 7,975,915 B2 | 7/2011 | Fidalgo et al. |
| 7,980,477 B2 | 7/2011 | Finn |
| D643,040 S | 8/2011 | Sedio et al. |
| 8,002,196 B2 | 8/2011 | Yu et al. |
| 8,003,513 B2 | 8/2011 | Shah et al. |
| 8,016,191 B2 | 9/2011 | Bonalle et al. |
| 8,030,745 B2 | 10/2011 | Yamazaki |
| 8,030,746 B2 | 10/2011 | Tan |
| 8,061,623 B2 | 11/2011 | Balchaytis |
| 8,061,625 B2 | 11/2011 | Yu et al. |
| 8,072,331 B2 | 12/2011 | Narendra et al. |
| 8,079,528 B2 | 12/2011 | Song |
| 8,085,547 B2 | 12/2011 | Wu et al. |
| D651,992 S | 1/2012 | Nishiguchi et al. |
| 8,107,246 B2 | 1/2012 | Fidalgo et al. |
| 8,110,434 B2 | 2/2012 | Okada et al. |
| 8,110,916 B2 | 2/2012 | Weng et al. |
| 8,127,997 B2 | 3/2012 | Droz |
| 8,136,725 B2 | 3/2012 | Yamazaki |
| 8,136,732 B2 | 3/2012 | Narendra et al. |
| 8,143,713 B2 | 3/2012 | Song et al. |
| 8,167,659 B2 | 5/2012 | Miller et al. |
| 8,174,105 B2 | 5/2012 | Kwang et al. |
| 8,181,880 B2 | 5/2012 | Kwon et al. |
| 8,191,788 B2 | 6/2012 | Morrill-Webb et al. |
| 8,231,061 B2 | 7/2012 | Narendra et al. |
| D667,442 S | 9/2012 | Phelan |
| 8,268,702 B2 | 9/2012 | Takayama et al. |
| D669,478 S | 10/2012 | Lepp et al. |
| D669,479 S | 10/2012 | Lepp et al. |
| 8,297,518 B2 | 10/2012 | Yamazaki et al. |
| 8,301,915 B2 | 10/2012 | Watanabe et al. |
| 8,333,004 B2 | 12/2012 | Bashan et al. |
| 8,336,784 B2 | 12/2012 | Phillips |
| 8,342,416 B2 | 1/2013 | Kato |
| 8,422,238 B2 | 4/2013 | Hsiao et al. |
| D681,640 S | 5/2013 | Aoki et al. |
| D686,214 S | 7/2013 | Maus et al. |
| 8,507,377 B2 | 8/2013 | Watanabe et al. |
| 8,573,494 B2 | 11/2013 | Narendra et al. |
| 2001/0005291 A1 | 6/2001 | Iwasaki |
| 2001/0011685 A1 | 8/2001 | Fries et al. |
| 2001/0012682 A1 | 8/2001 | Kayanakis et al. |
| 2001/0038547 A1 | 11/2001 | Jigour et al. |
| 2002/0023963 A1 | 2/2002 | Luu |
| 2002/0049887 A1 | 4/2002 | Takahashi |
| 2002/0050527 A1 | 5/2002 | Nishikawa et al. |
| 2002/0069392 A1 | 6/2002 | Saitoh |
| 2002/0110955 A1 | 8/2002 | Patrice et al. |
| 2002/0169943 A1 | 11/2002 | Rabeler |
| 2002/0170974 A1 | 11/2002 | Kashima |
| 2002/0177255 A1 | 11/2002 | Kasahara et al. |
| 2002/0186542 A1 | 12/2002 | Choi |
| 2003/0016116 A1 | 1/2003 | Blaha |
| 2003/0016507 A1 | 1/2003 | Fischer et al. |
| 2003/0024995 A1 | 2/2003 | Conner et al. |
| 2003/0024996 A1 | 2/2003 | Muehlberger et al. |
| 2003/0085287 A1 | 5/2003 | Gray |
| 2003/0102544 A1 | 6/2003 | Nishikawa |
| 2003/0103301 A1 | 6/2003 | Fechner |
| 2003/0116634 A1 | 6/2003 | Tanaka |
| 2003/0168515 A1 | 9/2003 | Gray |
| 2003/0213849 A1 | 11/2003 | Luu |
| 2003/0226901 A1 | 12/2003 | Kim et al. |
| 2004/0031857 A1 | 2/2004 | Sato |
| 2004/0037145 A1 | 2/2004 | Tagawa et al. |
| 2004/0061234 A1 | 4/2004 | Shah et al. |
| 2004/0089717 A1 | 5/2004 | Harari et al. |
| 2004/0113265 A1 | 6/2004 | DiBattista et al. |
| 2004/0117317 A1 | 6/2004 | Feinman |
| 2004/0194861 A1 | 10/2004 | Endou et al. |
| 2004/0211843 A1 | 10/2004 | Boker |
| 2004/0232246 A1 | 11/2004 | Dhers et al. |
| 2004/0238857 A1 | 12/2004 | Beroz et al. |
| 2004/0245347 A1 | 12/2004 | Shibamoto et al. |
| 2004/0252070 A1 | 12/2004 | Chuang |
| 2004/0259423 A1 | 12/2004 | Elbaz et al. |
| 2005/0007744 A1 | 1/2005 | Okita et al. |
| 2005/0011671 A1 | 1/2005 | Takiar et al. |
| 2005/0035909 A1 | 2/2005 | Lin |
| 2005/0037540 A1 | 2/2005 | Pepe et al. |
| 2005/0045729 A1 | 3/2005 | Yamasaki |
| 2005/0082636 A1 | 4/2005 | Yashima et al. |
| 2005/0099269 A1 | 5/2005 | Diorio et al. |
| 2005/0105360 A1 | 5/2005 | Takiar et al. |
| 2005/0111280 A1 | 5/2005 | Takiar et al. |
| 2005/0139489 A1 | 6/2005 | Davies et al. |
| 2005/0148217 A1 | 7/2005 | Takiar et al. |
| 2005/0156310 A1 | 7/2005 | Benner et al. |
| 2005/0194453 A1 | 9/2005 | Conner et al. |
| 2005/0197169 A1 | 9/2005 | Son |
| 2005/0202667 A1 | 9/2005 | Cohen et al. |
| 2005/0212690 A1 | 9/2005 | Nishikawa |
| 2005/0218235 A1 | 10/2005 | Chang et al. |
| 2005/0224588 A1 | 10/2005 | Ruping et al. |
| 2005/0230485 A1 | 10/2005 | Ross et al. |
| 2005/0231921 A1 | 10/2005 | Noda et al. |
| 2005/0236490 A1 | 10/2005 | Fortune et al. |
| 2005/0247785 A1 | 11/2005 | Bertin |
| 2005/0247797 A1 | 11/2005 | Ramachandran |
| 2005/0252978 A1 | 11/2005 | Nishizawa et al. |
| 2005/0253239 A1 | 11/2005 | Nishizawa et al. |
| 2005/0281010 A1 | 12/2005 | Wang et al. |
| 2005/0287846 A1 | 12/2005 | Dozen et al. |
| 2006/0000915 A1 | 1/2006 | Kodukula et al. |
| 2006/0006241 A1 | 1/2006 | Soyer et al. |
| 2006/0047971 A1 | 3/2006 | Miyazaki et al. |

(56) References Cited

U.S. PATENT DOCUMENTS

| | | |
|---|---|---|
| 2006/0049263 A1 | 3/2006 | Ou et al. |
| 2006/0054710 A1 | 3/2006 | Forster et al. |
| 2006/0057892 A1 | 3/2006 | Bricaud et al. |
| 2006/0058065 A1 | 3/2006 | Shen et al. |
| 2006/0097059 A1 | 5/2006 | Miyazaki |
| 2006/0131429 A1 | 6/2006 | Knoll |
| 2006/0139901 A1 | 6/2006 | Meireles et al. |
| 2006/0142063 A1 | 6/2006 | Monsacre |
| 2006/0145929 A1 | 7/2006 | Teng et al. |
| 2006/0152417 A1 | 7/2006 | Ying et al. |
| 2006/0175417 A1 | 8/2006 | Ho |
| 2006/0175418 A1 | 8/2006 | Ho |
| 2006/0194479 A1 | 8/2006 | Osako et al. |
| 2006/0202034 A1 | 9/2006 | Wallace et al. |
| 2006/0205280 A1 | 9/2006 | Nishizawa et al. |
| 2006/0278722 A1 | 12/2006 | Tominaga |
| 2006/0288145 A1 | 12/2006 | Chen |
| 2006/0288146 A1 | 12/2006 | Chen |
| 2007/0013396 A1 | 1/2007 | Kim et al. |
| 2007/0023532 A1 | 2/2007 | Narendra et al. |
| 2007/0025092 A1 | 2/2007 | Lee et al. |
| 2007/0026740 A1 | 2/2007 | Chen |
| 2007/0032268 A1 | 2/2007 | Gotfried |
| 2007/0080869 A1 | 4/2007 | Chen et al. |
| 2007/0082703 A1 | 4/2007 | Van Kleef |
| 2007/0095910 A1 | 5/2007 | Gallagher et al. |
| 2007/0108294 A1 | 5/2007 | Rossiter |
| 2007/0108298 A1 | 5/2007 | Kalck et al. |
| 2007/0108521 A1 | 5/2007 | Dekker |
| 2007/0125866 A1 | 6/2007 | Nishizawa et al. |
| 2007/0126099 A1 | 6/2007 | Aoki et al. |
| 2007/0138301 A1 | 6/2007 | Cinkler |
| 2007/0145133 A1 | 6/2007 | Jolivet |
| 2007/0152072 A1 | 7/2007 | Frallicciardi et al. |
| 2007/0153487 A1 | 7/2007 | Frallicciardi et al. |
| 2007/0164119 A1 | 7/2007 | Liu et al. |
| 2007/0213096 A1 | 9/2007 | Bella et al. |
| 2007/0228536 A1 | 10/2007 | Aoki |
| 2007/0279312 A1 | 12/2007 | Mei et al. |
| 2007/0290049 A1 | 12/2007 | Ratcliffe |
| 2008/0006703 A1 | 1/2008 | Ortigosa Vallejo et al. |
| 2008/0010562 A1 | 1/2008 | Kim et al. |
| 2008/0020800 A1 | 1/2008 | Xu |
| 2008/0054079 A1 | 3/2008 | Mullen |
| 2008/0054493 A1 | 3/2008 | Leddige et al. |
| 2008/0061150 A1 | 3/2008 | Phillips |
| 2008/0061151 A1 | 3/2008 | Phillips |
| 2008/0076474 A1 | 3/2008 | Ho |
| 2008/0083831 A1 | 4/2008 | Perez Lafuente et al. |
| 2008/0088038 A1 | 4/2008 | Hsu et al. |
| 2008/0099559 A1 | 5/2008 | Lo et al. |
| 2008/0099932 A1 | 5/2008 | Silverbrook |
| 2008/0101986 A1 | 5/2008 | Saini et al. |
| 2008/0102895 A1 | 5/2008 | Fernandez |
| 2008/0112852 A1 | 5/2008 | Neel et al. |
| 2008/0135625 A1 | 6/2008 | Waschk |
| 2008/0135626 A1 | 6/2008 | Reignoux et al. |
| 2008/0144650 A1 | 6/2008 | Boch et al. |
| 2008/0146280 A1 | 6/2008 | Sasse et al. |
| 2008/0149737 A1 | 6/2008 | Ohshima |
| 2008/0153205 A1 | 6/2008 | Nishizawa et al. |
| 2008/0164324 A1 | 7/2008 | Song |
| 2008/0182120 A1 | 7/2008 | Tan et al. |
| 2008/0212370 A1 | 9/2008 | Tokiwa |
| 2008/0223937 A1 | 9/2008 | Preta et al. |
| 2008/0245877 A1 | 10/2008 | Billebaud et al. |
| 2008/0257967 A1 | 10/2008 | Nishizawa et al. |
| 2008/0263363 A1 | 10/2008 | Jueneman et al. |
| 2008/0265038 A1 | 10/2008 | Mumbru Forn et al. |
| 2008/0265039 A1 | 10/2008 | Skowronek et al. |
| 2008/0272197 A1 | 11/2008 | Nishizawa et al. |
| 2008/0277484 A1 | 11/2008 | Launay et al. |
| 2008/0290160 A1 | 11/2008 | Huot et al. |
| 2008/0299860 A1 | 12/2008 | Lee et al. |
| 2008/0302876 A1 | 12/2008 | Mullen |
| 2008/0308640 A1 | 12/2008 | Chien |
| 2008/0308641 A1 | 12/2008 | Finn |
| 2009/0032593 A1 | 2/2009 | Ljungerantz |
| 2009/0040116 A1 | 2/2009 | Eray |
| 2009/0057417 A1 | 3/2009 | Shinohara et al. |
| 2009/0061933 A1 | 3/2009 | Lo et al. |
| 2009/0065587 A1 | 3/2009 | Phillips |
| 2009/0065591 A1 | 3/2009 | Paul et al. |
| 2009/0065592 A1 | 3/2009 | Paul et al. |
| 2009/0069052 A1 | 3/2009 | Jain et al. |
| 2009/0079053 A1 | 3/2009 | Huang |
| 2009/0084858 A1 | 4/2009 | Borracci |
| 2009/0101722 A1 | 4/2009 | Ortigosa Vallejo et al. |
| 2009/0108063 A1 | 4/2009 | Jain et al. |
| 2009/0111522 A1 | 4/2009 | Robles |
| 2009/0121020 A1 | 5/2009 | Gallagher et al. |
| 2009/0127345 A1 | 5/2009 | Chamley et al. |
| 2009/0140443 A1 | 6/2009 | Hohlfeld et al. |
| 2009/0156254 A1 | 6/2009 | Montes |
| 2009/0160071 A1 | 6/2009 | Shen |
| 2009/0166895 A1 | 7/2009 | Noguchi et al. |
| 2009/0169013 A1 | 7/2009 | Fascenda et al. |
| 2009/0172279 A1 | 7/2009 | Yuan et al. |
| 2009/0173793 A1 | 7/2009 | Kojo et al. |
| 2009/0200382 A1 | 8/2009 | Kwon et al. |
| 2009/0210569 A1 | 8/2009 | Lusetti et al. |
| 2009/0216681 A1 | 8/2009 | McCown |
| 2009/0224888 A1 | 9/2009 | Caruana |
| 2009/0235037 A1 | 9/2009 | Mounier et al. |
| 2009/0242646 A1 | 10/2009 | Aznar et al. |
| 2009/0245029 A1 | 10/2009 | Kam |
| 2009/0250523 A1 | 10/2009 | Tran |
| 2009/0272815 A1 | 11/2009 | Tanner et al. |
| 2009/0302119 A1 | 12/2009 | Dohmann et al. |
| 2010/0001080 A1 | 1/2010 | Sim et al. |
| 2010/0025480 A1 | 2/2010 | Nishizawa et al. |
| 2010/0032487 A1 | 2/2010 | Bohn et al. |
| 2010/0033307 A1 | 2/2010 | Narendra et al. |
| 2010/0033310 A1 | 2/2010 | Narendra et al. |
| 2010/0038435 A1 | 2/2010 | Tomoeda |
| 2010/0049878 A1 | 2/2010 | Yu et al. |
| 2010/0072284 A1 | 3/2010 | Nishizawa et al. |
| 2010/0072618 A1 | 3/2010 | Camacho et al. |
| 2010/0078485 A1 | 4/2010 | Li |
| 2010/0078486 A1 | 4/2010 | Kai et al. |
| 2010/0084759 A1 | 4/2010 | Shen |
| 2010/0140814 A1 | 6/2010 | Jones et al. |
| 2010/0176207 A1 | 7/2010 | Yoshikawa et al. |
| 2010/0190528 A1 | 7/2010 | Hsiao et al. |
| 2010/0200661 A1 | 8/2010 | Shafran et al. |
| 2010/0203870 A1 | 8/2010 | Hubinak et al. |
| 2010/0223403 A1 | 9/2010 | Chau et al. |
| 2010/0227644 A1 | 9/2010 | Yu et al. |
| 2010/0262840 A1 | 10/2010 | Benteo et al. |
| 2010/0273528 A1 | 10/2010 | Yu et al. |
| 2010/0285841 A1 | 11/2010 | Jolivet et al. |
| 2010/0293784 A1 | 11/2010 | Bashan et al. |
| 2010/0312698 A1 | 12/2010 | Bonalle et al. |
| 2011/0059773 A1 | 3/2011 | Neumann et al. |
| 2011/0077051 A1 | 3/2011 | Brown et al. |
| 2011/0111593 A1 | 5/2011 | Kanno |
| 2011/0115060 A1 | 5/2011 | Chiu et al. |
| 2011/0117961 A1 | 5/2011 | Kim et al. |
| 2011/0125967 A1 | 5/2011 | Kim et al. |
| 2011/0147463 A1 | 6/2011 | Schiller et al. |
| 2011/0147467 A1 | 6/2011 | Choi |
| 2011/0149533 A1 | 6/2011 | Lou et al. |
| 2011/0157838 A1 | 6/2011 | Morita et al. |
| 2011/0171996 A1 | 7/2011 | Narendra et al. |
| 2011/0180599 A1 | 7/2011 | Hu et al. |
| 2011/0182037 A1 | 7/2011 | Katsumura |
| 2011/0186641 A1 | 8/2011 | Kato et al. |
| 2011/0194265 A1 | 8/2011 | Su et al. |
| 2011/0204147 A1 | 8/2011 | Amadeo et al. |
| 2011/0210177 A1 | 9/2011 | Pepin et al. |
| 2011/0223972 A1 | 9/2011 | Narendra et al. |
| 2011/0233545 A1 | 9/2011 | Shin et al. |
| 2011/0253793 A1 | 10/2011 | King |
| 2011/0253795 A1 | 10/2011 | Kato |

(56) References Cited

U.S. PATENT DOCUMENTS

| | | |
|---|---|---|
| 2011/0259966 A1 | 10/2011 | Philips |
| 2011/0298585 A1 | 12/2011 | Barry |
| 2011/0304060 A1 | 12/2011 | Qin et al. |
| 2012/0048948 A1 | 3/2012 | Bertin et al. |
| 2012/0074231 A1 | 3/2012 | Jain et al. |
| 2012/0104634 A1 | 5/2012 | Weng et al. |
| 2012/0161337 A1 | 6/2012 | Utsumi |
| 2012/0225691 A1 | 9/2012 | Desjeux et al. |
| 2012/0256324 A1 | 10/2012 | Liao et al. |
| 2012/0289196 A1 | 11/2012 | Tan et al. |
| 2012/0292395 A1 | 11/2012 | Huang |
| 2013/0015441 A1 | 1/2013 | Takayama et al. |
| 2013/0084918 A1 | 4/2013 | Sheshadri |

OTHER PUBLICATIONS

ETSI, "ETSI TS 102 221," V9.2.0, Technical Specification, Oct. 2010, 179 pages.

ETSI, ETSI TS 102 412, V11.0.0, Technical Specification, May 2011, 90 pages.

ETSI, ETSI TS 102 600, V10.0.0, Techincal Specification, Oct. 2010, 26 pages.

ETSI, ETSI TS 102 613, V9.2.0, Mar. 2011, 57 pages.

ETSI, ETSI TS 102 671, V9.1.0, Sep. 2011, 21 pages.

TE Connectivity, "Recommendations 4FF SIM for ETSI," Mar. 30, 2011, 9 pages.

"3GPP TSG-CT6#55," Distributing mini-UICC as punch out from Plug-in or double punch-out from ID-1, Kyoto, Japan, May 11-14, 2010, 2 pages.

"ETSI TC SCP Meeting #51," San Diego, CA, Jul. 21-22, 2011, 5 pages.

"ETSI SCP TEC Meeting #40," Sophia Antipolis, France, Aug. 29-Sep. 1, 2011, 5 pages.

"ETSI TC SCP TEC #40," Sophia-Antipolis, France, Aug. 26-Sep. 1, 2011, 1 page.

"iPhone Teardown," © 2011 iFixit, 4 pages.

International Organization for Standardization, "Identification Cards-Physical Characteristics," ISO/IEC 7810, Nov. 1, 2003, 26 pages.

International Organization for Standardization, "Identification Cards-Integrated Circuit Cards," ISO/IEC 7816-1, Feb. 15, 2011, 8 pages.

International Organization for Standardization, "Identification Cards-Integrated Circuit Cards," ISO/IEC 7816-2, Oct. 15, 2007, 14 pages.

International Organization for Standardization, "Identification Cards-Integrated Circuit Cards," ISO/IEC 7816-3, Nov. 1, 2006, 58 pages.

SMK, "Push-Push Style Micro SIM Memory Card Connector," retrieved from www.smkusa.com/usa/featured_products/mem/, Dec. 12, 2011, 4 pages.

United States Patent and Trademark Office, "Non-Final Office Action," issued in connection with U.S. Appl. No. 13/290,874, issued Feb. 28, 2013, 38 pages.

United States Patent and Trademark Office, "Ex Parte Quayle Action," issued in connection with U.S. Appl. No. 29/418,309, issued Feb. 6, 2013, 6 pages.

United States Patent and Trademark Office, "Ex Parte Quayle Action," issued in connection with U.S. Appl. No. 29/418,880, issued Feb. 7, 2013, 29 pages.

United States Patent and Trademark Office, "Final Office Action," issued in connection with U.S. Appl. No. 29/405,848, issued Feb. 22, 2013, 11 pages.

United States Patent and Trademark Office, "Ex Parte Quayle Action," issued in connection with U.S. Appl. No. 29/418,619, issued Feb. 27, 2013, 6 pages.

United States Patent and Trademark Office, "Restriction Requirement," issued in connection with U.S. Appl. No. 29/419,286, issued Mar. 7, 2013, 9 pages.

Canadian Intellectual Property Office, Industrial Design Certificate of Registration, issued in connection with Canadian Patent Application No. 147625 on Sep. 18, 2013, 8 pages.

Canadian Intellectual Property Office, Industrial Design Certificate of Registration, issued in connection with Canadian Patent Application No. 147626 on Sep. 18, 2013, 8 pages.

Canadian Intellectual Property Office, Industrial Design Examiners Report, issued in connection with Canadian Patent Application No. 147627 on Sep. 19, 2013, 2 pages.

United States Patent and Trademark Office, "Notice of Allowance," issued in connection with U.S. Appl. No. 29/418,880, Nov. 12, 2013, 8 pages.

United States Patent and Trademark Office, "Supplemental Notice of Allowance," issued in connection with U.S. Appl. No. 29/418,880, Jan. 2, 2014, 2 pages.

United States Patent and Trademark Office, "Ex parte Quayle," issued in connection with U.S. Appl. No. 29/418,880, Jun. 28, 2013, 19 pages.

United States Patent and Trademark Office, "Notice of Allowance," issued in connection with U.S. Appl. No. 29/419,286, Nov. 12, 2013, 21 pages.

United States Patent and Trademark Office, "Supplemental Notice of Allowance," issued in connection with U.S. Appl. No. 29/419,286, Feb. 20, 2014, 4 pages.

United States Patent and Trademark Office, "Supplemental Notice of Allowance," issued in connection with U.S. Appl. No. 29/419,286, Jan. 6, 2014, 4 pages.

United States Patent and Trademark Office, "Ex parte Quayle," issued in connection with U.S. Appl. No. 29/419,286, Jun. 20, 2013, 4 pages.

Canadian Intellectual Property Office, "Exam Report," issued in connection with Canadian Patent Application No. 147627, Apr. 17, 2013, 3 pages.

Canadian Intellectual Property Office, "Exam Report," issued in connection with Canadian Patent Application No. 147628, Apr. 17, 2013, 4 pages.

United States Patent and Trademark Office, "Notice of Allowance," issued in connection with U.S. Appl. No. 29/418,309, Nov. 14, 2013, 21 pages.

United States Patent and Trademark Office, "Supplemental Notice of Allowance," issued in connection with U.S. Appl. No. 29/418,309, Jan. 6, 2014, 2 pages.

United States Patent and Trademark Office, "Ex parte Quayle," issued in connection with U.S. Appl. No. 29/418,309, Jun. 21, 2013, 4 pages.

United States Patent and Trademark Office, "Supplemental Notice of Allowance," issued in connection with U.S. Appl. No. 29/418,619, Jan. 2, 2014, 4 pages.

United States Patent and Trademark Office, "Notice of Allowance," issued in connection with U.S. Appl. No. 29/418,619, Nov. 14, 2013, 22 pages.

United States Patent and Trademark Office, "Ex parte Quayle," issued in connection with U.S. Appl. No. 29/418,619, Jun. 20, 2013, 5 pages.

Canadian Intellectual Property Office, "Exam Report," issued in connection with Canadian Patent Application No. 147625, Apr. 17, 2013, 4 pages.

Canadian Intellectual Property Office, "Exam Report," issued in connection with Canadian Patent Application No. 147626, Apr. 17, 2013, 4 pages.

United States Patent and Trademark Office, "Supplemental Notice of Allowance," issued in connection with U.S. Appl. No. 13/290,874, Jan. 13, 2014, 2 pages.

United States Patent and Trademark Office, "Notice of Allowance," issued in connection with U.S. Appl. No. 13/290,874, Sep. 18, 2013, 8 pages.

United States Patent and Trademark Office, "Ex parte Quayle," issued in connection with U.S. Appl. No. 13/290,874, Jun. 18, 2013, 12 pages.

United States Patent and Trademark Office, "Restriction Requirement," issued in connection with U.S. Appl. No. 29/405,848, Jun. 21, 2012, 4 pages.

(56) References Cited

OTHER PUBLICATIONS

United States Patent and Trademark Office, "Notice of Allowance," issued in connection with U.S. Appl. No. 29/405,848, Jun. 25, 2013, 13 pages.

State Intellectual Property Office of P.R. China, "Office Action," with unverified redacted English translation, issued in connection with Chinese application serial No. 201230153596, issued Sep. 18, 2012, 2 pages.

United States Patent and Trademark Office, "Non-Final Office Action," issued in connection with U.S. Appl. No. 29/405,848, issued Oct. 2, 2012, 4 pages.

Canadian Intellectual Property Office, "Office Action," issued in connection with Canadian application serial No. 145596, issued Oct. 26, 2012, 2 pages.

United States Patent and Trademark Office, "Restriction Requirement," issued in connection with U.S. Appl. No. 29/418,880, mailed Dec. 20, 2012, 7 pages.

United States Patent and Trademark Office, "Restriction Requirement," issued in connection with U.S. Appl. No. 29/418,619, mailed Jan. 17, 2013, 9 pages.

United States Patent and Trademark Office, "Restriction Requirement," issued in connection with U.S. Appl. No. 29/418,309, mailed Dec. 28, 2012, 9 pages.

\* cited by examiner

UICC APPARATUS AND RELATED METHODS

CROSS SECTION TO RELATED APPLICATIONS

This patent application claims the benefit of U.S. Provisional Patent Application Ser. No. 61/624,219, filed on Apr. 13, 2012, entitled UICC APPARATUS AND RELATED METHODS, which is hereby incorporated herein by reference in its entirety.

FIELD OF DISCLOSURE

The present disclosure relates to UICCs and smart cards, including but not limited to, UICC apparatus and related methods.

BACKGROUND

Electronic devices, including portable electronic devices, have gained widespread use and may provide a variety of functions including, for example, telephonic, electronic messaging, and other personal information manager (PIM) application functions. Portable electronic devices include, for example, several types of mobile stations such as simple cellular telephones, smart telephones, tablet computers, wireless personal digital assistants (PDAs), and laptop computers with wireless 802.11 or Bluetooth capabilities.

Electronic devices such as, for example, portable electronic devices often connect to a network (e.g., a mobile network). These devices often employ a Universal Integrated Circuit Card to identify a subscriber for network access. For example, the UICC can store a Subscriber Identity Module application (e.g., a SIM, USIM, RUIM, CSIM, etc.) that authenticates a subscriber to a network such as a mobile network. The UICC may also store other subscriber-related information for non-telecom applications. For example, the UICC can enable contactless data flow for identity, security, banking, payment applications and/or any other application associated with transmitting and securing personal data of a user.

Figures 1A, 1B:
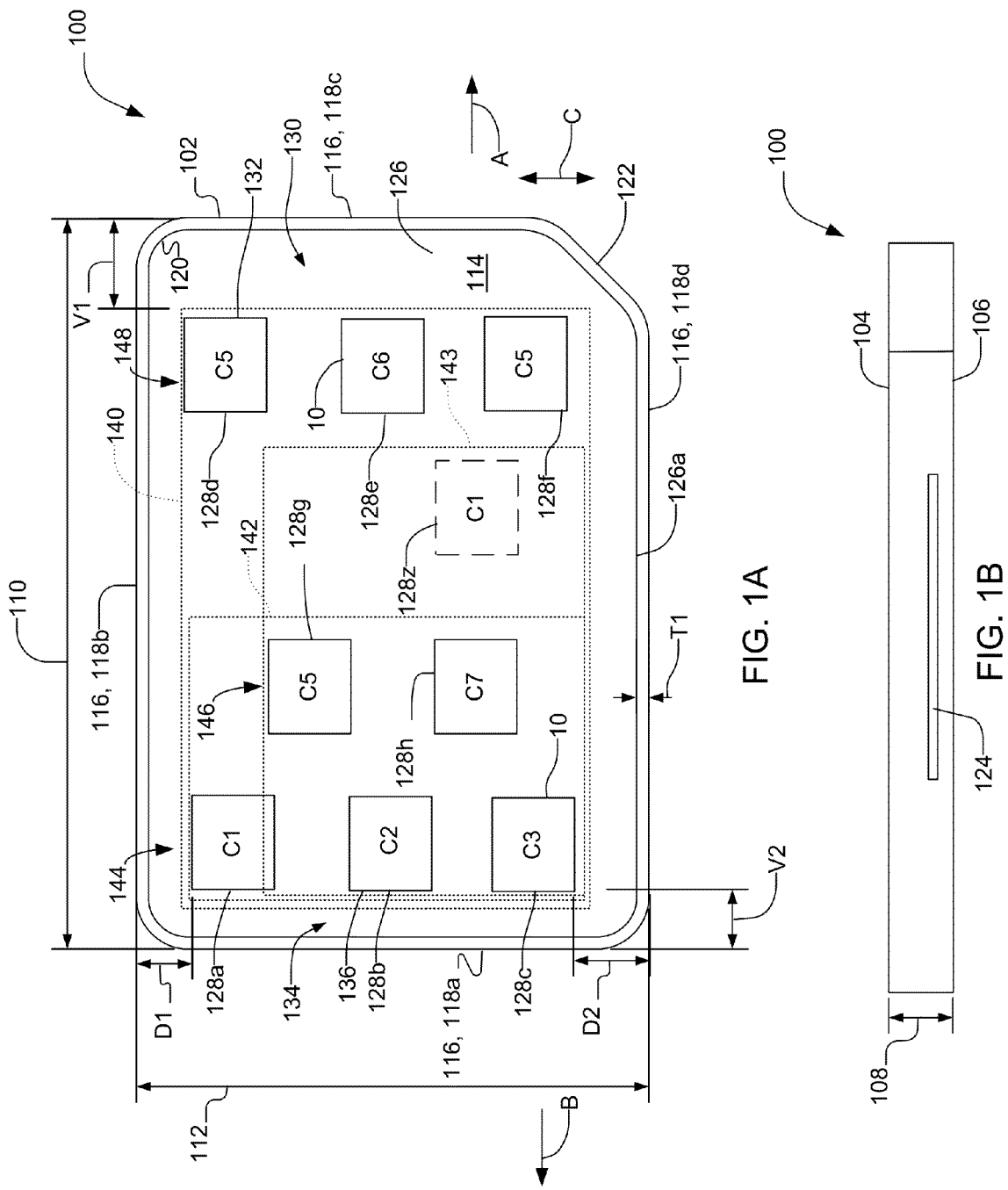
FIG. 1A illustrates an example UICC in accordance with the teachings described herein.
FIG. 1B is a side view of the example UICC of FIG. 1A.

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity. Additionally, several examples have been described throughout this specification. Any features from any example may be included with, a replacement for, or otherwise combined with other features from other examples. Further, the example shown in the above-indentified figures include classifications symbols, lettering or tags associated with, for example, international standards provided by, for example, the European Telecommunications Standards Institute (ETSI) and the International Standard Organization (ISO). For example, certain electrical contacts shown in the above-indentified figures employ classifications associated with electrical contact properties commonly known as C1-C8. Such identification of the electrical contact classifications in the above-indentified figures are provided as examples only and the electrical contacts may vary from the examples shown in the above-referenced figures.

DETAILED DESCRIPTION

UICCs are often used as a Subscriber Identity Module (e.g., SIM card, USIM card, RUIM card or CSIM card) in a portable electronic device such as a mobile device. A Subscriber Identity Module is a network access application or software that is stored in the UICC to authenticate a subscriber to a network. In some examples, a UICC enables contactless communication (Near Field Communication) with a host (e.g., a remote terminal).

Typically, a UICC includes a body to support an integrated circuit or microprocessor and a plurality of electrical contacts to enable communication between the microprocessor and a host (e.g., a computer, a mobile device, a non-mobile device, a terminal, a remote terminal, etc.). The host typically employs an input device (e.g., a card reader) to accept the body and complete a circuit with the electrical contacts to enable communication (e.g., transfer data) between the UICC and the host.

Thus, the input device or card reader must be configured to support a layout or pattern of the electrical contacts positioned on the UICC. Currently, physical characteristics or parameters of UICCs are governed by certain international standards provided by, for example, the European Telecommunications Standards Institute (ETSI) and the International Standard Organization (ISO). In particular, physical characteristics or parameters of an UICC are provided by certain form factor standards (e.g., ID-1, plug-in UICC, a mini-UICC) defined by International Standard Organization ISO/IEC 7816-2 and 7816-3 and/or Technical Specification of the European Telecommunications Standards Institute ETSI TS 102 221.

For example, ISO/IEC 7816-2 and/or ETSI TS 102 221 standards define an overall profile and/or dimensional envelope of conforming UICCs. For example, some current standards define ID-1 card standard, plug-in UICC (or $2^{nd}$ form factor or 2FF) standard and a mini-UICC (or $3^{rd}$ form factor or 3FF) standard. Each of the different form factors defines a different dimensional envelope or profile. More specifically, the ID-1 card standard provides a first dimensional profile that is larger than a dimensional profile of the plug-in UICC and the mini-UICC, and the plug-in UICC standard provides a dimensional profile that is larger than the dimensional profile of the mini-UICC.

Further, an order or arrangement in which electrical contacts are positioned on the UICC is also defined by the standards. The current standards define a layout of electrical contacts on the UICC as a grid pattern (e.g., 4 by 2 grid pattern) that provides a surface area greater than 1 centimeter squared. For example, the standards specify that a first row of electrical contacts should include a voltage supply, a reset, a clock and an optional first auxiliary, and a second row of electrical contacts should include a ground, a single-wire protocol, an input/output and an optional second auxiliary. In other words, conforming UICCs have a common electrical contact pattern or configuration and are only differentiated by the shape and/or profile of the body supporting and/or surrounding the electrical contact pattern.

Thus, while the current specifications ISO/IEC 7816-2 and 7816-3 and ETSI TS 102 221 define standards of a UICC, such standards also influence the design (e.g., the size, shape or footprint) of an input device or card reader. Some known input devices often employ a push-push mechanism to insert/remove a UICC from an input device, which requires a user to slide the card inside a slot of the input device. To remove the card, a user pushes the card further into the slot and a spring-loaded mechanism ejects the card from the slot. Another example input device or card reader employs a push-pull configuration. In such example, a UICC is pulled from a slot of the card reader. Some example electronic devices employ a tray-style input device or card reader. In such example, the UICC is nested in the tray. The tray and the nested UICC are then disposed in an electronic device.

Further, each of the known card readers are typically configured or adapted to receive a dedicated UICC form factor standard (e.g., a UICC conforming to only one standard). In some examples, an adaptor may be employed to enable a smaller conforming UICC to be operable with a card reader adapted to receive larger conforming UICCs. Due to the common pattern of the electrical contacts for each conforming UICCs provided by the standards noted above, a card reader configured to receive the larger conforming UICC can receive and communicate with a smaller conforming UICC via the adaptor, because the adaptor only alters the profile or shape of the smaller conforming UICC supporting and/or surrounding the electronic contacts or the electrical contact pattern.

However, card readers can significantly increase a dimensional envelope of a portable electronic device. In some example electronic devices, an input device or card reader may cover the greatest amount of surface area of an electronic board of an electronic device (e.g., a mobile phone) compared to other electronic components of the electronic device. For example, by specifying the electrical contacts or pads disposed across an (x) by (y) surface area, an input device having a minimum surface area specified by the (x) by (y) surface area of the electrical contacts is required to properly couple to the electrical contacts of the circuit card. However, smaller electronic devices are generally desirable for portability. As a result, current standards may not be sufficient to reduce the size and/or an overall footprint of a mobile device.

In general, example UICCs disclosed herein modify or deviate from the dimensional envelope and/or profiles (e.g., shape and/or dimensions) provided by the ISO/IEC 7816-2 and 7816-3 and/or ETSI TS 102 221 standards. In other words, the example UICCs disclosed herein may define another UICC form factor standard. In particular, UICCs disclosed herein provide significantly smaller overall footprints compared to UICCs manufactured per the current specifications and/or standards provided by ISO/IEC 7816-2 and 7816-3 and/or ETSI TS 102 221. More specifically, a profile or dimensional envelope of the example UICCs disclosed herein deviate from the known standards (e.g., the ISO/IEC and/or ETSI TS standards). As a result, the example UICCs disclosed herein can also reduce the overall space requirements of an input device or card reader coupled to an electronic device. For example, the example UICCs disclosed herein enable a UICC that deviates from the conforming standards to be compatible with a card reader having a smaller surface area such as, for example, a block style reader.

Additionally or alternatively, the example UICCs described herein may employ a contact pad that includes a plurality of electrical contact patterns. The plurality of contact patterns may be positioned or oriented on the contact pad such that one or more of the electric contacts define a plurality of different electrical contact patterns (e.g., multiple different electrical contact patterns) to enable an example UICC disclosed herein to communicate and/or be read by a plurality of different input devices and/or card readers.

For example, a first set or plurality of electrical contacts positioned on the contact pad may define or provide a first electrical contact pattern (e.g., a conforming electrical contact pattern or layout) and a second set or plurality of electrical contacts may define or provide a second electrical contact pattern (e.g., a non-conforming electrical contact pattern or layout). Additionally or alternatively, a third set or plurality of electrical contacts positioned on the contact pad may define or provide a third electrical contact pattern. Thus, the first, second and third electrical contact patterns enable different (e.g., first, second and third) input devices to communicate with an UICC disclosed herein. For example, the first electrical contact pattern may be configured to include a conforming electrical contact pattern according to known industry standards (e.g., a set of electrical contacts in a 4×2 grid-like pattern), the second electrical contact pattern may be configured as a non-conforming electrical contact pattern (e.g., a set of electrical contacts in a single-row configuration), and the third electrical contact pattern may be configured as a conforming and/or non-conforming electrical contact pattern (e.g., a set of electrical contacts in a 3×2 grid-like pattern).

To enable configuration of multiple electrical contact patterns, an example contact pad of an example UICC disclosed herein employs electrical contacts having common electrical contact classifications (e.g., classifications C1-C8). For example, a plurality of electrical contacts may include common electrical contacts associated with a voltage classification C1, a resent classification C2, a clock classification C3, a first auxiliary classification C4, a ground classification C5, a single-wire protocol classification C6, an input/output classification C7 and a second auxiliary classification C8. The common electrical contacts may be positioned adjacent to each other and/or may be spaced-apart from each other. Thus, in some examples, the first, second and/or third electrical contact patterns each have one or more similar electrical contact characteristics or properties (e.g., electrical contact properties C1-C8 according to the above-referenced standards). For example, the first, second and/or third electrical contact patterns share an electrical contact positioned on the contact pad. Alternatively, two or more electrical contacts positioned on the contact pad employ the same or similar electrical contact characteristic or property.

Further, the plurality of electrical contacts disclosed herein may include substantially similar or different dimensional profiles or footprints. For example, each of the electrical contacts may have a substantially similar profile (e.g., a height and/or a width). In some examples, a first plurality of electrical contacts may include a first dimensional profile (e.g., a height and/or width) that is different than a dimensional profile (e.g., a height and/or width) of a second plurality of electrical contacts. For example, the second plurality of electrical contacts may have a height and/or width that are different than a height and/or width of a third plurality of electrical contacts. In some examples, an electrical contact may be elongated relative to another electrical contact (e.g., non-elongated electrical contacts). As a result, the elongated electrical contacts span across a height or length on a contact pad that is greater than a height of the non-elongated electrical contacts to enable the elongated electrical contacts to be positioned adjacent two or more non-elongated electrical contacts. In other words, the non-elongated electrical contacts span only across a portion of the contact pad so that two or more non-elongated electrical contacts may be positioned adjacent (e.g., immediately adjacent) to the elongated electrical contacts. For example, the non-elongated electrical contacts may be positioned in pairs relative to the elongated electrical contacts.

Additionally or alternatively, in some examples, one or more of the electrical contacts that define the first, second and/or third electrical contact patterns may be used to define at least part of another one of the first, second or third electrical contact patterns. Thus, in some such examples, one or more of the first, second and third electrical contact patterns may share an electrical contact positioned on the contact pad. For example, the first electrical contact pattern may be defined by electrical contacts associated with the second electrical contact pattern. Therefore, an electrical contact may define at least a portion of the first electrical contact pattern and at least a portion of the second electrical contact pattern.

Additionally or alternatively, each of the electrical contacts defining the respective ones of the first, second and/or third electrical contact patterns do not define part of the other ones of the first, second and/or third electrical contact patterns. As such, each of the first, second and/or third electrical contact patterns may employ dedicated electrical contacts positioned on the contact pad. For example, the first electrical contact pattern may have a first plurality of dedicated electrical contacts and the second electrical contact pattern may have a second plurality of dedicated electrical contacts, where none of the first plurality of dedicated electrical contacts defines the second electrical contact pattern and/or none of the second plurality of dedicated electrical contacts defines the first electrical contact pattern.

In some examples, a first electrical contact pattern or layout scheme may include electrical contacts or electrical pads that conform to a layout provided by, for example, the current ISO/IEC 7816-2 and 7816-3 and/or the ETSI TS 102 221 standards. A second electrical contact pattern or layout scheme may include electrical contacts or electrical pads that may differ from a layout provided by, for example, the current ISO/IEC 7816-2 and 7816-3 and/or the ETSI TS 102 221 standards. For example, the first electrical contact pattern may include electrical contacts or pads (e.g., electrical contacts having classifications C1-C8) in a grid pattern (e.g. a 3×2 or 4×2 grid pattern) that conforms to the above noted standards and the second electrical contact pattern may include electrical contacts or pads (e.g., electrical contacts having classifications C1-C8) in a single row pattern and/or grid-like pattern (e.g., an offset grid pattern) that deviate from the standards noted above.

In this manner, the example UICCs disclosed herein enable an example UICC disclosed herein to communicate with input devices or card readers having traditional six pin readers (e.g., a legacy reader) and/or enable the example UICC disclosed herein to communicate with, for example, single row readers. For example, a point of sale or manufacturing facility can provision an example UICC described herein by inserting the UICC in an input device configured to receive conforming electrical contact patterns or layouts (e.g., a 3×2 grid pattern) and the example UICC can be coupled to an electronic device having a single row reader.

As a result, the UICCs disclosed herein may be received by an input device or card reader configured to communicate with a conforming electrical contact pattern or layout and/or an input device or card reader that is configured to communicate with a non-conforming electrical contact pattern or, in some examples, a combination of both the conforming and non-conforming patterns. For example, an example UICC disclosed herein may be received by a header or block style card reader configured to communicate with a single row electrical contact pattern and/or may be received by a push-pull card reader configured to communicate with a grid-like pattern electrical contact pattern positioned in accordance to the ISO/IEC and/or ETSI TS standards.

Therefore, the example UICCs disclosed herein enable a UICC that deviates from a conforming electrical contact pattern to communicate with an input device or card reader (e.g., a single row block card reader or header card reader) that otherwise may not be employed for use with a conforming UICC. As a result, an electronic device may employ a header or single row block-style input device or card reader, which uses significantly less surface area of a circuit board (e.g., a logic board) of the electronic device compared to, for example, a multi-dimensional input device or card reader (e.g., a multi-row card reader). Further, the example UICCs disclosed herein can also be used with input devices or card readers that are configured to receive a conforming UICC (e.g., provide for reverse compatibility). In some examples, an adaptor or tray may be employed to couple the example UICCs disclosed herein to an input device or card reader.

Further, electrical contact patterns (e.g., a first, second and third electrical contact pattern) may be coupled to an integrated circuit chip of the UICC without the use of additional contacts (e.g., wire bonds) compared to conforming UICCs even though in some examples, the contact patterns may employ more electrical contacts than a conforming UICC. In other words, although the example UICCs disclosed herein employ first and second electrical contact patterns that may each include similar contacts (e.g., C1-C8), one wire bond may be employed to connect two similar electrical contacts (e.g., C1 contacts) of the respective first and second electrical contacts to the integrated circuit. Thus, only one wire bond is needed to communicatively couple a C1 contact in the first electrical contact pattern and a C1 contact in the second electrical contact pattern to the integrated circuit chip.

Additionally or alternatively, example UICCs disclosed herein may employ a retention feature or locking mechanism (e.g., a notch) to retain the circuit card in the input device (e.g., without the use of doors). The retention feature may substantially prevent movement of the UICC relative to the input device when an electronic device experiences sudden shock or vibration (e.g., if the electronic device is dropped). Also, to facilitate insertion of the UICC relative to the input device, example UICCs disclosed herein may employ a lead-in feature (e.g., a chamfer). Further, to facilitate removal of the UICC relative to the input device, example UICCs disclosed herein may employ a pick-out feature (e.g., a ridge, an opening, a slot, etc.).

FIG. 1A illustrates an example UICC apparatus 100 disclosed herein (hereinafter referred to as "UICC"). FIG. 1B is a side view of the example UICC 100 of FIG. 1A. As described in greater detail below, the UICC can provide a plurality of different electrical contact patterns (e.g., at least two different patterns) to enable the UICC 100 to communicate or be read by different input devices. Thus, the example UICC 100 enables a modular UICC apparatus.

Referring to FIGS. 1A and 1B, the example UICC 100 includes a body 102 defining a first or front side 104 and a second or rear side 106 opposite the first side 104. The first and second sides 104 and 106 of the illustrated example are spaced apart by a thickness 108 (FIG. 1B). For example, the thickness 108 is between approximately 0.60 and 0.70 millimeters. Further, the body 102 includes an overall dimensional height 110 and an overall dimensional width 112. For example, the height 110 may be approximately between 10.9 millimeters and 12.9 millimeters and the width 112 may be approximately between 7.9 millimeters and 9.1 millimeters. More specifically, the height 110 of the body 102 is approximately 12.3 millimeters and the width 112 of the body 102 is approximately 8.8 millimeters.

As shown in FIG. 1A, the body 102 of the illustrated example includes a generally rectangular shape defining a first surface 114. As shown in the illustrated example of FIG. 1A, the first surface 114 of the body 102 is defined by peripheral edges 116. In particular, the first surface 114 is defined by a first edge 118a (e.g., a left edge), a second edge 118b (e.g., an upper edge), a third edge 118c (e.g., a right edge), and a fourth edge 118d (e.g., a bottom edge). The second edge 118b is positioned opposite the fourth edge 118d relative to the body 102 and the first edge 118a is positioned opposite the third edge 118c relative to the body 102. The second and fourth edges 118b and 118d are disposed between the first and third edges 118a and 118c, and the second and fourth edges 118b and 118d are substantially perpendicular to the first and third edges 118a and 118c. As shown, the first and third edges 118a and 118c are substantially parallel relative to each other and the second and fourth edges 118b and 118d are substantially parallel relative to each other.

As shown in FIGS. 1A and 1B, to facilitate insertion of the UICC 100 in an input device or terminal (e.g., a card reader), each of the peripheral edges 116 may include a lead-in feature 120. As shown in FIGS. 1A and 1B, the lead-in feature 120 includes rounded corners each having a radius R1. For example, the radius R1 of the illustrated example may be between 0.65 and 0.9 millimeters. In addition, to facilitate proper orientation of the UICC 100 relative to an input device or card reader, the example UICC 100 may employ a chamfer or tapered edge 122.

To communicate with a host, the example UICC 100 includes an integrated circuit 124 (e.g., an IC) shown in FIG. 1B. For example, the UICC 100 may include a microprocessor to communicate with a host via, for example, an input device or terminal. To communicatively couple the integrated circuit 124 of the UICC 100 to an electronic device, the UICC of the illustrated example includes a contact pad 126 positioned, formed and/or supported on the surface 114 of the body 102. The contact pad 126 of the illustrated example may include a plurality of electrical contacts or contact areas 10 accessible via the surface 114 of the body 102. Further, the contact pad 126 may be spaced from the perimeter edges 116 of the body 102 by a clearance or distance T1. For example, the distance T1 may be approximately between 0.1 and 0.4 millimeters. For example, a perimeter 126a of the contact pad 126 of the illustrated example may be spaced relative to the respective perimeter edges 116 by at least 0.1 millimeter.

To prevent a metal housing portion of an input device from electrically damaging (e.g., shorting) the electrical contacts 10 adjacent the third edge 118c when the UICC 100 is inserted into an input device in the orientation of arrow A, the example UICC 100 may include a buffer area 130 between the third edge 118c and an edge 132 of each of the electrical contacts 10. In other words, the electrical contacts 10 may be offset relative to the third edge 118c by an offset distance V1. For example, the offset distance V1 may be between approximately 0.2 millimeters and 1.75 millimeters. In other examples, the example UICC 100 may be inserted in an input device in the orientation of arrow C.

Additionally or alternatively, to prevent a metal housing portion of an input device from electrically damaging (e.g., shorting) the electrical contacts 10 adjacent the first edge 118a when the UICC 100 is inserted into the input device in the direction of arrow B, the example UICC 100 includes another buffer area 134 between the first edge 118a and an edge 136 of each of the electrical contacts 10. In other words, the electrical contacts 10 may be offset relative to the first edge 118a by an offset distance V2. For example, the offset distance V2 may be between approximately 0.2 millimeters and 1.75 millimeters. Further, in this example, the rounded corners 120 of the body 102 help maintain a substantially consistent or relatively even buffer area 130 and/or 134 adjacent the corners of the body 102. Additionally or alternatively, the example electrical contacts 10 may be offset relative to the second edge 118b by an offset distance D1 and the electrical contacts 10 may be offset relative to the fourth edge 118d by a distance D2. In particular, the offset distances D1 and D2 may be approximately between 0.2 millimeters and 1.2 millimeters.

The example contact pad 126 enables a modular UICC 100 by providing a plurality of electrical contact 10 that may define a plurality of different electrical contact patterns. For example, the electrical contacts 10 positioned on the contact pad 126 of the illustrated example provide at least a first electrical contact pattern or layout 140 and a second electrical contact pattern or layout 142. More specifically, the first electrical contact pattern 140 may include a first plurality of electrical contacts 128a-f and the second electrical contact pattern 142 may include a second plurality of electrical contacts 128a-c and 128g-h. In the illustrated example of FIG. 1A, the first electrical contact pattern is defined by one or more of the electrical contacts 128a-c, 128f-j and the second electrical contact pattern is defined by one or more of the electrical contacts 128a-c and 128d-e. Thus, the first electrical contact pattern 140 may be defined by one or more electrical contacts 10 defining of the second electrical contact pattern 142 and/or the second electrical contact pattern 142 may be defined by one or more of the electrical contacts 10 defining the first electrical contact pattern 140. Thus, the second electrical contact pattern 142 may cover a significantly smaller surface area of the surface 114 of the UICC 100 than a surface area of the first electrical contact pattern 140. Alternatively, although not shown, the electrical contacts 10 may be positioned on the contact pad 126 such that the electrical contacts 10 defining the first electrical contact pattern 140 do not define at least part of the second electrical contact pattern 142. Additionally or alternatively, the electrical contacts 10 may be configured to define a third electrical contact pattern 143. For example, any one of the electrical contacts 128a-f defining the first electrical contact pattern 140 and/or any one of the electrical contacts 128a-c and 128g-h defining the second electrical contact pattern 142 may configured with another electrical contact 128z to define the third electrical contact pattern 143. As shown in the illustrated example, the electrical contacts 128b, 128c, 128g, 128h and 128z may define the third electrical contact pattern 143. Thus, the example electrical contacts 10 may be positioned or oriented on the contact pad 126 in any suitable and/or desirable manner to provide a plurality of different electrical contact patterns.

Further, the example electrical contacts 10 of the example electrical contact patterns 140 and 142 may be arranged or configured in different rows relative to the surface 114 of the body 102 between the second and fourth edges 118b and 118d. For example, the electrical contacts 128a-c are positioned in a first row 144, the electrical contacts 128g and 128h are positioned in a second row 146 and the electrical contacts 128d-f are positioned in a third row 148. Additionally or alternatively, one or more electrical contacts 128a-c of first row 144 may be staggered or positioned in an offset relationship relative to the one or more electrical contacts 128g and 128h of the second row 146. Further, one or more electrical contacts 128a-c of the first row 144 may be substantially aligned with one or more of the electrical contacts 128d-f of the third row 148. Additionally or alternatively, in some examples, one or more electrical contacts 128a-h of the first and second electrical contact patterns 140 and 142 may be electrically isolated and/or one or more of the electrical contacts 128a-h of the first and second electrical contact patterns 140 and 142 may be electrically connected or coupled.

The electrical contacts disclosed herein of the illustrated example may employ electrical contacts in accordance with certain classifications or property characteristics associated with international standards and/or any other standards. For example, the electrical contacts of the example UICC 100 include classifications symbols, lettering or tags for electrical contact properties commonly known as C1-C8 by the international standards provided by, for example, the European Telecommunications Standards Institute (ETSI) and the International Standard Organization (ISO). For illustrative purposes, a classification or characteristic of the electrical contacts 128a-g defined by the example the first and second electrical contact patterns 140 and 142 shown in the illustrated examples of FIG. 1A and FIG. 1B may be in accordance with the classifications provided by standards ISO/IEC 7816-2 and 7816-3 and/or ETSI TS 102 221.

For example, one or more of the first and second electrical contact patterns 140 and 142 of the UICC 100 may employ electrical contacts configured as a supply voltage contact C1, a reset contact C2, a clock contact C3, a first auxiliary contact C4, a ground contact C5, a single-wire protocol contact C6 (e.g., (SWP) for Near-Field Communication (NFC) or proximity transactions), an input/output contact C7, and a second auxiliary contact C8. In some examples, the electrical contacts C4 and C8 can implement a high speed USB interface between the UICC and the host or terminal. The single-wire protocol contact C6 and/or the first and second auxiliary contacts C4 and C8 are optional and may be omitted. In other examples, the example UICC 100 may employ any other type of electrical contacts other than those described or represented by electrical contacts C1-C8.

Each of the example UICCs 200, 600, 1100, 1400, 1900, 2200, 2400, 2500, 2600 and 2700 disclosed herein can employ similar electrical contact classifications described in connection with the UICC 100 of FIGS. 1A and 1B. Such classifications of electrical contacts are provided as examples, and the electrical contact classification, properties and/or characteristics may vary from the classifications shown in the example UICCs 100, 200, 600, 1100, 1400, 1900, 2200, 2400, 2500, 2600 and 2700.

Additionally or alternatively, a classification of a particular electrical contact of the example UICCs 100, 200, 600, 1100, 1400, 1900, 2200, 2400, 2500, 2600 and 2700 can be repositioned in alternate positions or configurations. Additionally or alternatively, one or more of the electrical contacts of the example UICCs 100, 200, 600, 1100, 1400, 1900, 2200, 2400, 2500, 2600 and 2700 may be omitted. For example, the auxiliary contacts C4 and C8 may be omitted in any one of the example UICCs 100, 200, 600, 1100, 1400, 1900, 2200, 2400, 2500, 2600 and 2700. Additionally or alternatively, the electrical contacts may include different contacts other than the electrical contacts associated with the standards classifications C1-C8 as described above. Further, in some examples, any one of the electrical contacts C1-C8 shown in the example UICCs 100, 200, 600, 1100, 1400, 1900, 2200, 2400, 2500, 2600 and 2700 may be omitted, repositioned, substituted and/or replaced with another electrical contact.

Further, the example features, dimensional profiles and/or shape of the body 102 described above in connection with FIGS. 1A and 1B may be employed with the example UICCs 200, 600, 1100, 1400, 1900, 2200, 2400, 2500, 2600 and 2700 shown in respective FIGS. 2-22, FIG. 23A, FIG. 23B and FIGS. 24-28 and, thus, will not be repeated in connection with the description of those examples. For example, the example UICCs 200, 600, 1100, 1400, 1900, 2200, 2400, 2500, 2600 and 2700 may each include a body (e.g., the body 102) having a surface (e.g., 126) to receive, form, support or surround an electrical contact pad or electrical contacts (e.g., electrical contacts 10).

Figure 2:
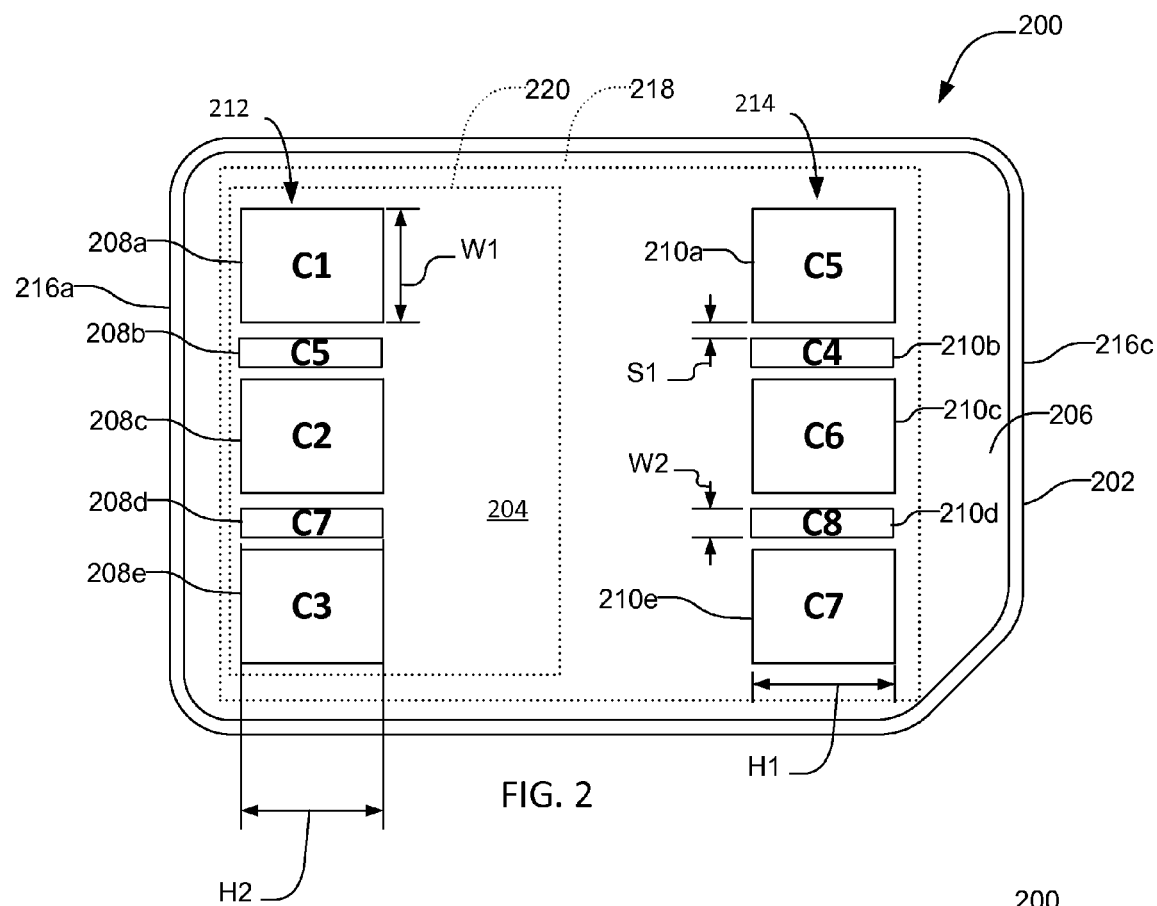
FIG. 2 illustrates another example UICC in accordance with the teachings described herein.

FIG. 2 illustrates another example UICC 200 disclosed herein. The example UICC 200 includes a body 202 defining a surface 204 to support a contact pad 206. The contact pad 206 of the illustrated example includes a plurality of electrical contacts 208a-e and a plurality of electrical contacts 210a-e. More specifically, in this example, the electrical contacts 208a-e and 210a-e are substantially aligned relative to each other in a grid-like orientation or configuration. In particular, the electrical contacts 208a-e are positioned in a first row 212 of electrical contacts and the electrical contacts 210a-e are positioned in a second row 214 of electrical contacts. The first row 212 of electrical contacts 208a-e is positioned adjacent an edge 216a (e.g., a left edge in the orientation of FIG. 2) of the body 202 and the second row 214 electrical contacts 210a-e is positioned adjacent an edge 216c (e.g., a right edge in the orientation) of the body 202. More specifically, the electrical contacts 208a-e and 210a-e of both the first and second rows 212 and 214 define a first electrical contact pattern 218 and the electrical contacts 208a-e of only the first row 212 defines the second electrical contact pattern 220.

Additionally, the electrical contacts 208a, 208c, 208e, 210a, 210c and 210e of the respective first and second rows 212 and 214 provide a larger dimensional foot print (e.g., are larger electrical contacts) compared to a dimensional footprint of the electrical contacts 208b and 208d of the first row 212 and the electrical contacts 210b and 210d of the second row 214 (e.g., smaller sized electrical contacts). Additionally, the example contact pad 206 of FIG. 2 employs a plurality of larger sized electrical contacts (e.g., 208a, 208c, 208e, 210a, 210c, and 210e) having a dimensional footprint that is greater than a dimensional footprint of a plurality of smaller sized electrical contacts (e.g., the contacts 208b, 208d, 210b and 210d). As shown in FIG. 2, electrical contacts having the smaller dimensional footprint are positioned between respective larger sized electrical contacts. For example, the smaller sized electrical contacts 208b and 208d in the first row 212 are positioned between the larger sized electrical contacts 208a, 208c and 208d, respectively, and the smaller sized electrical contacts 210b and 210d in the second row 214 are positioned between the larger electrical contacts 210a, 210c and 210d, respectively. However, in other examples, one or more of the larger sized electrical contacts may be positioned between smaller sized electrical contacts in the first and/or second electrical rows.

As shown in the example of FIG. 2, each of the electrical contacts 208a-e and 210a-e of the illustrated example has a rectangular shape. More specifically, each of the larger electrical contacts 208a, 208c, 208e, 210a, 210c and 210e has a width W1 and a height H1. In this example, the width W1 is approximately between 1.5 and 2.5 millimeters and the height H1 is approximately between 1.8 and 2.8 millimeters. Additionally, each of the smaller electrical contacts 208b, 208d, 210b and 210d has a width W2 and a height H2. In this example, the width W2 is approximately between 0.6 and 0.9 millimeters and the height H2 is approximately between 1.8 and 2.8 millimeters. However, in other examples, each of the larger and/or smaller electrical contacts may have different sized respective heights H1 and H2 and/or widths W1 and W2, and/or each of the smaller and larger sized contacts may have a square shape, rounded corners and/or any other suitable shape or configuration or any combination thereof. In addition, the electrical contacts 208a-e and 210a-e are equally spaced-apart by a distance S1. In the illustrated example, the distance S1 is approximately between 0.1 and 0.3 millimeters.

In the illustrated example, the first row 212 of electrical contacts 208a-210e includes a voltage contact C1, a reset contact C2, a clock contact C3, a ground contact C5, and an input/output contact C7. For example, as shown, the voltage contact C1 is positioned adjacent the first edge 216a, the ground contact C5 is positioned adjacent the voltage contact C1, the reset contact C2 is positioned adjacent the ground contact C5, the input/output contact is positioned adjacent the reset contact C2, and the clock contact C3 is positioned adjacent the input/output contact C7. Further still, the voltage contact C1, the reset contact C2 and the clock contact C3 are configured as the larger electrical contacts 208a, 208c and 208e, respectively, and the ground contact C5 and the input/output contact C7 are configured as the smaller sized electrical contacts 208b and 208d, respectively. However, in other examples, anyone of the contacts C1, C2 and C3 can be configured as a smaller electrical contact and/or any one of the contacts C5 and C7 can be configured as a larger electrical contact. Further, the order of the contacts C1, C5, C2, C3, C7 and C7 is not limited to the order shown in the example of FIG. 1A and, thus, the contacts C1, C5, C2, C3, C7 and C7 may be positioned on the contact pad 206 in any suitable order or position relative to each other.

In the illustrated example, the second row 214 of electrical contacts 210a-e includes a first auxiliary contact C4, the ground contact C5, a single wire protocol contact C6, the input/output contact C7, and a second auxiliary contact C8. Thus, the contact pad 126 of FIG. 2 includes two ground contacts C5, and two input/output contacts C7. In this manner, each of the first and second rows 212 and 214 includes the ground contacts C5, and the input/output contacts C7.

For example, as shown, the ground contact C5, is positioned adjacent an 216b and/or an edge 216c, the first auxiliary contact C4 is positioned adjacent the ground contact C5, the single wire protocol contact C6 is positioned adjacent the first auxiliary contact C4, the second auxiliary contact C8 is positioned adjacent the single wire protocol contact C6, and the input/output contact C7 is positioned adjacent the second auxiliary contact C8. Further still, the ground contact C5, the single wire protocol contact C6 and the input/output contact C7 are configured as the larger electrical contacts 210a, 210c and 210e, respectively, and the first and second auxiliary contacts C4 and C8 are configured as the smaller sized electrical contacts 210b and 210d, respectively. However, in other examples, anyone of the electrical contacts C5, C6 and C7 in the second row 214 can be configured as a smaller electrical contact and/or any one of the electrical contacts C4 and C8 can be configured as a larger electrical contact. Further, the order of the contacts C5, C4, C6, C8 and C7 is not limited to the order shown in the example of FIG. 2 and, thus, the electrical contacts C5, C4, C6, C8 and C7 may be positioned on the contact pad 206 in any suitable order relative to each other.

Figure 3:
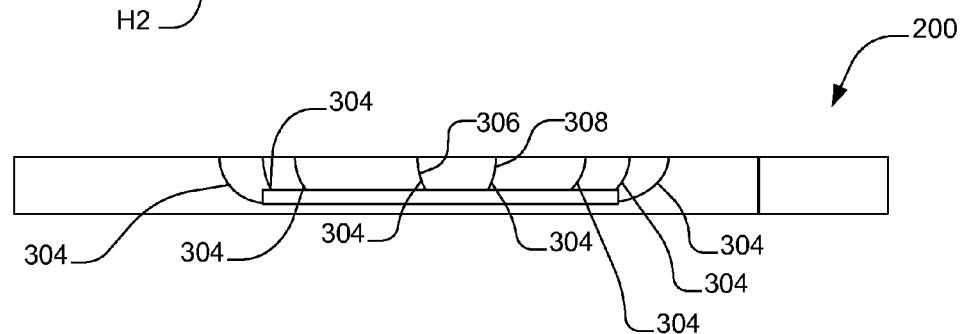
FIG. 3 is a side view of the example UICC of FIG. 2.

FIG. 3 is a side view of the example UICC 200 of FIG. 2. Referring to FIG. 3, the plurality of electrical contacts 208a-e and 210*a-e* are electrically coupled to an integrated circuit 302 via a plurality of wires, traces and/or a bus 304. The integrated circuit 302 may provide a central processor unit (CPU), volatile memory (RAM), non-volatile memory (ROM), etc. The supply voltage contact C1 supplies the integrated circuit 302 with electricity, the ground contact C5, grounds the integrated circuit 302, the reset contact C2 resets the integrated circuit 302, the clock contact C3 provides a clock signal or timing reference, and the input/output contact C7 enables performance of data input and/or output. The optional single-wire protocol contact C6 enables contactless or wireless communication with a remote terminal or host via an NFC controller. The optional auxiliary contacts C4 and C8 enable the UICC 200 to be coupled to, for example, Universal Serial Bus (USB) interfaces.

Further, the first and second electrical contact patterns 218 and 220 may be coupled to an integrated circuit chip 304 of the UICC 200 without the use of additional wires or contacts (e.g., wire bonds) compared to current conforming UICCs. In other words, although the example UICC 200 employs first and second electrical contact patterns 218 and 220 that may each include common contacts C5, and C7, a single wire bond may be employed to connect a single conductive surface area that covers the location of both the common electrical contacts to the integrated circuit 302. Thus, only one wire bond 306 is needed to communicatively couple the C5, electrical contact 208*b* in the first row 212 and the common C5, electrical contact 210*a* in the second row 214 to the integrated circuit chip 302. Likewise, only one wire bond 308 is needed to communicatively couple the C7 electrical contact 208*d* in the first row 212 and the common C7 electrical contact 210*e* in the second row 214 to the integrated circuit chip 302.

Figure 4:
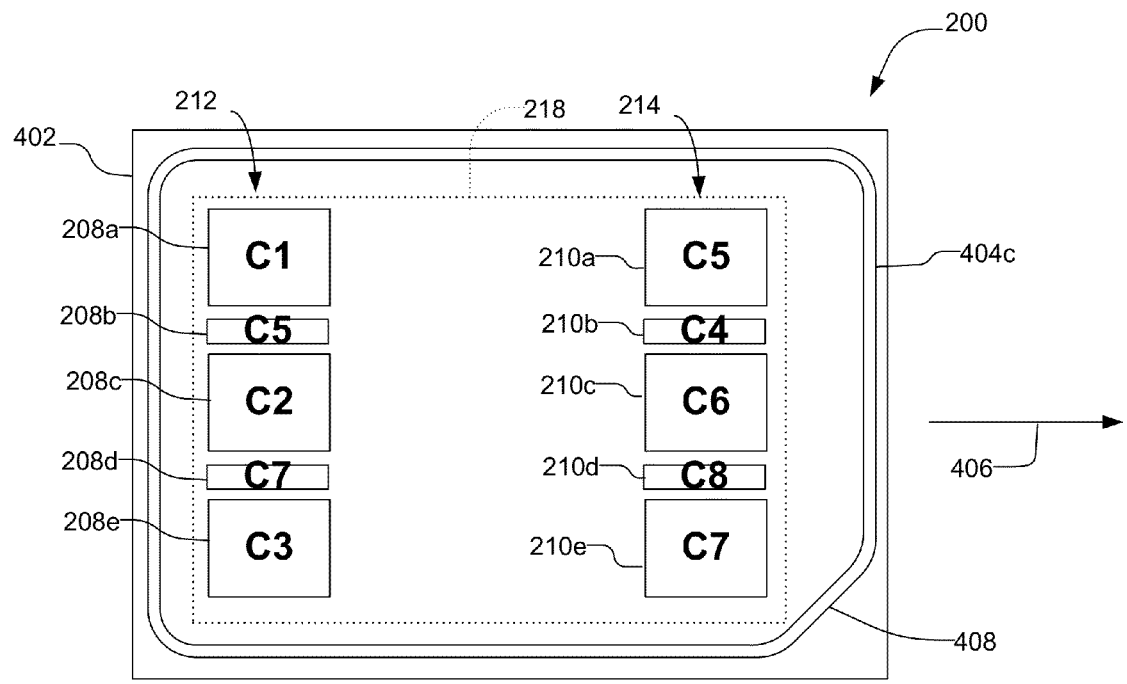
FIG. 4 illustrates the example UICC of FIG. 2 and FIG. 3 relative to a first example input device.

FIG. 4 illustrates the example UICC 200 of FIGS. 2 and 3 relative to a first input device or card reader 402. Generally, the input device 402 enables communication between the UICC 200 and a host such as, for example, a computer, a point of sale terminal, a remote terminal, a mobile device, etc. In addition, the input device 402 provides power to the UICC 200 or the integrated circuit 302 and also performs protocol conversation and/or reformats data for use by the UICC 200. In particular, the UICC 200 shown in FIG. 2 is inserted in an opening or cavity of the input device 402 with a leading edge 404*c* (e.g., a right edge in the orientation of FIG. 4) of the body 202 oriented in a direction represented by arrow 406. Further, the chamfer 408 may provide a guide or orientation marker to facilitate determination of the proper orientation when inserting the UICC 200 in the input device 402.

More specifically, the input device 402 is adapted to communicate or read the UICC 200 based on any combination of contacts in contact pattern 218 that provide the required functionality. In particular, the input device 402 may be configured to engage or communicate with the electrical contacts 208*a*, 208*c*, 208*e*, 210*a*, 210*c* and 210*e*. In other words, the input device 402 may be configured to communicate or read the larger sized electrical contacts positioned in the first and second rows 212 and 214. In the illustrated example, the larger sized electrical contacts include classifications C1, C2, C3, C5, C6 and C7. Alternatively, the input device 402 may be configured to communicate or read only the electrical contacts 208*a*, 208*c*, 208*e*, 210*a* and 210*e*. For example, the input device 402 may be configured to communicate with the electrical contacts associated with classifications contacts C1, C2, C3, C5, and C7, thereby omitting the optional contact C6 (e.g. the single wire protocol). In yet other examples, in addition to communicating with the electrical contacts 208*a*, 208*c*, 208*e*, 210*a*, 210*c* and 210*e* associated with the respective classifications C1, C2, C3, C5, C6 and C7, the input device 218 may be configured to communicate with the smaller sized electrical contacts 210*b* and 210*d* positioned in the in the second row 214 that are associated with the C4 and C8 classification, respectively. Thus, the input device 402 may optionally be configured to communicate or engage the contacts C4, C6 and/or C8 positioned in the second row 214. To that end, if the input device 402 is configured to read conforming electrical contact layouts, the first electrical contact pattern 218 employing the electrical contacts 208*a*, 208*c* and 208*e* associated with the C1, C2, and C3 contacts in the first row 212 and electrical contacts 210*a* and 210*e* associated with the C5, and C7 contacts in the second row 214 may conform the UICC 200 according to current electrical contact standards.

Figure 5:
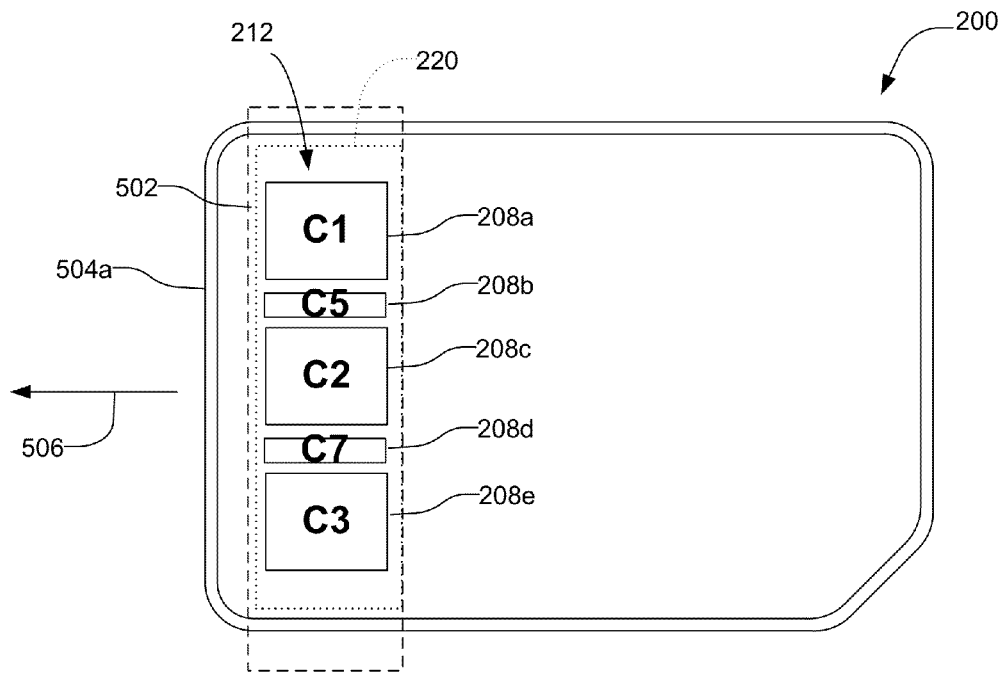
FIG. 5 illustrates the example UICC of FIGS. 2-4 relative to a second example input device.

FIG. 5 illustrates the example UICC 200 of FIG. 2 and FIG. 3 positioned relative to a second input device or card reader 502. The UICC 200 shown in FIG. 5 may be inserted in an opening of the second input device 502 with a leading edge 504*a* (e.g., the first edge) of the body 202 in a direction represented by arrow 506.

More specifically, the input device 502 is adapted to communicate or read the UICC 200 based on the second electrical contact pattern 212. In particular, the input device 502 may be configured to engage or communicate only with the electrical contacts C1, C5, C2, C7 and C3 positioned in the first row 212 of electrical contacts 208*a-e*. For clarity, the second row 214 of electrical contacts 210*a-e* is not shown in FIG. 5. Thus, in the illustrated example, the first row 212 of electrical contacts 208*a-e* contains five mandatory contacts (C1, C2, C3, C5, and C7) in accordance with the above-referenced international standards and provides a single-row configuration.

As a result, the second electrical contact pattern 212 enables an electronic device to employ the input device 502 such as, for example, a header or block-style card reader having a significantly smaller dimensional envelope and thereby significantly reducing an overall dimensional footprint of the electronic device.

Figure 6:
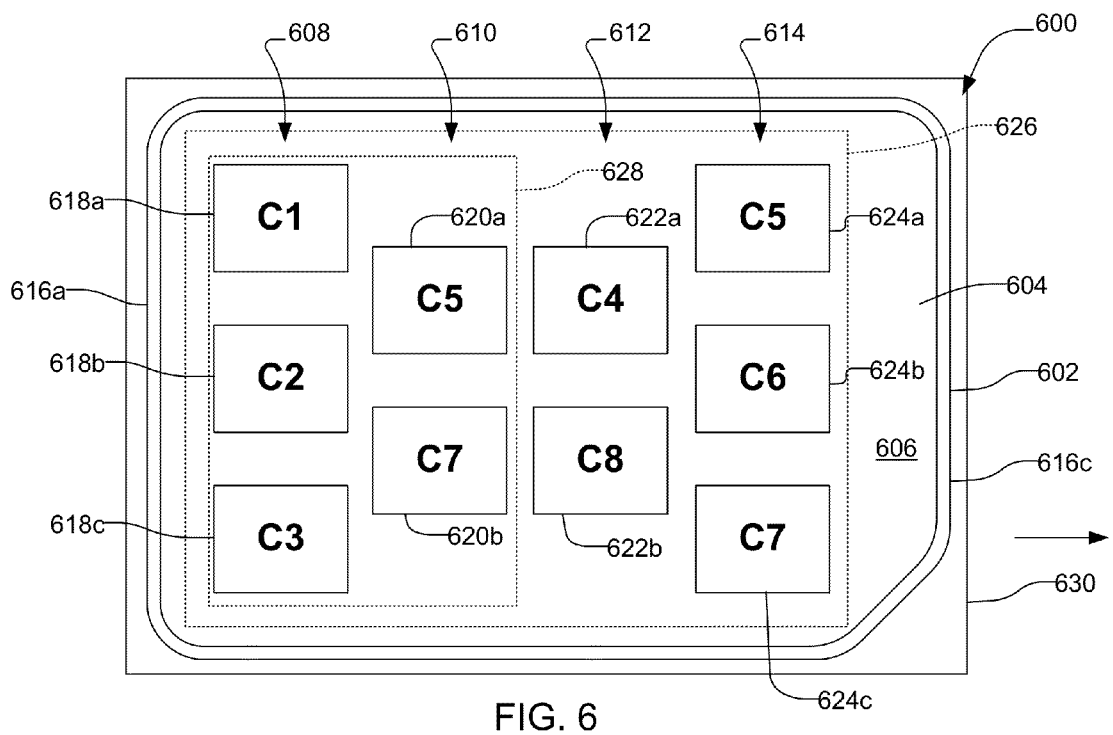
FIG. 6 illustrates another example UICC in accordance with the teachings described herein adaptable for use with an example input device.

FIG. 6 illustrates another example UICC 600 disclosed herein. As shown in FIG. 6, the UICC 600 defines a body 602 having a contact pad 604 supported on a surface 606 of the body 602. The contact pad 604 includes a plurality of electrical contacts 10 arranged or configured in a plurality of rows 608, 610, 612 and 614. For example, the first row 610 is positioned adjacent an edge 616*a* of the body 602, the second row 610 is positioned between the first row 608 and the third row 612, and the fourth row 614 is positioned between the third row 612 and an edge 616*c* of the body 602. More specifically, the first row 608 defines electrical contacts 616*a-c*, the second row 610 defines electrical contacts 620*a-b*, the third row defines 612 defines electrical contacts 622*a-b* and the fourth row 614 defines electrical contacts 624*a-c*.

In the orientation of FIG. 6, the electrical contacts 618*a-c* and 620*a-b* in the respective first and second rows 608 and 610 are positioned in an offset relationship relative to each other and the electrical contacts 622*a-b* and 624*a-c* in the respective third and fourth rows 612 and 614 are positioned in an offset relationship relative to each other. In other words, electrical contacts 618*a-c* and 624*a-c* in the respective first and fourth rows 608 and 614 are substantially aligned and the electrical contacts 622*a-b* and 622*a-b* in the respective second and third rows 610 and 612 are substantially aligned.

The contact pad 604 defines a first electrical contact pattern or layout 626 and a second electrical contact pattern or layout 628. In particular, the first electrical contact pattern 626 is defined by the electrical contacts having classifications C1-C8 provided by the electrical contacts 618*a-c* of the first row 608, the electrical contacts 622*a-b* of the third row 612 and the electrical contacts 624*a-c* of the fourth row 614. The second electrical contact pattern 628 can include electrical contacts having classifications C1-C3, C5, and C7 provided by the electrical contacts 618a-c in the first row 608 and the electrical contacts 622a-b provided in the second row 610.

In the illustrated example, the electrical contacts 618a-c in the first row 608 provide a voltage contact C1, a reset contact C2, and a clock contact C3, respectively. As shown, the reset contact C2 is disposed between the voltage contact C1 and the clock contact C3. The electrical contacts 622a-b in the second row 610 provide a ground contact C5, and an input/output contact C7, respectively. The electrical contacts 622a-b of the third row 612 provide first and second auxiliary contacts C4 and C8, respectively. The electrical contacts 624a-c of the fourth row 614 provide a ground contact C5, a single wire protocol contact C6 and an input/output contact C7, respectively. As shown in the illustrated example, the single wire protocol contact C6 is positioned between the ground contact C5, and the input/output contact C7 in the fourth row 614. Thus, the contact pad 604 of FIG. 4 includes a ground contact C5, in each of the second and fourth rows 610 and 614 and input/output contacts C7 in each of the second and fourth rows 610 and 614.

As shown in FIG. 6, the first electrical contact pattern 626 may be defined by one or more electrical contacts C1, C2, C3, C4, C8, C5, C6 and C7 positioned in the respective first, third and fourth rows 608, 612 and 614. For example, a first input device 630 may be configured to read the electrical contacts 618a-c (e.g., C1, C2, C3) in the first row 608 and the electrical contacts 624a and 624c (e.g., C5, and C7) in the fourth row 614. Additionally or alternatively, in some examples, the first input device 630 may also be configured to read the electrical contact 624b (e.g., C6) in the fourth row 614 and/or the electrical contacts 622a-b (e.g., C4 and C8) in the third row 612. The electrical contacts 618a-c in the first row 608 and the electrical contacts 624a-c in the fourth row 614 may be positioned on the surface 604 of the body 602 and relative to perimeter edges 632 in accordance with current conforming standards. In this manner, an input device (e.g., the input device 630) configured to receive a conforming electrical contact pattern can communicate or read the first electrical contact pattern 626.

Figure 7:
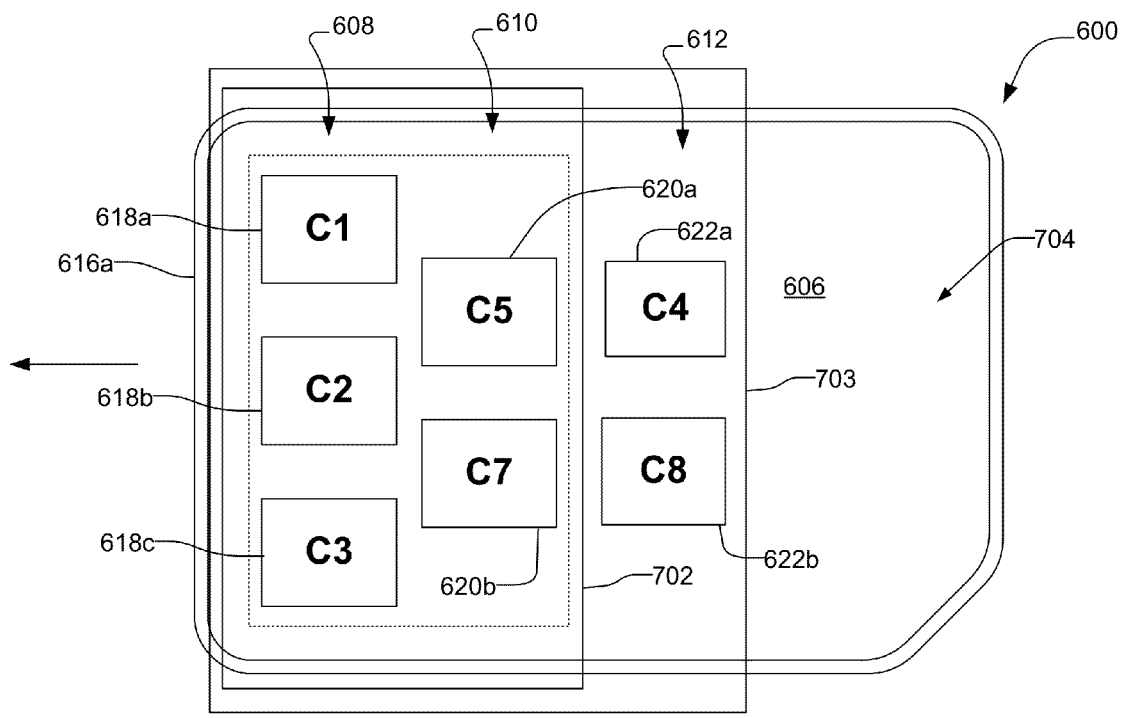
FIG. 7 illustrates the example UICC of FIG. 6 adaptable for use with another example input device.

FIG. 7 illustrates the example UICC 600 of FIG. 6 positioned relative to another input device or card reader 702. More specifically, the input device 702 is adapted to communicate or read the UICC 600 based on the second electrical contact pattern 628. For clarity, the third and fourth rows 612 and 614 are not shown in FIG. 7. In particular, the input device 702 may be configured to engage or communicate with the electrical contacts 618a-c and 620a-b positioned in the respective first and second rows 608 and 618. In the illustrated example, the input device 702 may communicate or read classification contacts C1, C2, C3, C5, and C7.

As a result of the second electrical contact pattern 628, an electronic device may employ an input device having a significantly smaller dimensional envelope to significantly reduce an overall dimensional footprint of the electronic device. For example, an input device (e.g., the input device 702) having approximately half a length and/or area of the surface 606 of the UICC 600 can interface with the UICC 600. Further, for example, a portion 704 (e.g., approximately half the length) of the UICC 600, not engaged by the input device 702, may be exposed relative to the input device 702 to provide a pick out feature. A pick out feature 704 may facilitate removal of the UICC 600 relative to the input device 702. Further, because the second electrical contact pattern 628 covers a smaller surface area (e.g., approximately half the surface area) of the UICC 600, a structure or bracket (e.g., that may be positioned over a surface of the UICC 600) to apply a force to spring contacts of the input device 702 can have a substantially smaller footprint or envelope compared to, for example, a similar structure or bracket employed in known push-push readers that conform to current standards.

Additionally or alternatively, as shown in FIG. 7, the example UICC 600 of FIG. 6 can interface with yet another input device or card reader 703. More specifically, the input device 703 is adapted to communicate or read the UICC 600 based on the second electrical contact pattern 628 and another portion of the first electrical contact pattern 626. In particular, the input device 703 may be configured to engage or communicate with the electrical contacts 618a-c and 620a-b positioned in the respective first and second rows 608 and 618 and the electrical contacts 622a and 622b positioned in the third row 620. In the illustrated example, the input device 703 may communicate or read classification contacts C1, C2, C3, C4, C5, C7 and C8.

Figure 8:
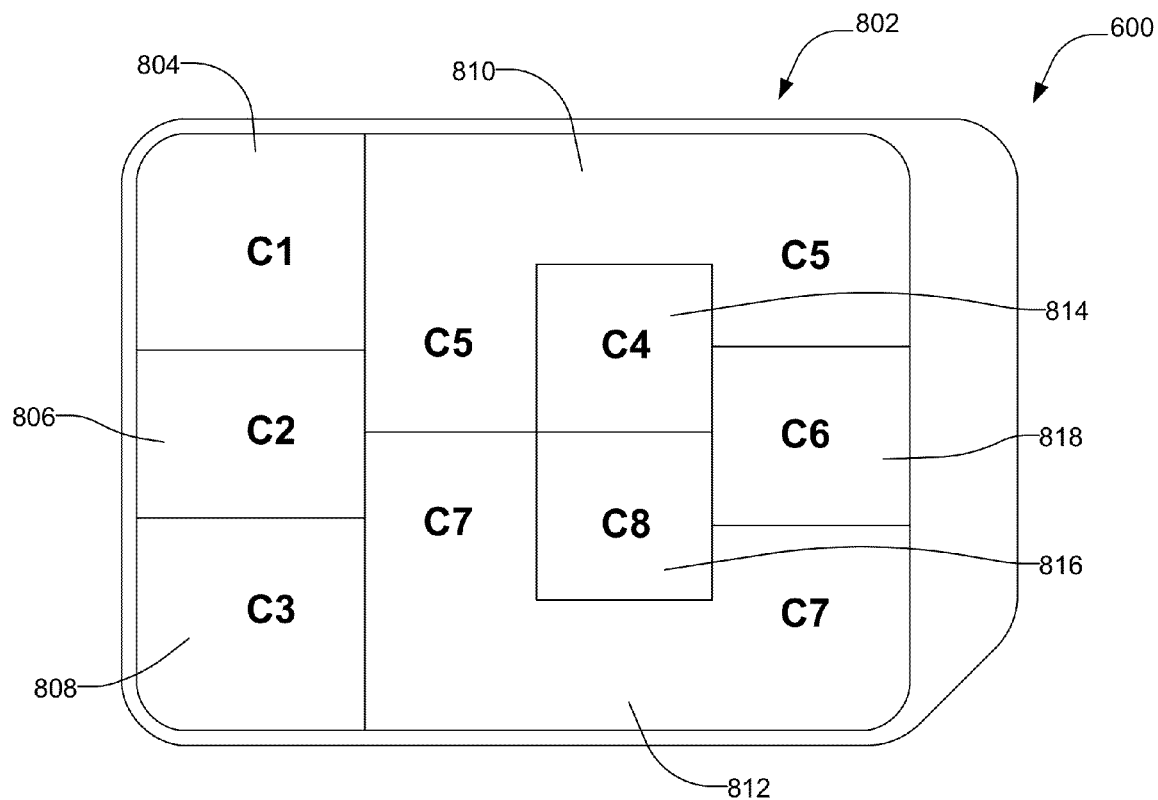
FIG. 8 illustrates an example electrical connection pattern of the example UICC of FIG. 6 and FIG. 7.
Figure 9:
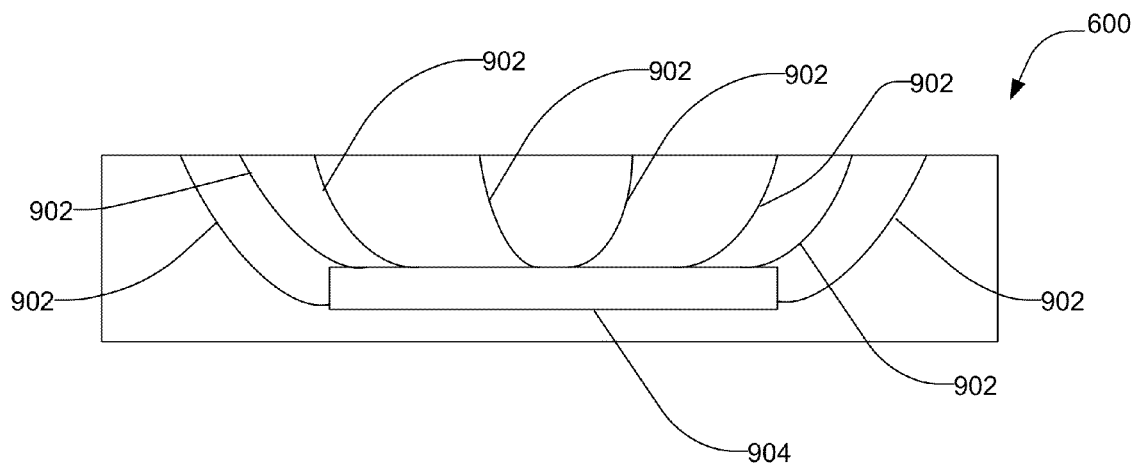
FIG. 9 is a side view of the example UICC of FIGS. 6-8.

FIG. 8 illustrates an example electrical connection pattern 802 to electrically couple the electrical contacts 618a-c, 620a-b, 622a-b and 624a-c of the example UICC 600. FIG. 9 is a side view of the example UICC 600 of FIGS. 6-8. Referring to FIG. 8, the electrical contacts 618a-c, 620a-b, 622a-b and 624a-c of the UICC 600 are positioned or oriented on the UICC 600 such that the positioning, pattern and/or placement of the electrical contacts 618a-c, 620a-b, 622a-b and 624a-c relative to the surface 606 enables a single trace or wire (e.g., a large contact surface area) to connect two or more common electrical contacts.

For example, although ten different electrical contact 618a-c, 620a-b, 622a-b and 624a-c (e.g., C1, C2, C3, C4, C5, C5, C6, C7, C7 and C8) are formed on the surface 602 of the UICC 600, only eight electrically isolated traces or surface contact areas 804-818 are required to cover the placement location of the ten electrical contacts 618a-c, 620a-b, 622a-b and 624a-c. For example, in the illustrated example, the C5, contact associated with the electrical contacts 622a and 624a are electrically connected via the first trace or contact surface area 810 and the common electrical contacts 620b and 624c (e.g., C7) are electrically connected via a second trace or contact surface area 812. Since contacts C4 and C8 are defined as optional in current standards, the area around the contacts 622a and 622b may be grounded or remain electrically isolated from the other contacts 618a-c, 620a-b and 624a-c if the example UICC does not implement or support the high speed USB feature. In addition, contact C6 is also defined as optional in current standards, thus, the area around the contact 624b may be grounded or remain electrically isolated from the other mandatory contacts 618a-c, 622a-b, 624a and 624c (e.g., C1, C2, C3, C5, and C7) if the example UICC does not implement or support the SWP NFC capability.

As a result, as shown in FIG. 9, the amount of traces and/or wire bonds 902 needed to couple the electrical contacts 618a-c, 620a-b, 622a-b and 624a-c to an IC chip 904 of the UICC 600 is less than the number of electrical contact placements positioned on the surface 606 of the UICC 600. For example, because the electrical contacts C5, and C7 in the second and fourth rows 610 and 614 are connected via the respective large contact surface areas 810 and 812, only eight wire bonds 902 are needed to couple the IC chip and the electrical contacts placements. Since C4 and C8 are defined as optional in current standards, some embodiments may only require 6 wire bonds 902 connected to (all surface areas 804-812 and 818 except surface areas 814 and 818 associated with contacts C4 and C8). Since contact C6 is also considered optional in current standards, other embodiments may only require 5 wire bonds 902.

Figure 10:
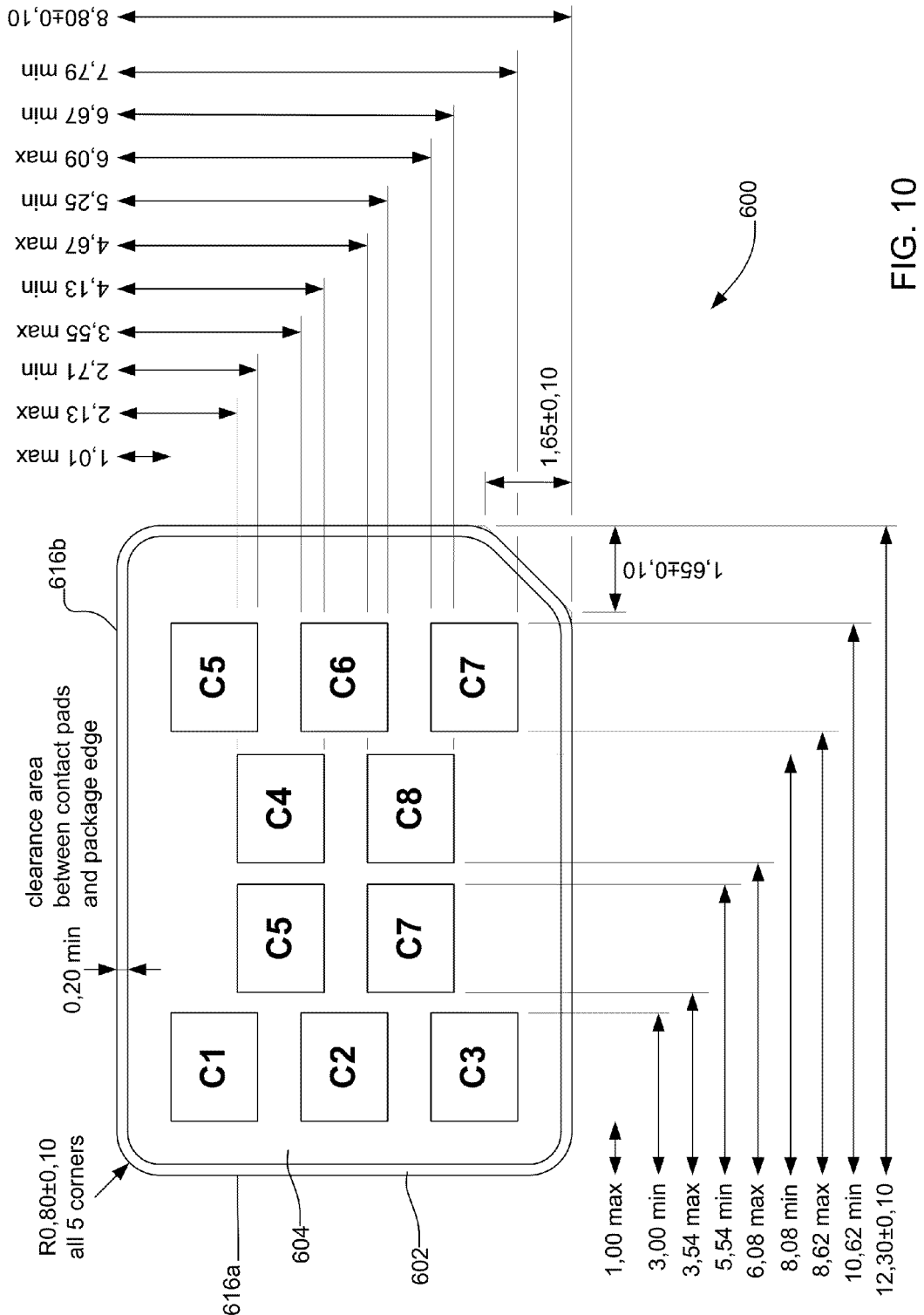
FIG. 10 illustrates example dimensional values of the example UICC of FIGS. 6-9.

FIG. 10 illustrates example dimensional values that may be used to define a dimensional envelope of the body 602 of the example UICC 600 of FIGS. 6-9. Additionally, FIG. 10 illustrates the positioning of the electrical contacts 618a-c, 620a-b, 622a-b and 624a-c on the surface 604 of the UICC 600 in reference to peripheral or perimeter edges 616a and 616b. Additionally or alternatively, the dimensional positions of the electrical contacts 618a-c, 622a-b and 624a-c associated with the first electrical contact pattern 626 may conform to certain standards to enable the UICC 600 to interface with known input devices configured to receive conforming electrical contact patterns. Additionally or alternatively, the dimensional positions of the electrical contacts 618a-c and 620a-b associated with the second electrical contact pattern 628 may not conform to certain standards to enable the UICC 600 to interface with input devices that are configured to receive non-conforming electrical contact patterns. The example dimensional values of the illustrated example are in millimeters and each dimensional value may each have a dimensional tolerance of approximately +/−0.1 millimeters.

Figures 11, 12:
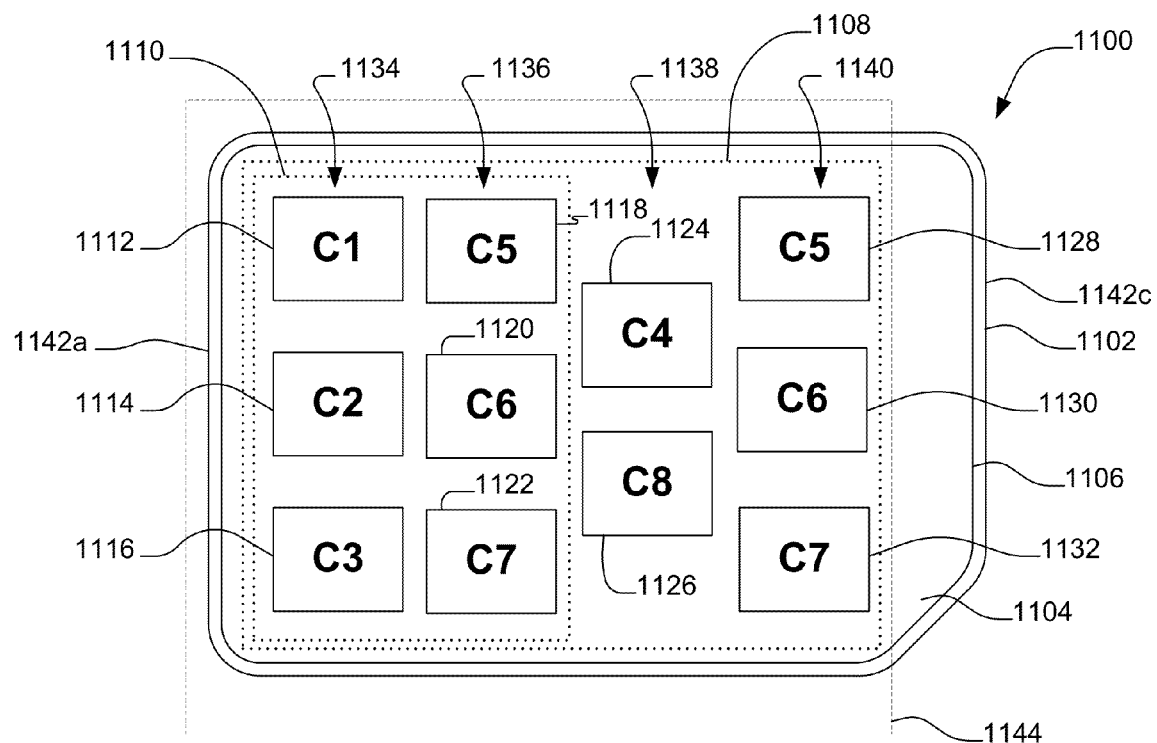
FIG. 11 illustrates another example UICC in accordance with the teachings described herein adaptable for use with an example input device.
FIG. 12 illustrates the example UICC of FIG. 11 adaptable for use with another example input device.

FIG. 11 illustrates another example UICC 1100 disclosed herein. The example UICC 1100 defines a body 1102 having a surface 1104 to support a contact pad 1106 defining a first electrical contact pattern 1108 and a second electrical contact pattern 1110. The first electrical contact pattern 1108 may include electrical contacts 1112-1126 (C1, C2, C3, C5, C7, C6, C4 and C8), and the second electrical contact pattern 1110 may include electrical contacts 1112-1122 (e.g., C1, C2, C3, C5, C6 and C7) and the third electrical contact pattern 1109 may include electrical contacts 1112-1116 and 1124-1132 (e.g., C1, C2, C3, C4, C5, C6, C7 and C8). The pattern of the electrical layouts associated with the first electrical contact pattern 1108 are substantially similar to the electrical contact 618a-c, 620a-b and 624a-c of the example UICC 600 of FIG. 6 and, thus, the description of the electrical contacts 1112-1126.

However, in contrast to the example contact pad 604 of the example UICC 600, the example second electrical contact pattern 1110 includes the electrical contact 1120 associated with the optional C6 contact. More specifically, the electrical contacts 1112-1116 are positioned in a first row 1134, the electrical contacts 1118-1122 are positioned in a second row 1136 adjacent the first row 1134, the electrical contacts 1124-1126 are positioned in a third row 1138 adjacent the second row 1136 and the electrical contacts 1128-1132 are positioned in a fourth row 1140 adjacent the third row 1138

In the orientation of FIG. 4, the first row of electrical contacts is adjacent an edge 1142a, the fourth row 1140 is adjacent an edge 1142c, and the second and third rows 1136 and 1138 are disposed between the first and fourth rows 1134 and 1140. Further, the electrical contacts 1112-1116, 1118-1122 and 1128-1132 in the respective first, second and fourth rows 1134, 1136 and 1140 are substantially aligned relative to each other and the electrical contacts 1124 and 1126 in the third row 1138 are positioned in an offset relationship relative to the electrical contacts 1112-1116, 1118-1122 and 1128-1132. In other words, electrical contacts 1112-1116, 1118-1122 and 1128-1132 in the first, second and fourth rows 1134, 1136 and 1140 are substantially aligned.

In the illustrated example, the first row 1134 includes a reset contact C2 positioned between a voltage contact C1 and a clock contact C3. The second and fourth rows 1136 and 1140 each includes a single-wire protocol contact C6 positioned between a ground contact C5, and an input/output contact C7. The third row 1138 includes first and second auxiliary contacts C4 and C8. Thus, the contact pad of FIG. 11 includes two ground contacts C5, two single-wire protocol contacts C6 and two input/output contacts C7.

As shown in FIG. 11, an input device 1144 may be configured to read the electrical contacts C1, C2 and C3 in the first row 1134 and the electrical contacts C5, and C7 in the fourth row 1140. Additionally or alternatively, in some examples, the input device 1144 may also be configured to read the electrical contact C6 in the fourth row 1140 and/or the electrical contacts C4 and/or C8 in the third row 1138.

FIG. 12 illustrates the example UICC 1100 of FIG. 11 positioned relative to another or second input device or card reader 1202. More specifically, the second input device 1202 is adapted to communicate or read the UICC 1100 based on the second electrical contact pattern 1110. For clarity, the third and fourth rows of electrical contacts are not shown in FIG. 11. In particular, the second input device 1202 may be configured to engage or communicate only with the electrical contacts 1112-1122. In the illustrated example, the second input device 1202 may communicate or read classification contacts C1, C2, C3, C5, and C7. Additionally, the second input device 1202 may be configured to also read the electrical contact 1120 (C6). Thus, in the illustrated example, the electrical contacts 1112-1118 and 1122 contain five mandatory contacts (C1, C2, C3, C5, and C7). Additionally, the electrical contact 1120 may define an optional electrical contact C6.

As a result of the second electrical contact pattern 1110, an electronic device may employ an input device (e.g., the input device 1202) having a significantly smaller dimensional envelope and thereby significantly reducing an overall dimensional footprint of the electronic device. For example, an input device having approximately half a length and/or area of the UICC 1100 can be employed to interface with the UICC 1100. Further, an exposed portion 1204 of the UICC 1100 relative to the input device 1202 may provide a pick-out feature.

Figure 13:
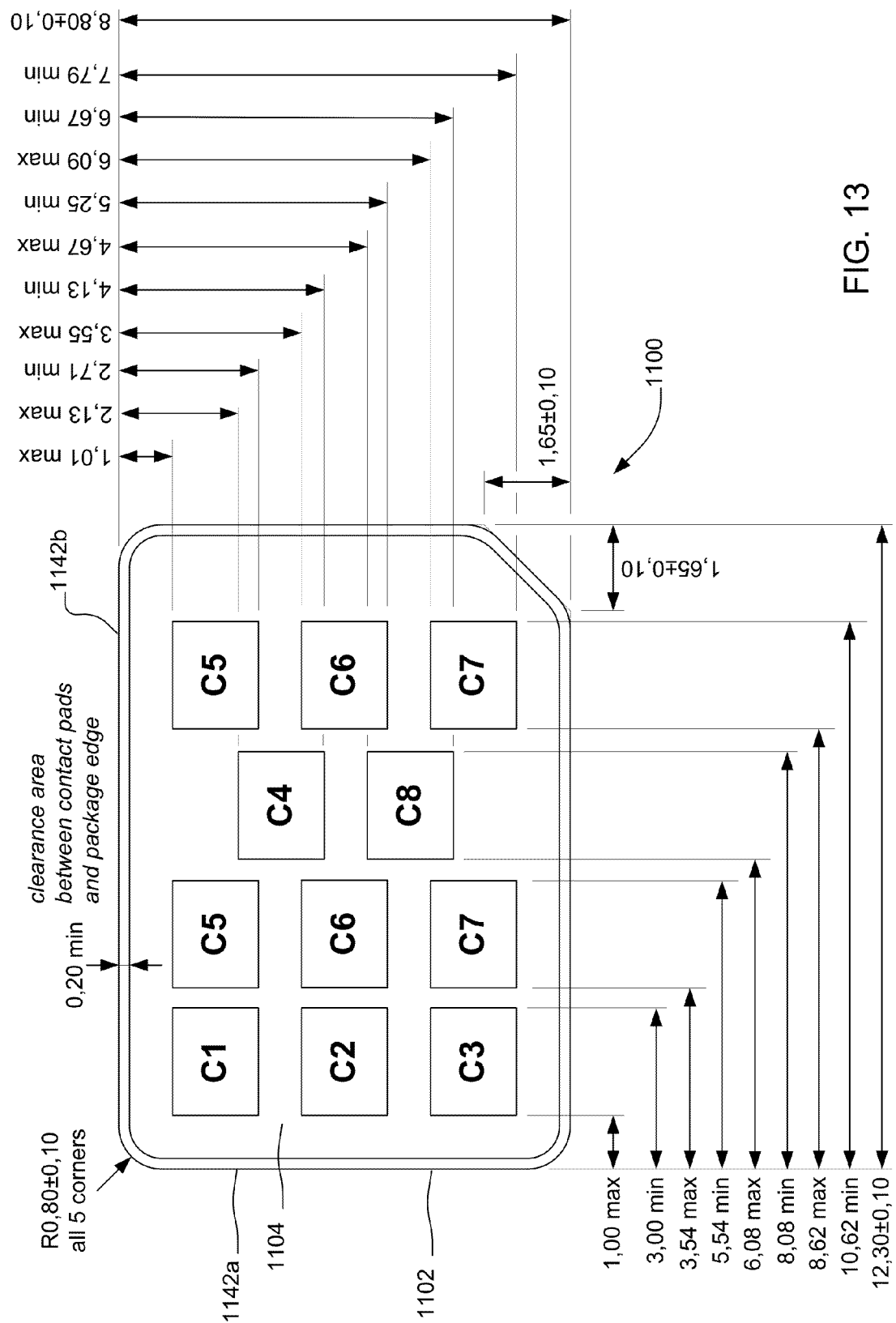
FIG. 13 illustrates example dimensional values of the example UICC of FIG. 11 and FIG. 12.

FIG. 13 illustrates example dimensional values that may be used to define a dimensional envelope of the body 1102 of the example UICC 1100 of FIG. 11 and FIG. 12. Additionally, FIG. 13 illustrates the positioning of the electrical contacts C1-C8 (e.g., the contacts 1112-1132 of FIG. 11) on the surface 1104 of the UICC 1100 in reference to peripheral or perimeter edges 1142a and 1142b defined by the body 1102 of the UICC 1100. The example dimensional values of the illustrated example are in millimeters and each dimensional value may each have a dimensional tolerance of approximately +/−0.1 millimeters.

Figure 14:
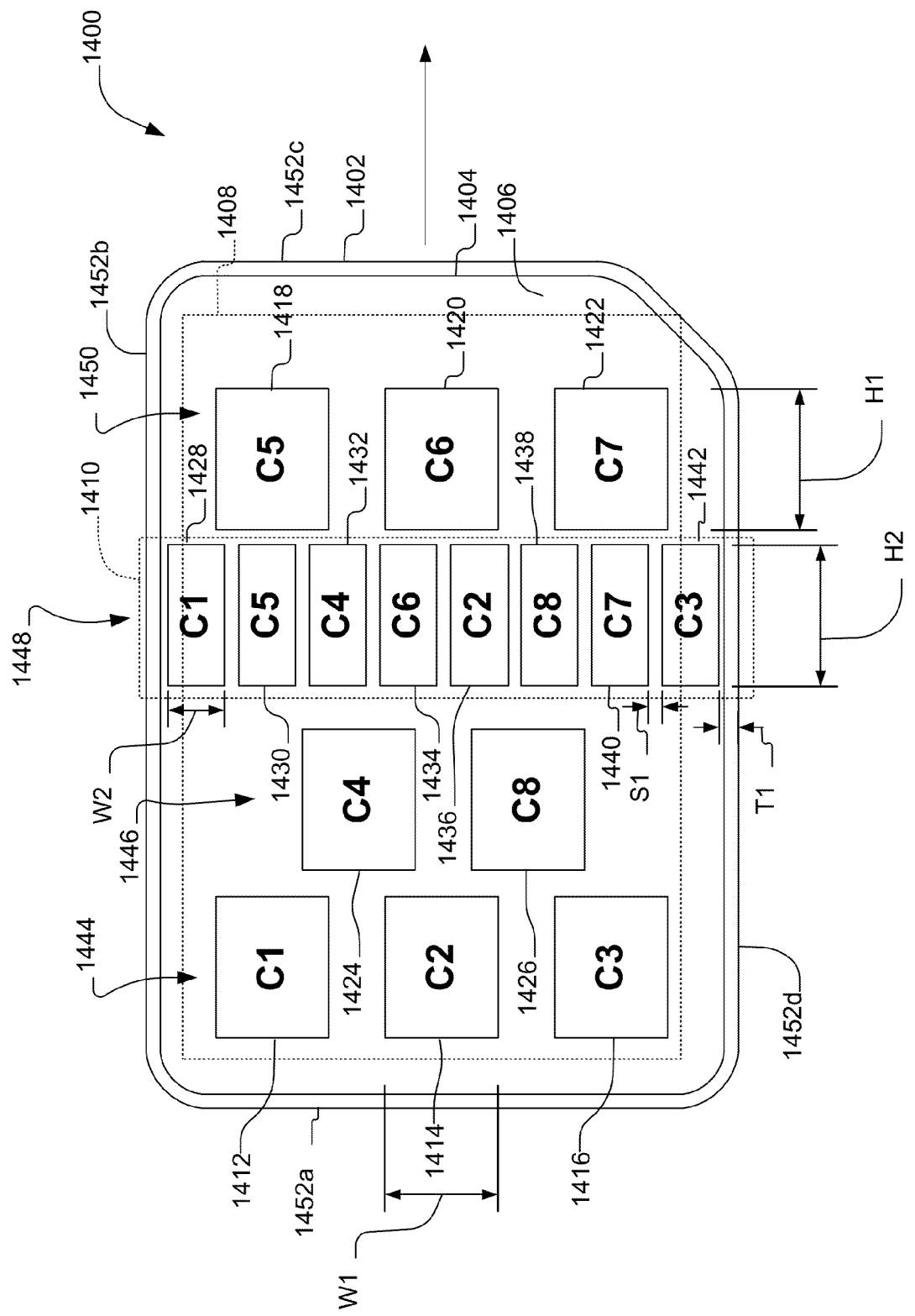
FIG. 14 illustrates another example UICC in accordance with the teachings described herein.

FIG. 14 illustrates another example UICC 1400 disclosed herein. The example UICC 1400 defines a body 1402 having a surface 1404 to support a contact pad 1406. The contact pad 1406 provides a plurality of electrical contacts defining a first electrical contact pattern 1408 and a second dimensional contact pattern 1410. In particular, in some examples, the first electrical contact pattern 1408 may include electrical contacts 1412-1422 and the second electrical contact pattern includes electrical contacts 1428-1442. More specifically, the first electrical contact pattern 1408 may include the electrical contacts 1412-1422 in a grid-like pattern and the second electrical contact pattern 1410 may include electrical contacts 1428-1442 in a single-row pattern. As a result the second electrical contact pattern 1410 provides a surface contact area that is significantly less than a surface contact area provided by the first electrical contact pattern 1408.

In the illustrated example, the electrical contacts 1412-1442 are positioned in a plurality of rows 1444-1450. More specifically, the electrical contacts 1412-1416 are positioned in a first row 1444, the electrical contacts 1424 and 1426 are arranged in a second row 1446, the electrical contacts 1428-1442 are arranged in a third row 1448, and the electrical contacts 1418-1822 are arranged in a fourth row 1450.

In the orientation of FIG. 14, the first row 1444 is positioned adjacent an edge 1452a of the body 1402, the fourth row 1450 is positioned an edge 1452c of the body 1402 and the second and third rows 1446 and 1448 are positioned between the first and fourth rows 1444 and 1450 and, in particular, the third row positioned adjacent the fourth row 1450. Further, the electrical contacts 1412-1416 and 1418-1422 in the respective first and fourth rows 1444 and 1450 are substantially aligned relative to each other and the electrical contacts 1424 and 1426 in the second row 1446 are positioned in an offset relationship relative to the electrical contacts 1412-1416 and 1418-1422 in the first and fourth rows 1444 and 1450.

Additionally, the electrical contacts 1428-1442 in the third row 1448 are aligned in substantially a straight orientation relative to each other. The electrical contacts 1428-1442 in the third row 1448 each have a dimensional profile or envelope that is smaller than a dimensional profile or envelope of the electrical contacts 1412-1426 positioned in the respective first, second and/or fourth rows 1444, 1446 and 1450. Each of the electrical contacts 1412-1422 has a width W1 and a height H1. In addition, each of the electrical contacts 1428-1442 has a width W2 and a height H2. In some examples, the height H1 may be substantially equal to the height H2 and the width W1 may be different than the width W2. In some examples, the heights H1 and H2 may be approximately between 1.7 and 2.1 millimeters. The width W1 may be between approximately 1.7 and 2.1 millimeters and the width W2 may be approximately between 0.7 and 0.9 millimeters. The electrical contacts 1428-1442 in the third row 1448 may be spaced-apart by a distance S1 of approximately between 0.1 and 0.3 millimeters. Further, the electrical contact 1428 in the third row 1448 is positioned adjacent a second edge 1452b of the UICC 1400 and the electrical contact 1442 of the third row 1448 is positioned adjacent a fourth edge 1452d of the UICC 1400. For example, a distance or clearance T1 between the electrical contacts and the respective edges may be approximately between 0.2 and 0.3 millimeters.

In the illustrated example, the first row 1444 of electrical contacts 1412-1416 includes a reset contact C2 positioned between a voltage contact C1 and a clock contact C3. The second row 1446 of electrical contacts 1424-1426 includes first and second auxiliary contacts C4 and C8. The fourth row 1450 of electrical contacts 1418-1422 includes a single-wire protocol contact C6 positioned between a ground contact C5, and an input/output contact C7. Thus, none of the electrical contacts in the first, second and fourth 1444, 1446 and 1450 rows have similar or common contact classification properties.

As shown in the illustrated example of FIG. 14, the electrical contacts 1428-1442 of the third row 1448 may each correspond to respective ones of the contact classifications C1-C8. In the illustrated example, the voltage contact C1 is positioned adjacent the edge 1452b, the ground contact C5, is positioned adjacent the voltage contact C1, the first auxiliary contact C4 is positioned adjacent the ground contact C5, the single-wire protocol contact C6 is positioned adjacent the first auxiliary contact C4, the reset contact C2 is positioned adjacent the single-wire protocol contact C6, the second auxiliary contact C8 is positioned adjacent the reset contact C2, the input/output contact C7 is positioned adjacent the second auxiliary contact C8, and the clock contact C3 is positioned adjacent the input/output contact C7.

In some examples, the order of the contacts C1, C5, C4, C6, C2, C8, C7 and C3 is not limited to the order shown in the example of FIG. 14 and, thus, the contacts C1, C5, C4, C6, C2, C8, C7 and C3 may be positioned on the contact pad 1406 in any suitable order or position relative to each other. Further, any one of the electrical contacts C4, C6 and C8 may be omitted from the third row 1448 and/or the second and fourth rows 1446 and 1450.

Figure 15:
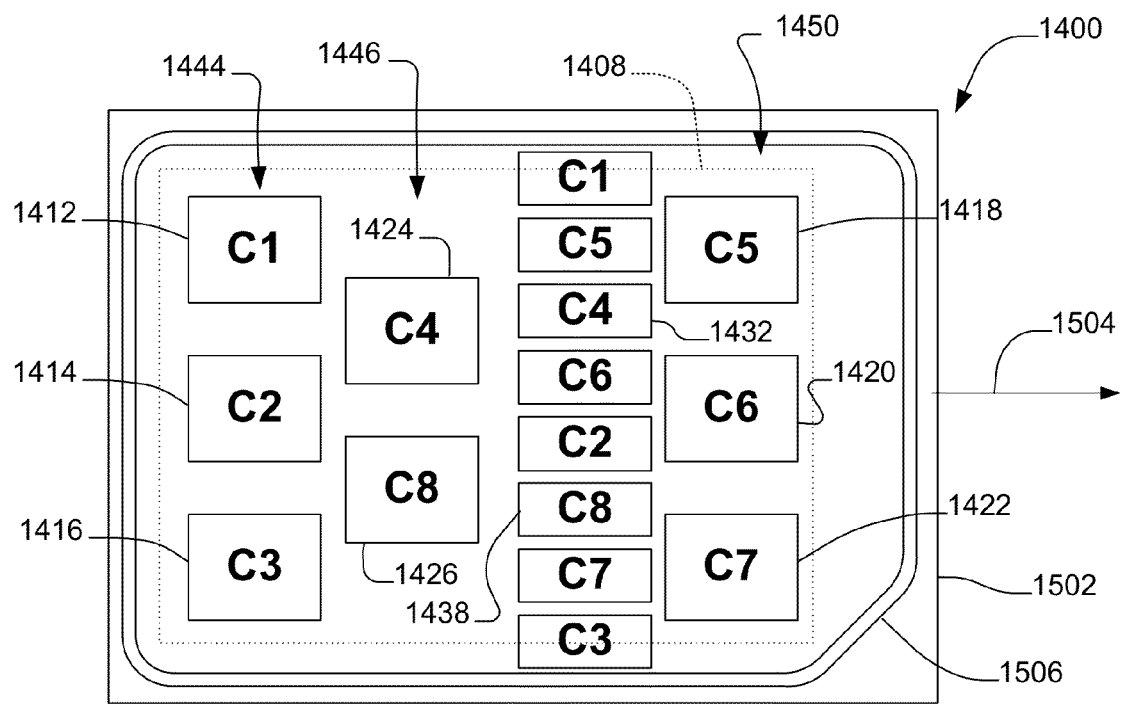
FIG. 15 illustrates the example UICC of FIG. 14 adaptable for use with an example input device.

FIG. 15 illustrates the example UICC 1400 of FIG. 14 relative to a first input device or card reader 1502. In particular, the UICC 1400 shown in FIG. 14 may be inserted in an opening or cavity of the input device 1502 with a leading edge 1452c (e.g., the third edge) of the body 102 oriented in a direction represented by arrow 1504. Further, the chamfer 1506 may provide a guide or orientation marker to facilitate determination of the proper orientation when inserting the UICC 1400 in the first input device 1502.

More specifically, the first input device 1502 is adapted to communicate or read the UICC 1400 based on the first electrical contact pattern 1408. In particular, the first input device 1502 may be configured to engage or communicate with the electrical contacts 1412-1416 of the first row 1444 and the electrical contacts 1418 and 1422 of the fourth row 1450. In the illustrated example, the electrical contacts 1412-1416, 1418 and 1422 include C1, C2, C3, C5, and C7 characteristics, respectively. Alternatively, the first input device 1502 may be configured to also read the electrical contacts 1424 and 1426 of the second row 1446 having C4 and C8 characteristics and the electrical contact 1420 of the fourth row 1450 having a C5, characteristic. For example, the first input device may be configured to communicate or engage the electrical contacts 1412-1416, 1418 and 1422 of the first pattern 1408 associated with classifications contacts C1, C2, C3, C5, and C7, and may optionally be configured to communicate or engage any one of the electrical contacts 1420-1426 associated with, for example, classification contacts C4, C6 and/or C8. For example, the first input device 1502 may be configured to communicate or engage with any one of the electrical contacts 1412-1416, 1418 and 1422 of the first pattern 1408 associated with classifications contacts C1, C2, C3, C5, and C7, and may optionally be configured to communicate or engage any one of the electrical contacts in the third row 1448 associated with, for example, classification contacts C4, C6 and/or C8. Further still, an input reader may be configured to communicate with one or more of the electrical contacts of the first electrical contact pattern 1408 and/or any one of the electrical contacts of the second electrical contact pattern 1410. Further, an input device may be configured to communicate with at least one of the electrical contacts in the first electrical contact pattern 1408 and at least one of the electrical contacts in the second electrical contact pattern 1410. In other words, the at least ones of the electrical contacts of the first and second electrical contact patterns 1408 and 1410 define a third electrical contact pattern of the UICC 1400.

Figure 16:
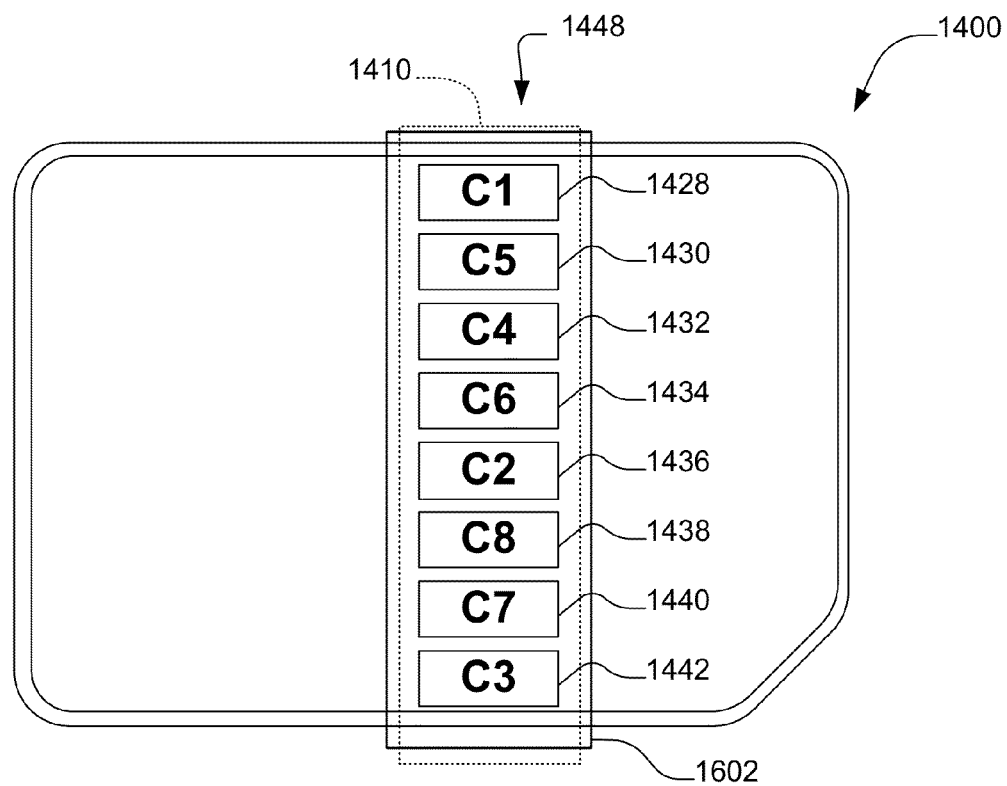
FIG. 16 illustrates the example UICC of FIG. 14 adaptable for use with another example input device.

FIG. 16 illustrates the example UICC 1400 of FIG. 14 positioned relative to a second input device or card reader 1602. More specifically, the second input device 1602 is adapted to communicate or read the UICC 1400 based on the second electrical contact pattern 1408. In particular, the second input device 1602 may be configured to engage or communicate with the electrical contacts 1428-1442 positioned in the third row 1448. Thus, for clarity, the first, second and fourth rows 1444, 1446 and 1450 are not shown in FIG. 16.

As a result of the second electrical contact pattern 1410, an electronic device may employ an input device such as, for example, a single-row card reader such as a header-style or block style card reader having a significantly smaller dimensional envelope to significantly reduce an overall dimensional footprint of the electronic device. As shown in FIGS. 15 and 16, the second electrical contact pattern 1410 provides a significantly smaller surface area (e.g., between 10% and 20% of the surface 1404 of the UICC 1400) compared to a surface area (e.g., between 80% and 90% of the surface 1404) of the first electrical contact pattern 1408. As a result, a greater amount of surface area is exposed for a user to grip when the user inserts or removes the UICC 1400 from the second input device 1602.

Figure 17:
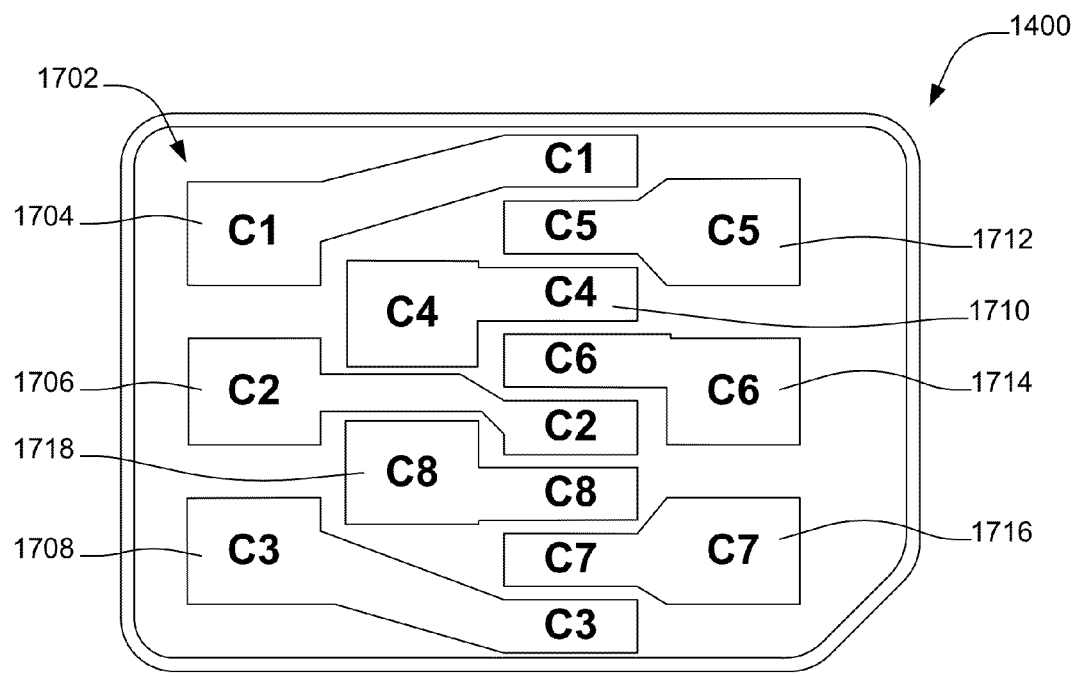
FIG. 17 illustrates an example electrical connection pattern of the example UICC of FIGS. 14-16.

FIG. 17 illustrates an electrical connection pattern 1702 to electrically couple the electrical contacts 1412-1442 of the UICC 1400 of FIG. 14. Referring to FIG. 17, the electrical contacts 1412-1442 are positioned or oriented on the UICC 1400 such that the positioning or placement of the electrical contacts 1412-1442 enables a trace (e.g., a single large contact surface area) to electrically connect two or more electrical contacts having the common classifications. For example, although sixteen different electrical contact placements 1412-1442 are exposed on the surface 1404 of the UICC 1400, the contact pad 1406 provides only eight electrically isolated surface areas 1704-1718 to cover the placement locations of the sixteen electrical contacts 1412-1442. In the illustrated example, each of the electrical contacts 1412-1442 in the first and second electrical contact patterns 1408 and 1410 that is associated with common electrical contact classifications is electrically coupled via respective contact surface areas 1704-1718.

For example, the electrical contacts 1412 and 1428 associated with the C1 classification are electrically coupled by a first surface contact area 1704, the electrical contacts 1414 and 1436 associated with the C2 classification are electrically coupled by a second surface contact area 1706, the electrical contacts 1416 and 1442 associated with the C3 classification are electrically coupled by a third surface contact area 1708, the electrical contacts 1424 and 1432 associated with the C4 classification are electrically coupled by a fourth surface contact area 1710, the electrical contacts 1418 and 1430 associated with the C5, classification are electrically coupled by a fifth surface contact area 1712, the electrical contacts 1420 and 1434 associated with the C6 classification are electrically coupled by a sixth surface contact area 1714, the electrical contacts 1422 and 1440 associated with the C7 classification are electrically coupled by a seventh surface contact area 1716, and the electrical contacts 1426 and 1438 associated with the C8 classification are electrically coupled by an eighth surface contact area 1718. In the illustrated example, each of the respective contact surfaces areas 1704-1718 is spaced-apart to expose portions of the surface 1404 between each of the respective contact surface areas 1704-1718. Such separation between the respective contact surface areas 1704-1718 facilitates isolation of the electrical contacts 1412-1442 having different classifications.

As a result of the contact surface areas 1704-1718, the amount of wire bonds needed to couple the electrical contacts 1412-1442 to an IC chip of the UICC 1400 is less than the number of electrical contact placements (e.g., sixteen) positioned on the surface of the UICC 1400. Thus, because electrical contacts having common classifications are connected via the respective contact surface areas 1702-1718, only eight wire bonds are needed to couple the IC chip and the electrical contact placements 1412-1442. However, because the C4 and C8 contacts (e.g., contacts 1414 and 1424) are defined as optional in current standards, some embodiments may only require 6 wire bonds (all contacts except C4 and C8). Additionally or alternatively, because the C6 contact is also considered optional in current standards, the UICC 1400 may only require 5 wire bonds if the example UICC 1400 does not implement or support the SWP NFC capability. Additionally, because the electrical contacts C4 and C8 are defined as optional in current standards, an area (e.g., the surface areas 1710 and 1718) surrounding the C4 and C8 contacts may remain electrically isolated from the other contacts C1, C2, C3, C5, C6 and C7 if the example UICC 1400 does not implement or support the high speed USB feature. In addition, contact C6 is also defined as optional in current standards, thus, the area (e.g., the surface area 1714) surrounding the C6 contact may remain electrically isolated from the other mandatory contacts (C1, C2, C3, C5, and C7) if the example UICC 1400 does not implement or support the SWP NFC capability.

Figure 18:
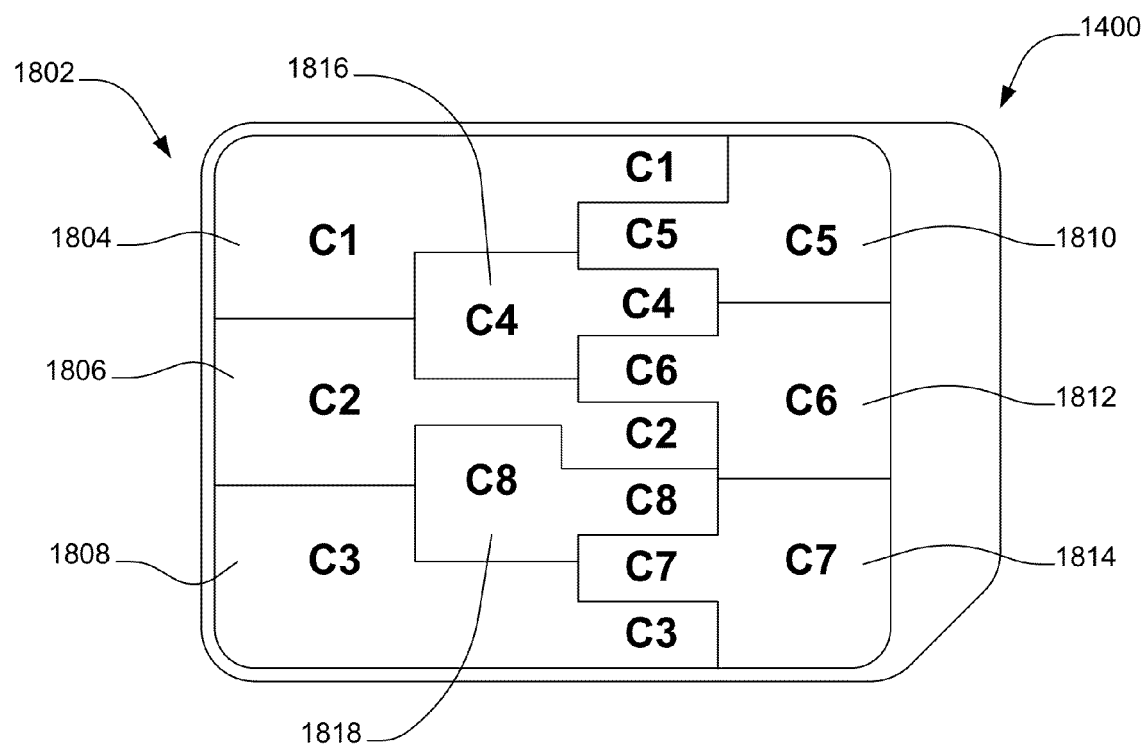
FIG. 18 illustrates another example electrical connection configuration of the example UICC of FIGS. 14-16.

FIG. 18 illustrates another example electrical connection pattern 1802 that may be employed to electrically couple the common electrical contacts of the example UICC 1400 of FIG. 14. The electrical contacts 1412-1442 of the first and second electrical contact patterns 1408 and 1410 having common classifications may be electrically connected respective contact surface areas 1804-1818 as shown in FIG. 18. Further, each of the electrical contacts 1412-1442 of the first and second electrical contact patterns 1408 and 1410 having different electrical contact classifications may be electrically isolated from each other.

Figure 19:
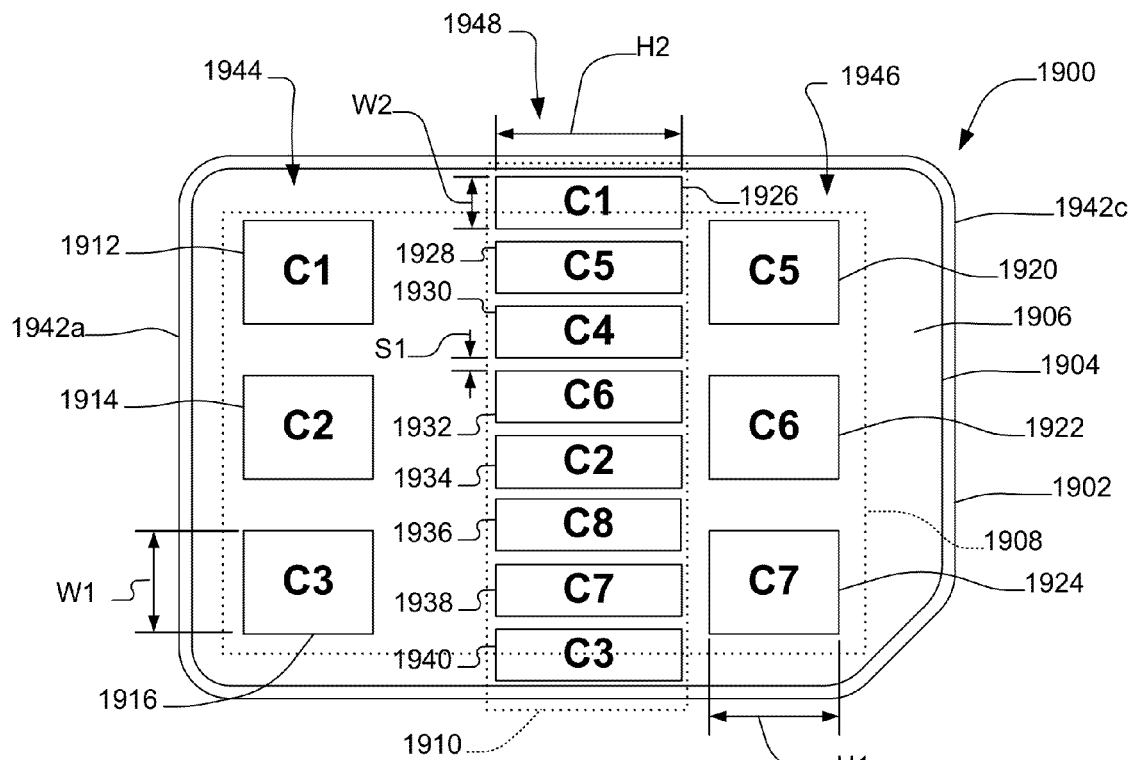
FIG. 19 illustrates another example UICC in accordance with the teachings described herein.

FIG. 19 illustrates another example UICC 1900 disclosed herein defines a body 1902 having a surface 1904 that supports a contact pad 1906. The contact pad 1906 defines a first electrical contact pattern 1908 and a second electrical contact pattern 1910. The first electrical contact pattern 1908 defines electrical contacts 1912-1924 arranged in a grid-like pattern and the second electrical contact pattern 1904 defines electrical contacts 1926-1940 arranged in a single-row configuration. Thus, the second electrical contact pattern 1910 provides a single-row configuration to interface with a single row input device.

In the orientation of FIG. 19, the electrical contacts 1912-1918 are positioned adjacent an edge 1942a of the body 1902 and the electrical contacts 1920-1924 are positioned adjacent an edge 1942c of the body 1902. The electrical contacts 1926-1940 are substantially aligned and positioned on the surface 1904 between the electrical contacts 1912-1918 and the electrical contacts 1920-1924. Thus, the first electrical contact pattern 1908 employs a first row 1944 having electrical contacts 1912-1916 and a second row 1946 having electrical contacts 1920-1924. The second electrical contact pattern 1910 employs a third row 1948 having the electrical contacts 1926-1940 and is positioned between the first and second rows 1944 and 1946.

In the illustrated example, each of the electrical contacts 1912-1924 have a width W1 and a height H1 and each of the electrical contacts 1926-1940 have a width W2 and a height H2. In this example, the width W2 and the height H2 are different than the width W1 and the height H1, respectively. The width W2 may be approximately between 0.7 and 0.9 millimeters and the height H2 may be approximately between 2.9 and 3.1 millimeters. Providing electrical contacts such as the electrical contacts 1926-1940 that larger dimensional envelopes facilitate an electrical connection with an input device compared to electrical contacts having smaller dimensional envelopes or footprints. Each of the electrical contacts 1926-1940 may be spaced-apart by a gap S1 of approximately between 0.19 and 0.21 millimeters.

In the illustrated example of FIG. 19, a first input device may be configured to communicate or engage the first electrical contact pattern 1908. For example, the first input device may be configured to communicate with the electrical contacts 1912-1916 (e.g., C1, C2 and C3) of the first row 1944 and the electrical contacts 1920 and 1924 (e.g., C5, and C7) of the second row 1946. Additionally or alternatively, the first input device may be configured to also read the electrical contact 1922 (e.g., C6) of the second row 1946. Further still, the first input device may be configured to optionally communicate or read the electrical contacts 1930 and/or 1934 of the third row 1948 associated with the classifications C4 and C8. In this manner, the electrical contact pad 1906 may define a third electrical contact pattern. The third electrical contact pattern demonstrates an input device configured to engage one or more contacts defined as part of the first electrical contact pattern 1908 (C1, C2, C3, C5, and C7, respectively or C1, C2, C3, C5, C6 and C7, respectively) and one or more contacts defined as part the second electrical contact pattern 1910 (C4 and C8). In other words, the electrical contacts positioned on the contact pad 1906 may define a plurality of electrical contact patterns including, for example, the first and second electrical contact patterns 1908 and 1910 and the third electrical contact pattern. Although not shown, in other examples, the electrical contacts of the contact pad 1906 may provide additional different electrical contact patterns.

Alternatively, a second input device may be configured to communicate or engage the second electrical contact pattern 1910. For example, the second input device may be configured to communicate or read at least the electrical contacts 1926, 1928, 1934, 1938 and 1940 of the third row 1948 which are associated with the contact classifications C1, C5, C2, C7 and C3, respectively. Further, the second input device may optionally be configured to communicate or read the electrical contacts 1930, 1932, and/or 1936 associated with the classifications C4, C6 and C8 , respectively.

Figure 20:
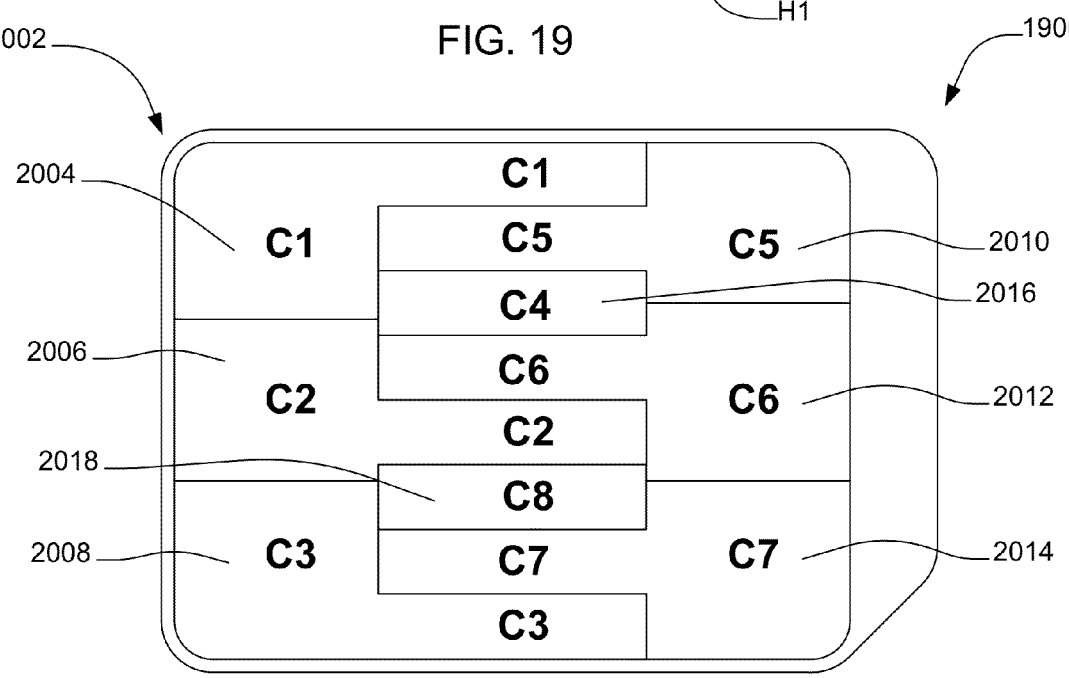
FIG. 20 illustrates an example electrical connection pattern of the example UICC of FIG. 19.

FIG. 20 illustrates another example electrical connection pattern that may be employed to electrically couple common electrical contacts of the UICC 1900 of FIG. 19. The electrical contacts 1912-1940 of the first and second electrical contact patterns 1908 and 1910 having common classifications may be electrically connected to each other, and each of the electrical contacts 1912-1940 of the first and second electrical contact patterns 1908 and 1910 having different electrical contact classifications may be electrically isolated relative to each other. For example, the electrical contacts C1, C2, C3, C5, C6 and C7 of the first electrical contact pattern 1908 may be electrically coupled to the respective electrical contacts C1, C2, C3, C5, C6 and C7 of the second electrical contact pattern 1910 via respective traces 2004-2014. Respective areas 2016 and 2018 surrounding or defining the electrical contacts C4 and C8 may be electrically isolated from the traces 2004-2014.

Figure 21:
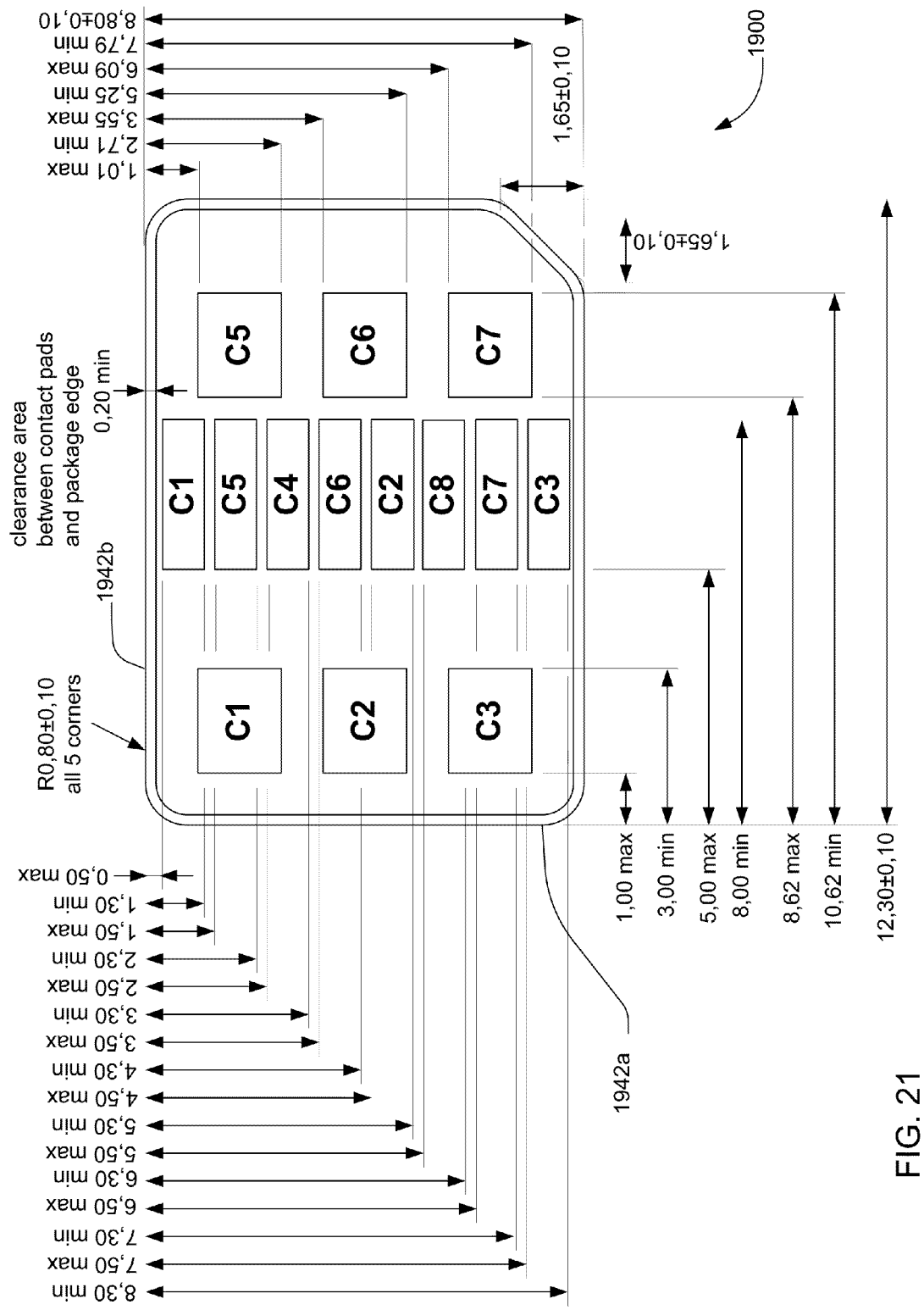
FIG. 21 illustrates example dimensional values of the example UICC of FIG. 19 and FIG. 20.

FIG. 21 illustrates example dimensional values that may be used to define a dimensional envelope of the body 1902 of the example UICC 1900 of FIGS. 19 and 20. Additionally, FIG. 21 illustrates the positioning of the electrical contacts 1912-1940 on the surface 1904 of the UICC 1900 in reference to peripheral or perimeter edges 1942*a* and 1942*b* defined by the body 1902 of the UICC 1900. The example dimensional values of the illustrated example are in millimeters and each dimensional value may each have dimensional tolerance of approximately +/−0.1 millimeters.

Figure 22:
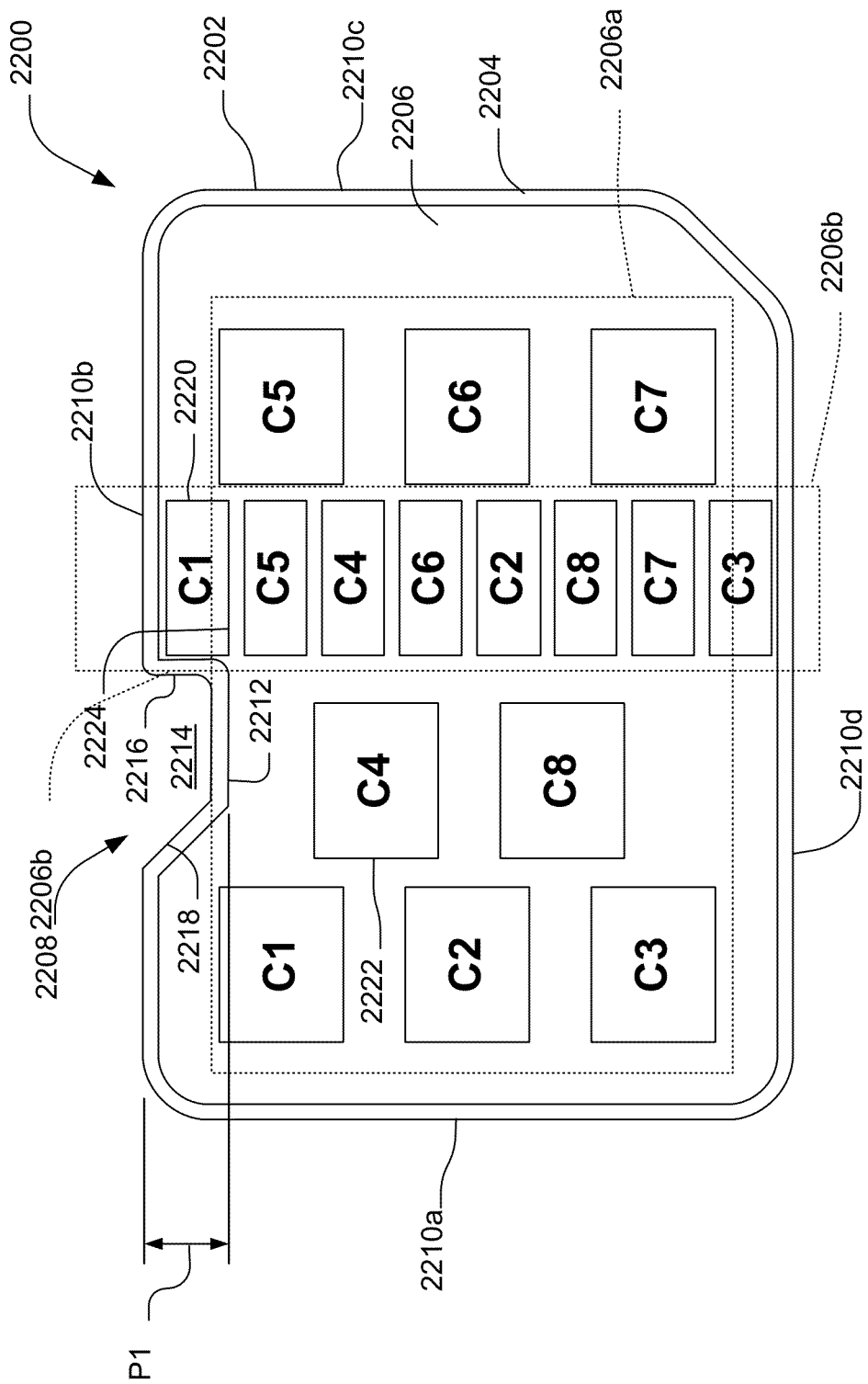
FIG. 22 illustrates another example UICC disclosed herein similar to the UICC of FIG. 14, but having a retention feature.

FIG. 22 illustrates another example UICC 2200 disclosed herein. In the illustrated example, the UICC 2200 defines a body 2202 having a surface 2204 to support a contact pad 2206. The contact pad 2206 includes electrical contact patterns 2206*a* and 2206*b* that are substantially similar to the electrical contact patterns 1408 and 1410 of the example UICC 1400 of FIG. 14. However, the body 2202 of the example UICC 2200 employs a retention feature or locking mechanism 2208 (e.g., a notch) to secure the UICC 2200 in a cavity of an input device. The notch 2208 of the illustrated example is disposed along an edge 2210*b* of the body 2202. In particular, the retention feature 2208 forms a recessed edge 2212 spaced-apart from the edge 2210*b* and toward another edge 2210*d* of the body 2202. As shown in the example of FIG. 22, the recessed edge 2212 is positioned at a distance of P1 relative to the edge 2210*b*. In this example, the distance P1 is approximately between 0.6 and 0.9 millimeters. The notch 2208 of the illustrated example forms a recessed opening 2214 having a shoulder or catch feature 2216 between the edge 2210*b* and the recessed edge 2212, and a substantially tapered edge 2218 between the edge 2210*b* and the recessed edge 2212. The shoulder 2216 is substantially parallel relative to the edge 2210*a* and substantially perpendicular relative to the edge 2210*b*. As shown in FIG. 22, the notch 2208 may be positioned along the first edge 2210*b* without interfering with electrical contacts 2220 and 2222 of the contact pad 2206. For example, an electrical contact 2220 can be positioned adjacent the edge 2210*b* and adjacent the notch 2208. In particular, an edge 2224 of the electrical contact 2220 may be substantially aligned with the recessed edge 2212. Additionally, an electrical contact 2222 is positioned away from the recessed edge 2212 of the notch 2208. In other examples, the retention feature 2208 may be positioned along any one of the other perimeter edges 2210*a*, 2210*c* and/or 2210*d* of the body 2202.

Figure 23A:
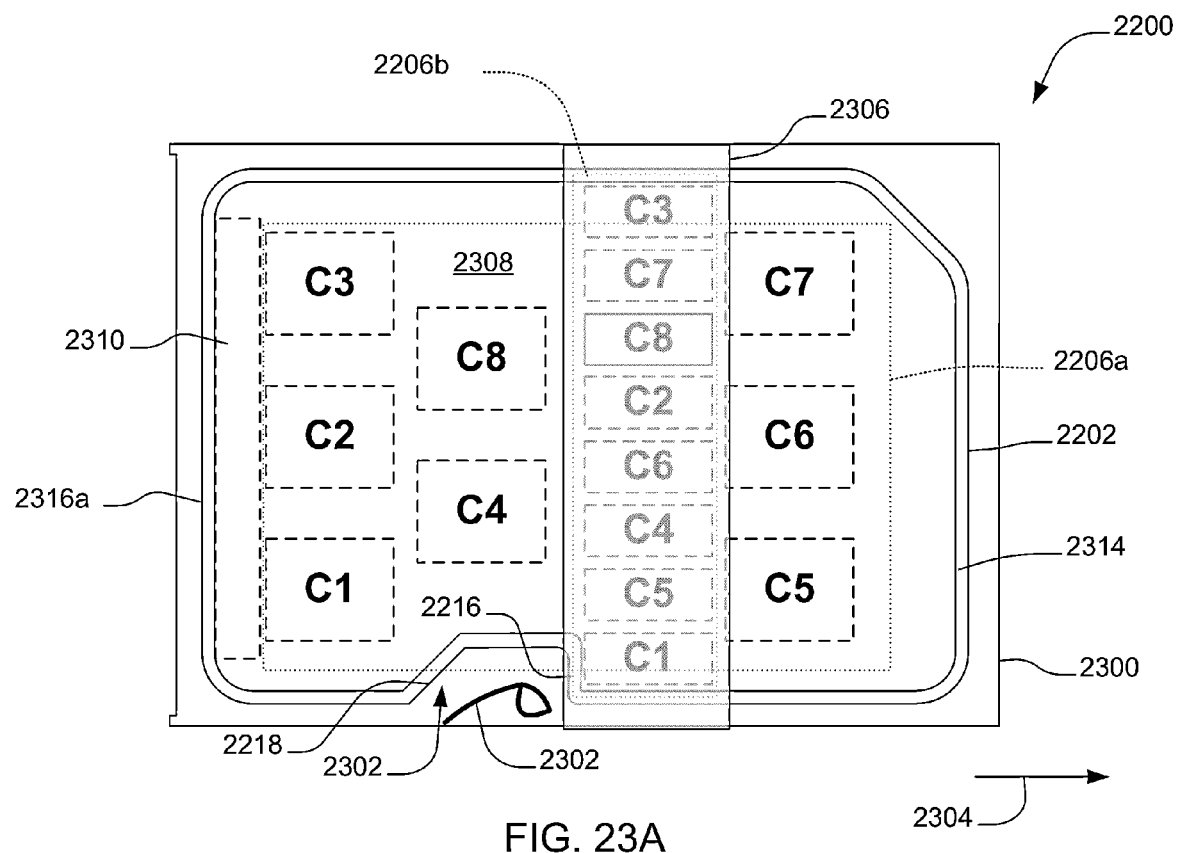
FIG. 23A illustrates the example UICC of FIG. 22 relative to an input device.

FIG. 23A illustrates a bottom view of the example UICC 2200 positioned relative to an input device 2300. When coupled to the input device 2300, the notch 2208 retains the UICC 2200 in the input device 2300 and prevents the UICC 2200 from moving (e.g., bouncing) or dislodging from the input device 2300 when, for example, the electronic device experiences a sudden shock (e.g., the device is dropped). More specifically, when the UICC 2200 of the illustrated example is inserted into the input device 2300, the notch 2208 engages a lock or catch feature 2302 of the input device 2300 to secure the position of the UICC 2200 relative to the input device 2300. To remove the UICC 2200 from the input device 2300, the UICC 2200 is moved in the direction of arrow 2304 when the UICC 2200 is in the input device 2300 such that the tapered surface 2218 releases the lock or catch feature 2302 from the shoulder 2216 of the notch 2208 (e.g., the tapered surface 2218 biases the catch feature 2302 away from the notch 2208). A spring-loaded ejection mechanism (not shown) can then eject the UICC 2200 from the input device 2300.

Figure 23B:
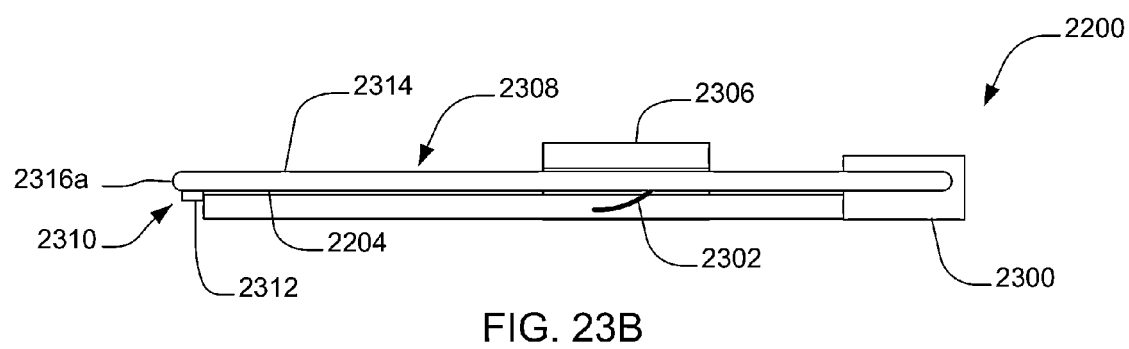
FIG. 23B is a side view of the example UICC and input device of FIG. 23A.

Further, as shown in FIGS. 23A and 23B, the input device 2300 employs a band 2306 that is positioned over the surface 2204 of the UICC 2200 to secure the UICC 2200 and provide a force (e.g., a downward force in the orientation of FIG. 23B) on spring contacts of the input device 2300 positioned adjacent electrical contacts (e.g., the electrical contacts 1428-1442 of FIG. 14) in a single row configuration (e.g., the row 1948 of FIG. 14) of the UICC 2300. The band 2306 may have a significantly smaller dimensional profile than a dimensional profile of a band needed to be positioned over a first electrical contact pattern (e.g., the first electrical contact pattern 1408 of FIG. 14).

Additionally or alternatively, the band 2306 enables a substantial portion 2308 of the surface 2204 of the example UICC 2200 to be exposed relative to the input device 2300. Such exposed portion 2308 of the UICC 2200 provides a greater area to enable a user to grasp or handle the UICC 2200 during insertion and/or removal of the UICC 2200 relative to the input device 2300. For example, the UICC 2200 may be inserted and/or removed from the input device 2300 without the use of additional tools.

Further, to facilitate insertion and/or removal of the UICC 2200 relative to the input device 2300, the example UICC 2200 employs a pick-out feature 2310. The pick-out feature 2310 enables a user to firmly grasp the UICC 2200 and pull it away from the opening 2302 in a direction opposite of the direction indicated by the arrow 2306. In the illustrated example, the pick-out feature 2310 comprises a raised lip or molded ridge 2312 protruding away from a second surface 2314 opposite the surface 2202 and adjacent the first edge 2316a. In other examples, the first surface 2202 may also include a raised lip or molded ridge (e.g., similar to the raised lip 2312) protruding away from the second surface 2314. In some examples, the pick-out feature 2310 may employ a slot or opening disposed along the first edge 2316a of the UICC 2200. In some examples, the pick-out feature 2310 may be an aperture positioned between the edges 2316b and 2316d and adjacent edge 2316a. In yet other examples, the pick-out feature 2310 may employ an opening or slot that is recessed in the first surface 2202 and/or the second surface 2314. In other words, a slot forms a recessed opening that does not pass through an entire thickness (e.g., the thickness 108 of FIG. 1B) of the UICC 2200.

Figure 24:
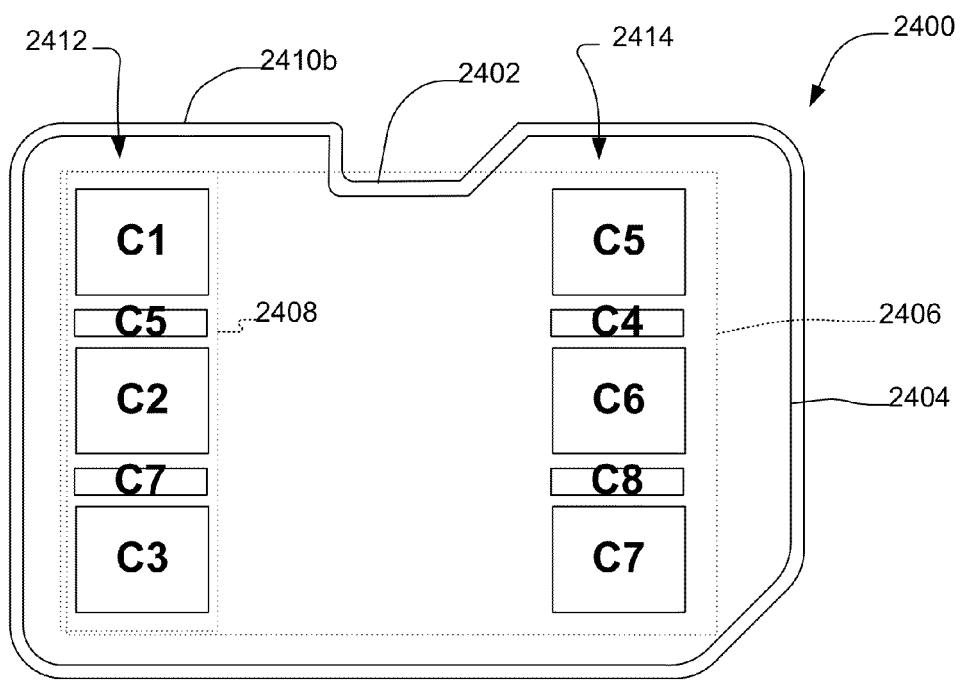
FIG. 24 illustrates another example UICC disclosed herein similar to the UICC of FIG. 2A and FIG. 2B, but implemented with a retention feature.

FIG. 24 illustrates another example UICC 2400 disclosed herein having a retention feature or locking mechanism 2402. More specifically, the example UICC 2400 includes an contact pad 2404 having electrical contact patterns or layouts 2406 and 2408 substantially similar to the electrical contact patterns 218 and 220 of the example UICC 200 of FIG. 2. In the illustrated example, the retention feature 2402 is positioned along an edge 2410b and positioned between first and second electrical contact rows 2412 and 2414. For example, the retention feature 2402 may be centered relative to a midpoint between the first and second rows 2412 and 2414 and/or the second edge 2410b.

Figure 25:
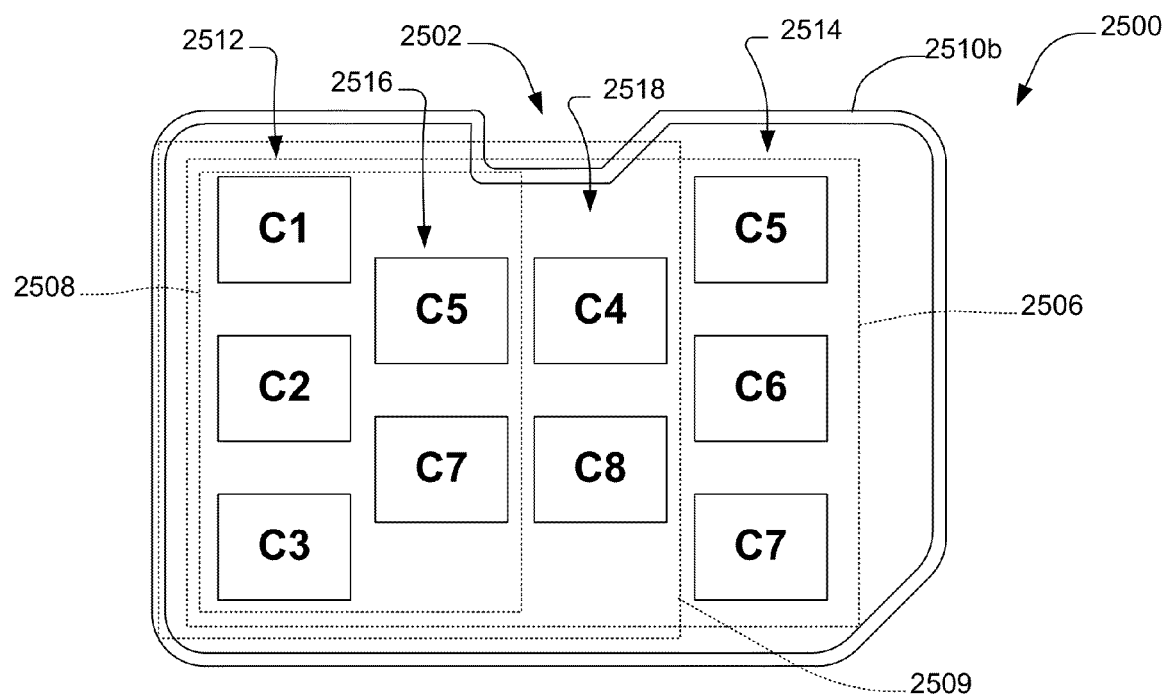
FIG. 25 illustrates another example UICC disclosed herein similar to the UICC of FIGS. 6-10, but implemented with a retention feature.

FIG. 25 illustrates another example UICC 2500 disclosed herein having a retention feature or locking feature 2502. More specifically, the example UICC 2500 includes an electrical contact patterns 2506 and 2508 substantially similar to electrical contact patterns 626 and 628 of the example UICC 600 of FIG. 6. In the illustrated example, the retention feature 2502 is positioned along a second edge 2510b between first and fourth electrical contact rows 2512 and 2514. For example, the retention feature 2502 may be centered relative to second and third contact rows 2516 and 2518 because the electrical contacts in those rows are offset a greater distance relative to the second edge 2510b compared to the electrical contacts of the first and fourth rows 2512 and 2514.

Figure 26:
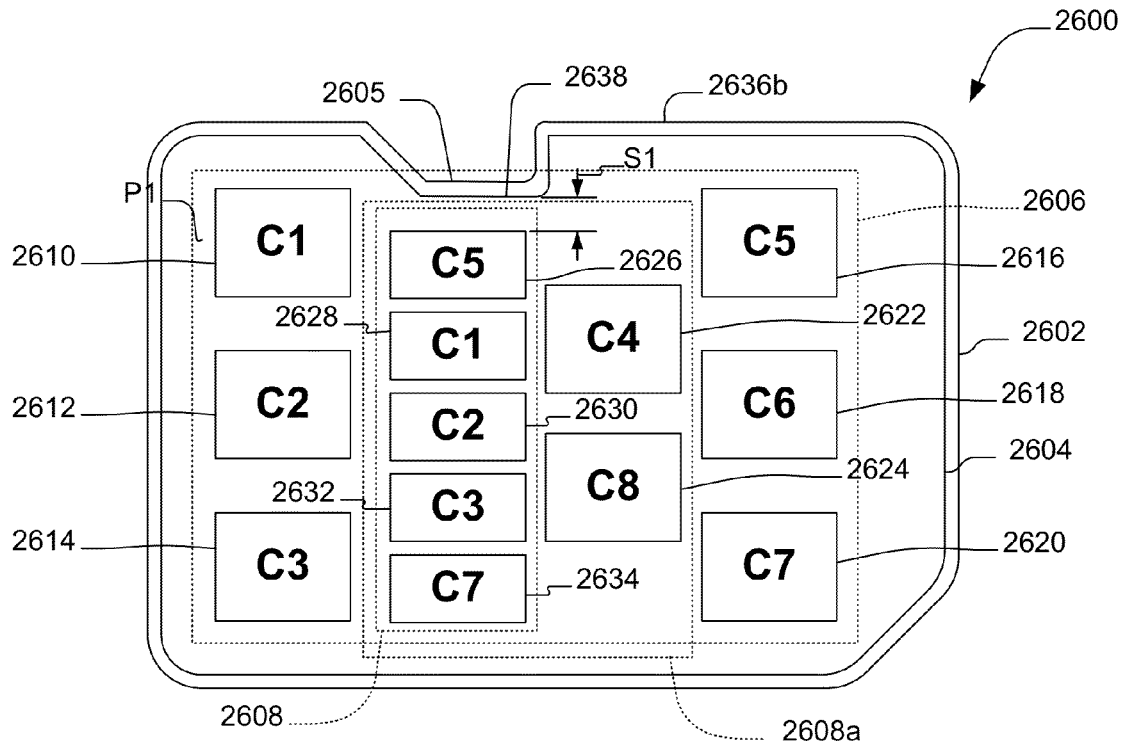
FIG. 26 illustrates another example UICC disclosed herein.

FIG. 26 illustrates another example UICC 2600 disclosed herein. More specifically, the example UICC 2600 includes a body 2602 having a contact pad 2604 and a retention feature or locking mechanism 2605. The contact pad 2604 defines a first electrical contact pattern 2606 and a second electrical contact pattern 2608. The first electrical contact pattern 2606 may be defined by electrical contacts 2610-2624 (C1-C8 contacts). The second electrical contact pattern 2608 may be defined by the electrical contacts 2626-2634 (C5, C1, C2, C3 and C7 contacts) to provide the second row contact pattern. In some examples, the second electrical contact pattern 2608 may also include electrical contacts 2622 and 2624 (e.g., the C4, C8 contacts) to provide an offset or staggered-row contact pattern 2608a to define a third electrical contact pattern.

Having a single-row and/or staggered-row configuration employing contacts associated with classifications C5, C1, C2, C3 and C7 (and optionally Cr4 and C8 ) as shown in FIG. 26 enables an a larger offset between the electrical contact 2626 (e.g., contact C5,) and an edge 2636b of the body 2602 to enable the locking member 2605 to be positioned and/or aligned relative to the single-row configuration provided by the second electrical contact pattern 2608. More specifically, the electrical contact 2626 (e.g., C5) is spaced a distance S1 relative to a recessed edge 2638 of the retention feature 2605.

Figure 27:
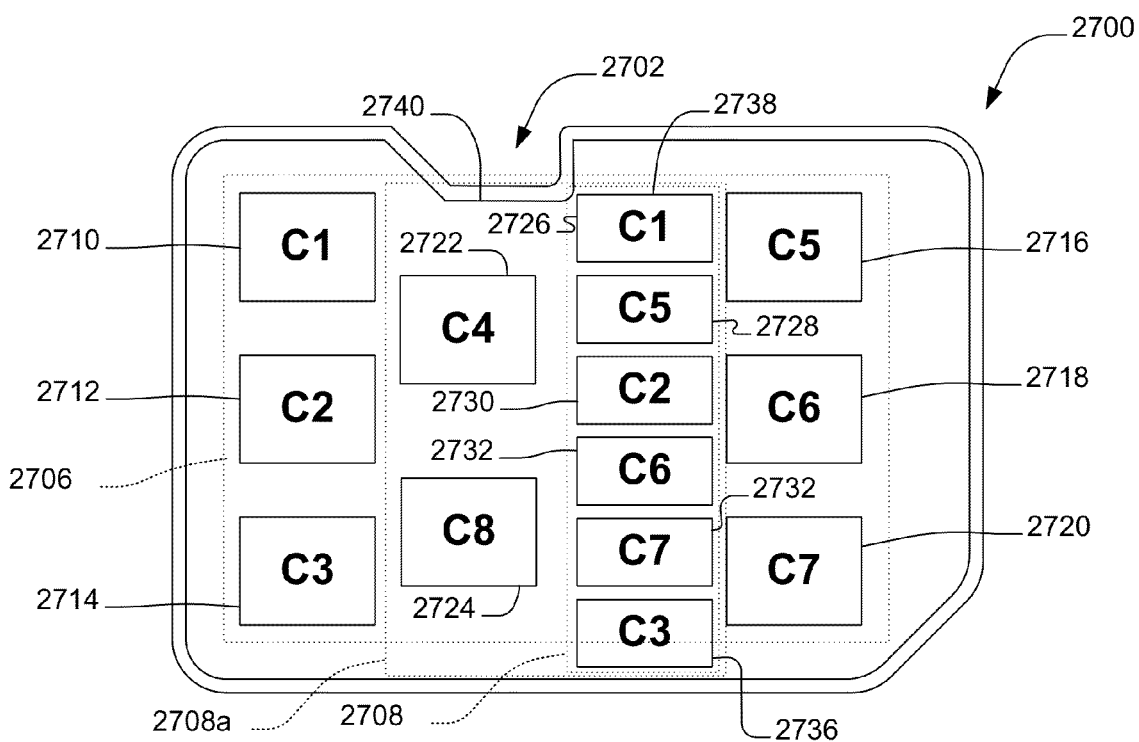
FIG. 27 illustrates yet another example UICC disclosed herein.

FIG. 27 illustrates another example UICC 2700 disclosed herein having a retention feature or locking mechanism 2702. More specifically, the example UICC 2700 includes a contact pad 2704 having a first electrical contact pattern 2706 and a second electrical contact pattern 2708. The first electrical contact pattern 2706 may be defined by electrical contacts 2710-2724 (C1, C2, C3, C4, C8 , C5, C6 and C7) and the second electrical contact pattern 2708 may be defined by electrical contacts 2726-2736 (C1, C5, C2, C6, C7 and C3) positioned or configured in a single-row contact pattern. In some examples, the second electrical contact pattern 2608 may also include electrical contacts 2622 and 2624 (e.g., the C4, C8 contacts) to provide an offset or staggered-row contact pattern 2608a.

Such a second electrical contact pattern 2608 and/or 2608a enables an edge 2738 of the electrical contact 2726 to be positioned or substantially aligned with a recessed edge 2740 of the retention feature 2702. In this manner, the second electrical contact patterns 2608 and/or 2608a reduce the possibility of the retention feature 2702 interfering with the electrical contact C1.

Figure 28:
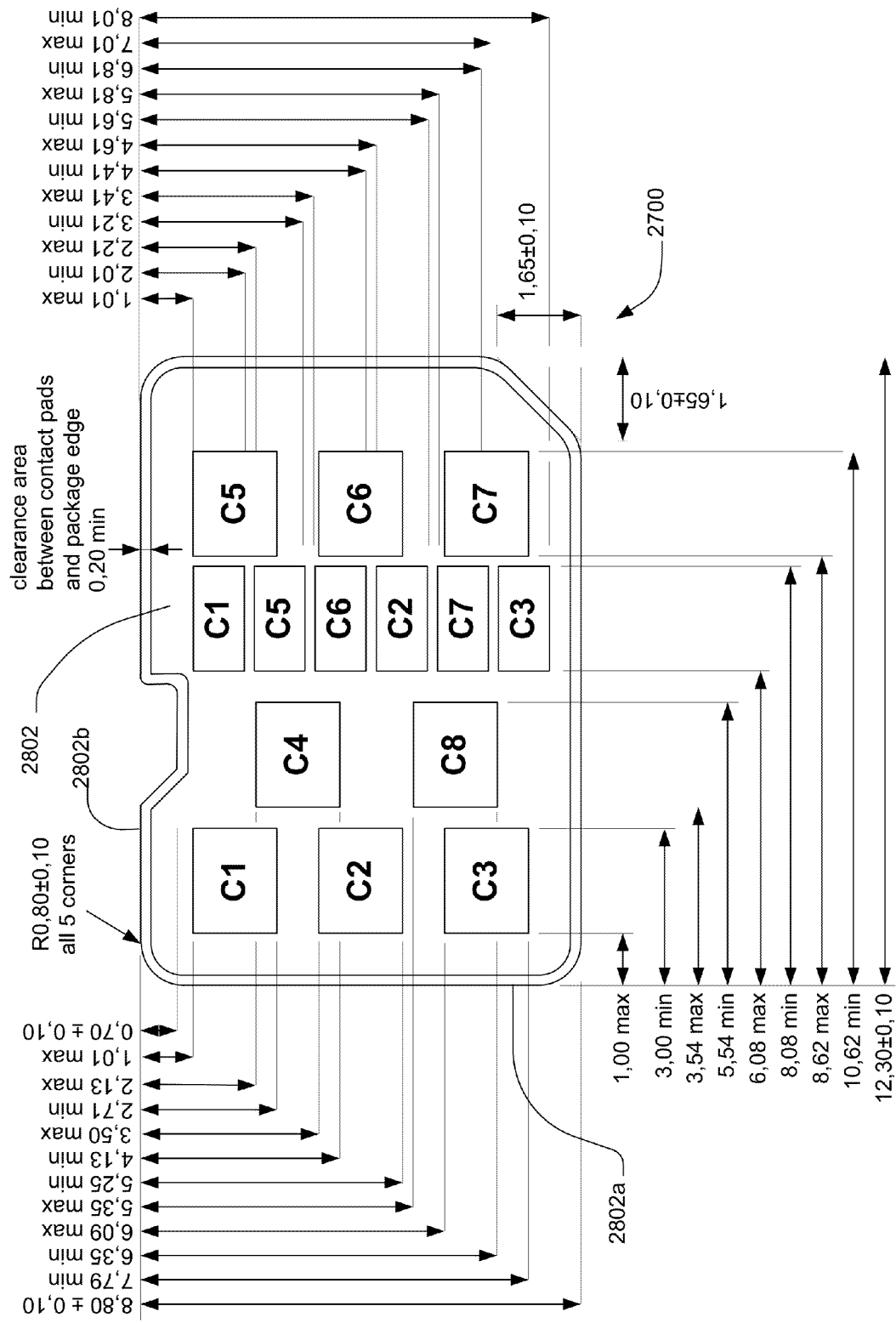
FIG. 28 illustrates example dimensional values of the example UICC of FIG. 27.

FIG. 28 illustrates example dimensional values that may be used to define a dimensional envelope of the example UICC 2700 of FIG. 27. Additionally, FIG. 28 illustrates the positioning of the electrical contacts 2710-2736 in reference to peripheral or perimeter edges 2802a and 2802b defined by a body 2802 of the UICC 2700. The example dimensional values of the illustrated example are in millimeters and each dimensional value may each have dimensional tolerance of approximately +/−0.1 millimeters.

Figure 29:
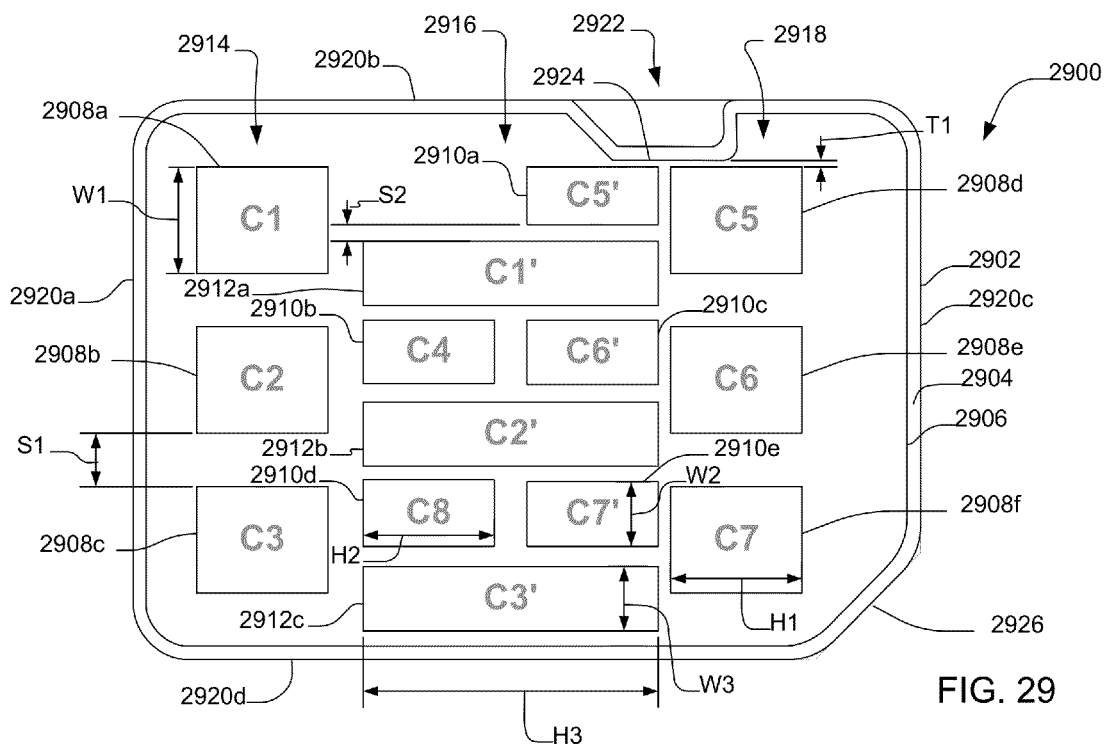
FIG. 29 illustrates another example UICC disclosed herein.

FIG. 29 illustrates another example UICC 2900 disclosed herein. The example UICC 2900 defines a body 2902 having a surface 2904 to support a contact pad 2906. The contact pad 2906 of the illustrated example includes a plurality of electrical contacts that define different electrical contact patterns to enable the UICC 2900 to communicate with a plurality of different input devices and/or card readers such as, for example, input devices 3000, 3100, 3200 and 3300 and 3400 of FIG. 30, FIG. 31, FIG. 32, FIG. 33 and FIG. 34, respectively. To define the different electrical contact patterns, the contact pad 2906 of the illustrated example includes a first plurality of electrical contacts 2908a-f, a second plurality of electrical contacts 2910a-e, and a third plurality of electrical contacts 2912a-c.

In the illustrated example, the electrical contacts 2908a-f, 2910a-e and 2912a-c are positioned in a plurality of rows 2914-2918. More specifically, the electrical contacts 2908a-c are positioned in the first row 2914, the electrical contacts 2910a-e and 2912a-c are positioned in the second row 2916, and the electrical contacts 2908d-f are arranged in the third row 2918.

In the orientation of FIG. 29, the first row 2914 of electrical contacts 2908a-c is positioned adjacent an edge 2920a of the body 2902, the third row 2918 of electrical contacts 2908d-f is positioned adjacent an edge 2920c of the body 2902, and the second row 2916 is positioned between the first and third rows 2914 and 2918. Additionally, the electrical contacts 2908-a-c and 2908d-f in the respective first and third rows 2914 and 2918 are substantially aligned relative to each other. Further, the electrical contacts 2908a, 2910a and 2908d are positioned adjacent an edge 2920b of the body 2902 and the electrical contacts 2908c, 2912c and 2908f are positioned adjacent an edge 2920d of the body 2902.

The electrical contacts 2912a, 2912c and 2912e of the second row 2916 are substantially aligned relative to each other and are positioned adjacent the third row 2918. The electrical contacts 2910b and 2910d of the second row 2916 are substantially aligned relative to each other and are positioned adjacent the first row 2914. The electrical contact 2912b is positioned between both the electrical contacts 2910b and 2910c and the electrical contacts 2910d and 2910e. The electrical contact 2912c is positioned between the edge 2920d and the electrical contacts 2910d and 2910e, and the electrical contact 2912a is positioned between the electrical contact 2910a and the electrical contacts 2910b and 2910c. In some examples, the electrical contact 2910a may be elongated (e.g., a dimensional profile) similar to the electrical contacts 2912a-c. Although not shown, in other examples, another electrical contact may be positioned between the electrical contact 2910a and the electrical contact 2908a.

The electrical contacts 2908a-c in the first and third rows 2914 and 2918 each have a dimensional profile or envelope that is different than a dimensional profile or envelope of the electrical contacts 2910a-e and 2912a-c positioned in the second row 2916. Further, each of the electrical contacts 2910a-e in the second row 2916 has a dimensional profile or envelope that is different than a dimensional profile or envelope of the electrical contacts 2912a-c. For example, each of the electrical contacts 2912a-c is elongated relative to the electrical contacts 2910a-e. In some examples, the height of each of the electrical contacts 2910a-e is half the height of each of the electrical contacts 2912a-c. In this manner, the electrical contacts 2910b and 2910c are positioned between electrical contacts 2912a and 2912b and the electrical contacts 2910d and 2910e are positioned between electrical contacts 2912b and 2912c. As a result, the electrical contacts 2912a-c span across a height in the third row that is greater than a height of the electrical contacts 2910a-e to enable the electrical contacts 2912a-c to be positioned adjacent two or more electrical contacts 2910a-e. In other words, the electrical contacts 2910a-e span only across a portion of the third row 2916 so that two or more electrical contacts 2910a-e may be positioned adjacent (e.g., immediately adjacent) to the electrical contacts 2912a-c (e.g., the electrical contacts 2910a-e can be positioned in pairs relative to the electrical contacts 2910a-c).

For example, each of the electrical contacts 2908a-f has a width W1 and a height H1, each of the electrical contacts 2910a-e has a width W2 and a height H2, and each of the electrical contacts 2912a-c has a width W3 and H3. For example, the width W1 may be approximately between 1.5 and 2.5 millimeters and the heights H1 and H2 may be approximately between 1.8 and 2.8 millimeters. The widths W2 and W3 may be approximately between 0.6 and 0.9 millimeters and the Height H3 may be approximately between 3.5 and 5.0 millimeters. Thus, in some examples, the height H1 may be substantially equal to the Height H2 and the width W2 may be substantially equal to the width W3. Further, the electrical contacts 2910a-e and 2912a-c in the third row 2916 may be spaced-apart by a distance S1 of approximately between 0.1 and 0.3 millimeters and the electrical contacts 2908a-f in the respective first and third rows 2914 and 2918 may be spaced-apart by a distance S2.

In the illustrated example, the electrical contacts 2908a-f may be defined by electrical contacts C1, C2, C3, C5, C6 and C7, respectively. The electrical contacts 2908a-e may be defined by electrical contacts C5', C4, C6', C2', C8 and C7', respectively. The electrical contacts 2910a-c may be defined by electrical contacts C1', C2', and C3', respectively.

For example, the first row 2914 of electrical contacts 2908a-c includes a reset contact C2 positioned between a voltage contact C1 and a clock contact C3 and the third row 2918 of electrical contacts 2908d-f includes a single-wire protocol contact C6 positioned between a ground contact C5, and an input/output contact C7. The second row 2916 includes a reset contact C2 (represented by electrical contact 2910b) positioned between the first auxiliary contact C4 and the single-wire protocol C6 and the second auxiliary contact C8 and the input/output contact C7. More specifically, the first auxiliary contact C4 is positioned (e.g., immediately) adjacent the single-wire protocol C6 and the second auxiliary contact C8 is positioned (e.g., immediately) adjacent the input/output contact C7. Stated differently, the first auxiliary contact C4 is aligned with the single-wire protocol contact C6 and the first auxiliary contact C4 is positioned adjacent the first row 2914 and the single-wire protocol contact C6 is positioned adjacent the third row 2918. Because the electrical contact 2912b is elongated relative to the electrical contacts 2910b-e, the reset contact C2 is positioned relative or adjacent to all four contacts C4, C6, C8 and C7. Similarly, the clock contact C3 in the second row 2916 is positioned adjacent the second auxiliary C8 and the input/output device C7, and the voltage contact C1 of the second row 2916 is positioned between the ground contact C5, and the first auxiliary C4 and the single-wire protocol contact C6. Because the voltage contact C1 in the second row 2916 is elongated relative to the first auxiliary contact C4 and the single-wire protocol C6, the voltage contact C1is positioned adjacent both contacts C4 and C6.

The example UICC 2900 of the illustrated example also employs a retention feature or locking feature 2922 (e.g., a notch). The retention feature 2922 of the illustrated example is formed or positioned adjacent the edge 2920b and between the edges 2920a and 2920c. Additionally, the retention feature 2922 is positioned closer to a leading edge or the edge 2920c than to the edge 2920a. Positioning the retention feature closer to a leading edge (e.g., the edge 2920c) enables use of a smaller profile input or card reader. Additionally or alternatively, positioning the retention feature 2922 away from a mid-point or center point of the edge 2920b reduces or prevents interference with a chip cavity of the body 2902. Further the retention feature 2922 is positioned adjacent the electrical contacts 2910a and 2908d. More specifically, a recessed edge 2924 of the retention feature is spaced-apart from the electrical contacts 2910a and 2908d by a clearance T1. For example, the clearance T1 is approximately between 0.1 and 0.3 millimeters. In the illustrated example, the body 2902 may also include a chamfered or tapered edge 2926 to facilitate orientation of the UICC 2900 relative to an input device.

Figure 30:
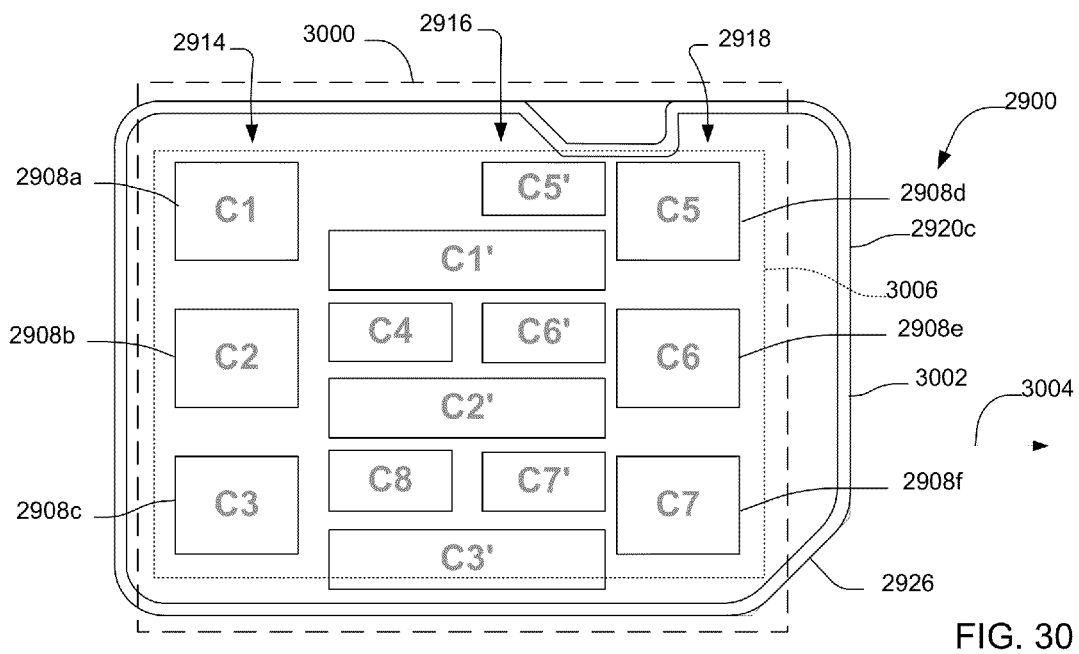
FIG. 30 illustrates the example UICC of FIG. 29 relative to an input device.

FIG. 30 illustrates the example UICC 2900 of FIG. 29 relative to a first input device or card reader 3000. In particular, the UICC 2900 shown in FIG. 29 may be inserted in an opening or cavity of the input device 3000 with a leading edge 3002 (e.g., the edge 2920c) of the body 2902 oriented in a direction represented by arrow 3004. Further, the chamfer 2926 may provide a guide or orientation marker to facilitate determination of the proper orientation when inserting the UICC 2900 in the first input device 3000.

More specifically, the first input device 3000 is adapted to communicate or read the UICC 2900 based on a first electrical contact pattern 3006 of the UICC 2900. For example, the first input device 3000 may be a legacy input device configured to communicate with a conforming electrical contact pattern (e.g., the electrical contact pattern 3006) provided by the UICC 2900.

The first electrical contact pattern 3006 of the illustrated example is defined by the electrical contacts 2908a-d and 2908f. In some examples, the first electrical contact pattern 3006 may include electrical contact 2908e, 2910b and/or 2910d. For example, the first input device 3000 may be configured to communicate or engage the electrical contacts 2908a-d and 2908f of the first pattern 3006 associated with classifications contacts C1, C2, C3, C5, and C7, and may optionally be configured to communicate or engage any one of the electrical contacts 2908e, 2910b and/or 2910d associated with, for example, classification contacts C6, C4 and/or C8. In particular, in the illustrated example, the electrical contacts 2908a-d and 2908f include C1, C2, C3, C5, and C7 characteristics, respectively. Alternatively, the first input device 3000 may be configured to also read the electrical contacts 2910b and 2910d of the second row 2916 having C4 and C8 characteristics and the electrical contact 2908e of the third row 2918 having a C6 characteristic.

Figure 31:
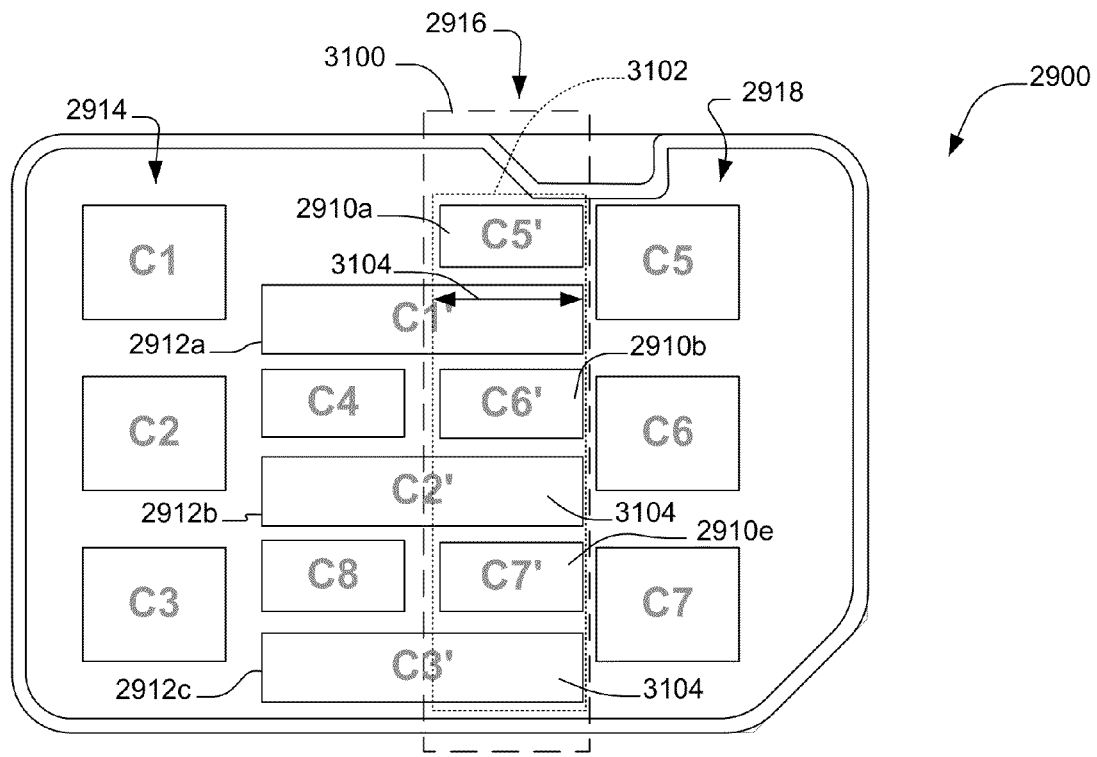
FIG. 31 illustrates the example UICC of FIG. 29 relative to another input device.

FIG. 31 illustrates the example UICC 2900 of FIG. 29 positioned relative to a second input device or card reader 3100. More specifically, the second input device 3100 is adapted to communicate or read the UICC 2900 based on a second electrical contact pattern 3102 provided by the electrical contacts in the second row 2916. In particular, the second input device 3102 may be configured to engage or communicate with the electrical contacts 2910a, 2910c and 2910e positioned in the third row 2916. Additionally, the second input device 3102 may also read at least a portion 3104 (e.g., half of the height H3) of each of the electrical contacts 2912a-c. In this manner, the portions 3104 of each of the electrical contacts 2912a-c and the electrical contacts 2910a, 2910c and 2910e provide a single-row electrical contact pattern.

As a result of the second electrical contact pattern 3102, an electronic device may employ an input device such as, for example, a single-row card reader (e.g., a header-style or block style card reader) having a significantly smaller dimensional envelope which, in turn, significantly reduces an overall dimensional footprint of the electronic device. As shown in FIGS. 30 and 31, the second electrical contact pattern 3102 provides a significantly smaller surface area (e.g., between 10% and 20% of the surface 2904 of the UICC 2900) compared to a surface area (e.g., between 80% and 90% of the surface 2904) of the first electrical contact pattern 3006. As a result, a greater amount of surface area is exposed to enable a user to grip the UICC 2900 when the user inserts or removes the UICC 2900 from the second input device 3100.

Figure 32:
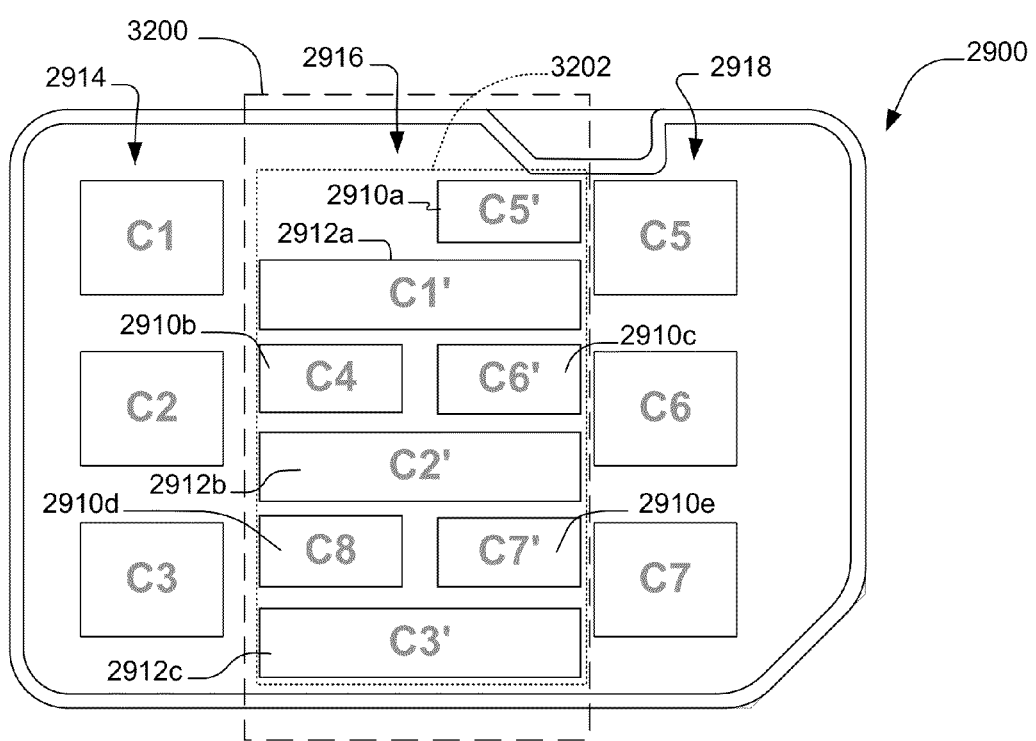
FIG. 32 illustrates the example UICC of FIG. 29 relative to yet another input device.

FIG. 32 illustrates the example UICC 2900 of FIG. 29 positioned relative to a third input device or card reader 3200. More specifically, the second input device 3200 is adapted to communicate or read the UICC 2900 based on a third electrical contact pattern 3202 provided by the electrical contacts 2910a-e and 2912a-c in the second row 2916. In this manner, compared to the second input device 3100 of FIG. 31, the third input device 3200 can read the contacts C4 and C8 in the second row 2916. Although the third input device 3200 has a larger dimensional footprint compared to the dimensional footprint of the second input device 3100, the dimensional footprint of the third input device 3200 is smaller than the dimensional footprint of the first input device 3000.

Figure 33:
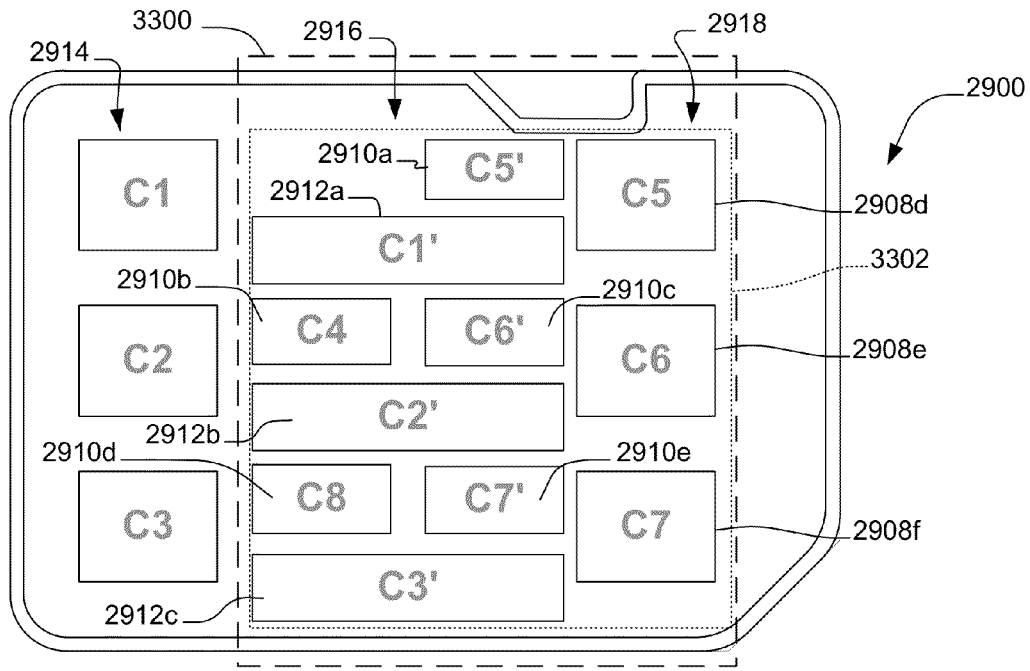
FIG. 33 illustrates the example UICC of FIG. 29 relative to yet another input device.

FIG. 33 illustrates the example UICC 2900 of FIG. 29 positioned relative to a fourth input device or card reader 3300. More specifically, the fourth input device 3300 is adapted to communicate or read the UICC 2900 based on a fourth electrical contact pattern 3302 provided by the electrical contacts 2912a-c in the second row 2916 and the electrical contacts 2908d and 2908f. Additionally, the fourth electrical contact pattern 3302 may include the electrical contact 2908e, 2910b and/or 2910d. In this manner, the fourth input device 3300 can read the contacts C6 in the third row 2918 and/or the contacts C4 and C8 in the second row 2916. In particular, the elongated electrical contacts 2912a-c enable the fourth input device 3300 to include relatively longer, low profile springs (e.g., low profile springs in the z-axis). The longer or relatively low profile springs enable a relatively thinner input devices and, thus, thinner electronic or mobile devices (e.g., provide a relatively smaller dimensional thickness value of an electronic device).

Figure 34:
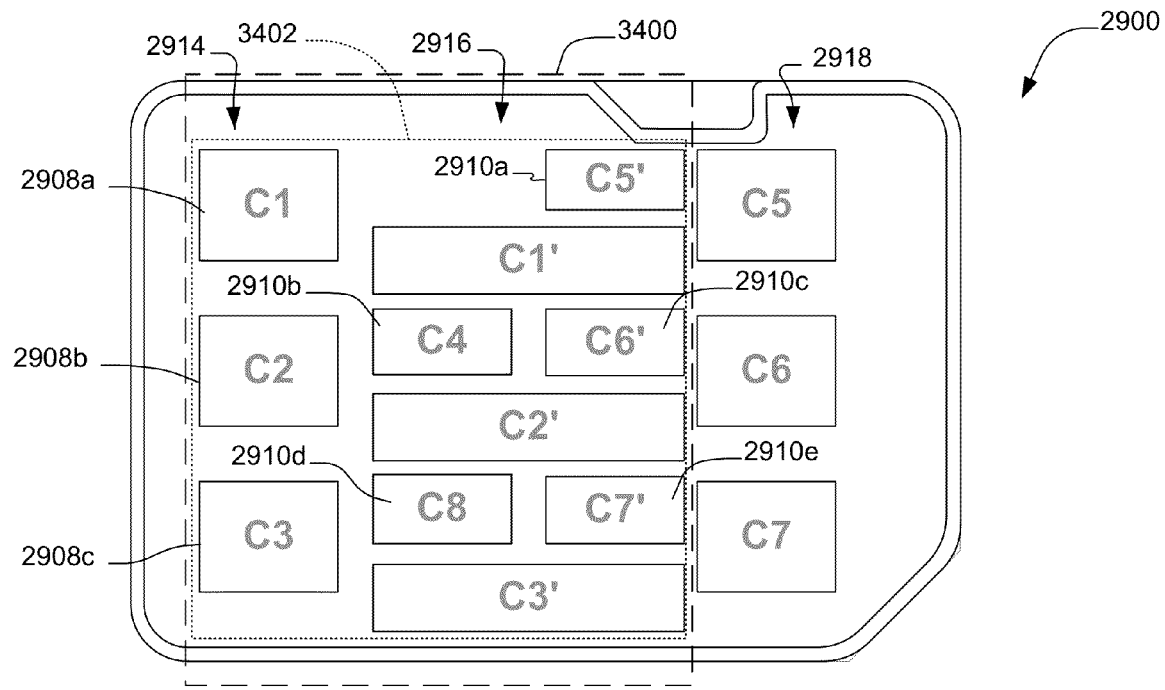
FIG. 34 illustrates the example UICC of FIG. 29 relative to yet another input device.

FIG. 34 illustrates the example UICC 2900 of FIG. 29 positioned relative to a fifth input device or card reader 3400. More specifically, the fifth input device 3400 is adapted to communicate or read the UICC 2900 based on a fifth electrical contact pattern 3402 provided by the electrical contacts 2908a-c in the first row 2914 and the electrical contacts 2910a-e in the second row 2916. The fifth electrical contact pattern 3402 has a more compact dimensional footprint compared to the first input device 3000 of FIG. 30.

Figure 35:
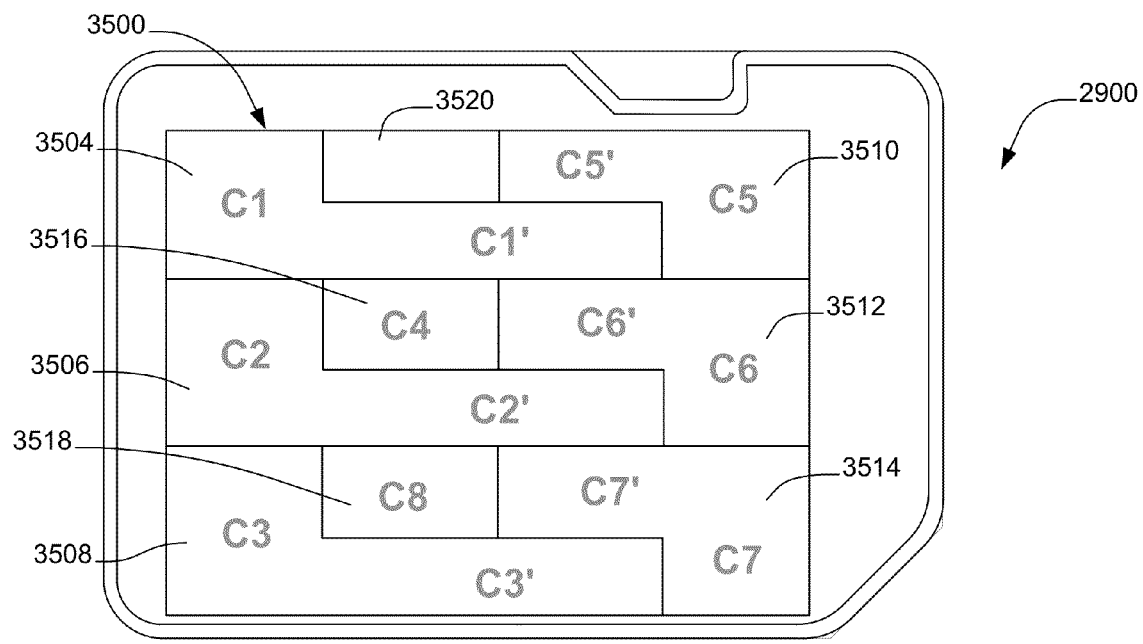
FIG. 35 illustrates an example electrical connection pattern to electrically couple common electrical contacts of the example UICC of FIG. 29.

FIG. 35 illustrates an electrical connection pattern 3502 to electrically couple the electrical contacts 2908a-f, 2910a-e and 2912a-c of the UICC 2900 of FIG. 29. Referring to FIG. 29, the electrical contacts 2908a-f, 2910a-e and 2912a-c are positioned or oriented on the UICC 2900 such that the positioning or placement of the electrical contacts 2908a-f, 2910a-e and 2912a-c enables a trace (e.g., a single large contact surface area) to electrically connect two or more electrical contacts having the common classifications. For example, although fourteen different electrical contact placements 2908a-f, 2910a-e and 2912a-c are exposed on the surface 2904 of the UICC 2900, the contact pad 2904 provides only eight electrically isolated surface areas 3504-3518 to cover the placement locations of the fourteen electrical contacts 2908a-f, 2910a-e and 2912a-c. In the illustrated example, each of the electrical contacts 2908a-f, 2910a-e and 2912a-c that are associated with common electrical contact classifications are electrically coupled via respective contact surface areas 3504-3518.

For example, the electrical contacts 2908a and 2912a associated with the C1 classification are electrically coupled by a first surface contact area 3504, the electrical contacts 2908b and 2912b associated with the C2 classification are electrically coupled by a second surface contact area 3506, the electrical contacts 2908c and 2912c associated with the C3 classification are electrically coupled by a third surface contact area 3508, the electrical contacts 2910a and 2908d associated with the C5, classification are electrically coupled by a fourth surface contact area 3510, the electrical contacts 2910c and 2908e associated with the C6 classification are electrically coupled by a fifth surface contact area 3512, and the electrical contacts 2910e and 2908f associated with the C7 classification are electrically coupled by a sixth surface contact area 3514.

As a result of the contact surface areas 3504-3518, the amount of wire bonds needed to couple the electrical contacts 2908a-f, 2910a-e and 2912a-c to an IC chip of the UICC 2900 is less than the number of electrical contact placements (e.g., fourteen) positioned on the surface of the UICC 2900. Thus, because electrical contacts having common classifications are connected via the respective contact surface areas 3504-3518, only eight wire bonds are needed to couple the IC chip and the electrical contact placements 2908a-f, 2910a-e and 2912a-c. However, because the C4 and C8 contacts (e.g., contacts 2910b and 2910d) are defined as optional in current standards, some embodiments may only require 6 wire bonds (all contacts except C4 and C8). Additionally or alternatively, because the C6 contact is also considered optional in current standards, the UICC 2900 may only require 5 wire bonds if the example UICC 2900 does not implement or support the SWP NFC capability. Additionally, because the electrical contacts C4 and C8 are defined as optional in current standards, an area (e.g., the surface areas 3516 and 3518) surrounding the C4 and C8 contacts may remain electrically isolated from the other contacts C1, C2, C3, C5, C6 and C7 if the example UICC 2900 does not implement or support the high speed USB feature. In addition, contact C6 is also defined as optional in current standards, thus, the area (e.g., the surface area 3512) surrounding the C6 contact may remain electrically isolated from the other mandatory contacts (C1, C2, C3, C5, and C7) if the example UICC 2900 does not implement or support the SWP NFC capability.

Additionally or alternatively, an area 3520 between the areas 3504 and 3510 may be configured as another electrical contact classification. For example, the area 3520 may be configured as a known classification (C1-C8) and/or may be reserved to provide another classification contact not yet determined.

Figure 36:
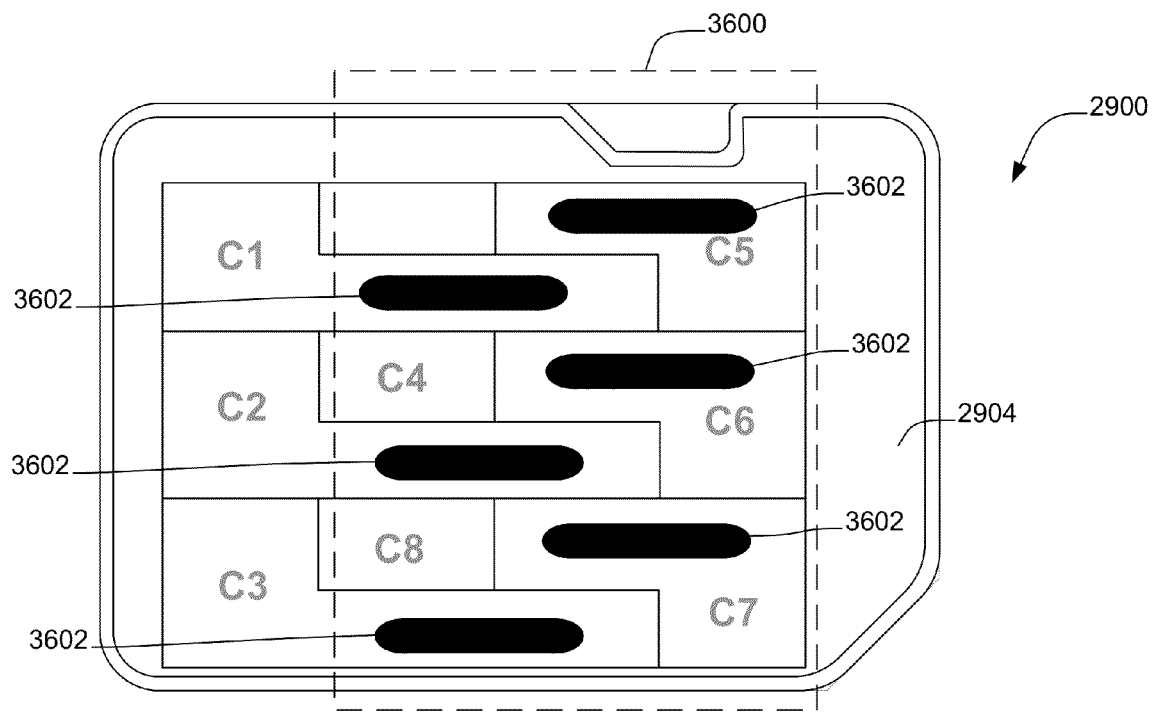
FIG. 36 illustrates example contact springs of an example input device in contact with the example UICC of FIG. 29.

FIG. 36 illustrates the example UICC 2900 of FIG. 36 engaged with contact springs 3602 (e.g., low profile contact springs) of an input device 3600. In particular, the elongated surface areas 3504-3514 enable springs to be interleaved and/or positioned in offset relation to provide low profile springs 3602. As a result, a dimensional thickness or profile of the input device 3600 may be significantly smaller (e.g., in the z-axis direction perpendicular to the surface 2904) which, in turn, provides a relatively thinner electric device such as, for example, a mobile phone.

Figure 37:
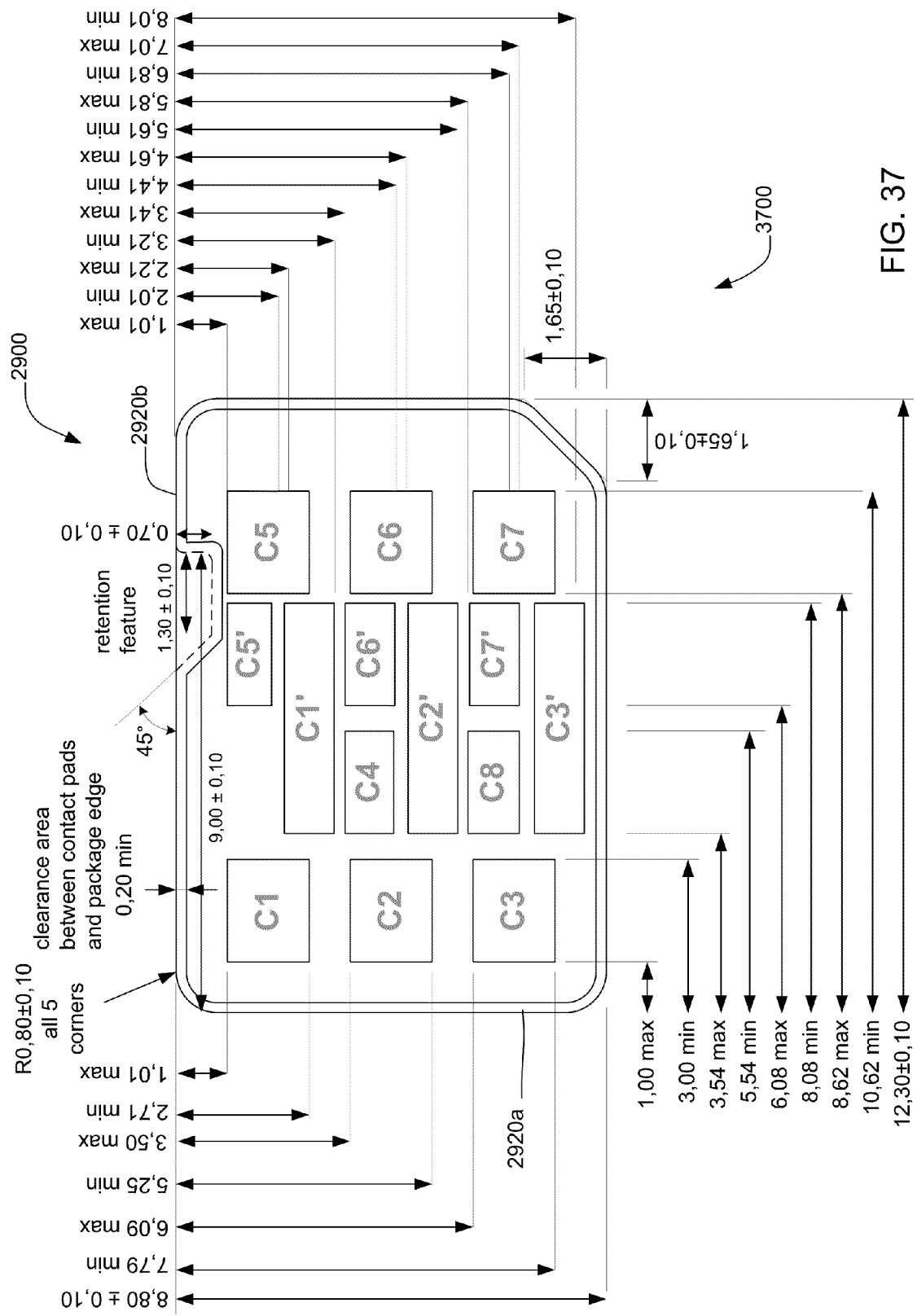
FIG. 37 illustrates example dimensional values of the example UICC of FIG. 29.

FIG. 37 illustrates example dimensional values 3700 that may be used to define a dimensional envelope of the example UICC 2900 of FIG. 29. Additionally, FIG. 37 illustrates the positioning of the electrical contacts 2908a-f, 2910a-e and 2912a-c in reference to peripheral or perimeter edges 2920a and 2920b defined by the body 2902 of the UICC 2900. The example dimensional values of the illustrated example are in millimeters and each dimensional value may each have dimensional tolerance of approximately +/−0.1 millimeters.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A UICC apparatus comprising:
a contact pad having a plurality of electrical contacts positioned or oriented to define a plurality of electrical contact patterns on a common surface, the plurality of electrical contact patterns having a first plurality of electrical contacts providing at least a first electrical contact pattern and a second plurality of electrical contacts providing at least a second electrical contact pattern, the first and second plurality of electrical contacts being positioned on the common surface such that the first electrical contact pattern includes at least one of the second plurality of electrical contacts associated with the second electrical contact pattern.

2. The UICC of claim 1, wherein none of the first plurality of electrical contacts define the second electrical contact pattern.

3. The UICC of claim 1, wherein a first electrical contact from the first plurality of electrical contacts and a second electrical contact from the second plurality of electrical contacts having common electrical contact classifications are electrically coupled by a common surface area.

4. The UICC of claim 1, wherein the UICC further comprises a retention feature positioned along an edge of a body of the UICC.

5. The UICC of claim 1, wherein the first plurality of electrical contacts are positioned on the contact pad in a first row of electrical contacts to define the first electrical contact pattern and the second plurality of electrical contacts are positioned on the contact pad in a second row of electrical contacts.

6. The UICC of claim 5, wherein the plurality of electrical contacts have a third plurality of electrical contacts positioned on the contact pad in a third row of electrical contacts to define at least a portion of the first electrical contact pattern or the second electrical contact pattern.

7. The UICC of claim 6, wherein the second row of electrical contacts is positioned between the first and third rows, the first row of electrical contacts is positioned adjacent a first edge of a body of the UICC, and the third row of electrical contacts is positioned adjacent a second edge of the body of the UICC, the first edge being opposite the second edge.

8. The UICC of claim 7, wherein at least a portion of the first row of electrical contacts and at least a portion of the third row of electrical contacts define the first electrical contact pattern.

9. The UICC of claim 8, wherein the first row of electrical contacts comprises a reset contact C2 positioned between a voltage contact C1 and a clock contact C3, and the third row of electrical contacts comprises a ground contact C5 and an input/output contact C7.

10. The UICC of claim 9, wherein the third row of electrical contacts further comprises a single-wire protocol contact C6 positioned between the ground contact C5 and the input/output contact C7, wherein the single-wire protocol contact C6 positioned in the third row of electrical contacts further defines the first electrical contact pattern.

11. The UICC of claim 8, further comprising a fourth row of electrical contacts positioned between the first and third rows of electrical contacts.

12. The UICC of claim 11, wherein at least a portion of the fourth row of electrical contacts further defines the first electrical contact pattern.

13. The UICC of claim 12, wherein the fourth row of electrical contacts comprises a first auxiliary contact C4 positioned adjacent a second auxiliary contact C8.

14. The UICC of claim 7, wherein the second row of electrical contacts defines the second electrical contact pattern.

15. The UICC of claim 14, wherein the second row of electrical contacts defines a single-row electrical contact pattern.

16. The UICC of claim 15, wherein the second row of electrical contacts defines a voltage contact C1 positioned adjacent a third edge of the body of the UICC, a ground contact C5 positioned adjacent the voltage contact C1, a reset contact C2 positioned adjacent the ground contact C5, an input/output contact C7 positioned adjacent the reset contact C2, a clock contact C3 positioned adjacent the input/output contact C7, and the input/output contact C7 is positioned adjacent a fourth edge of the body.

17. The UICC of claim 16, wherein the second row further comprises a single-wire protocol contact C6 positioned between the reset contact C2 and the input/output contact C7.

18. The UICC of claim 17, further comprising a fourth row of electrical contacts positioned between the first and third rows of electrical contacts and adjacent the second row of electrical contacts, wherein at least a portion of the fourth row of electrical contacts further defines the second electrical contact pattern.

19. The UICC of claim 1, wherein a first electrical contact from the first plurality of electrical contacts and a second electrical contact from the second plurality of electrical contacts have common electrical contact classifications or properties.

20. The UICC of claim 19, wherein the first electrical contact and the second electrical contact having the common electrical contact classification are electrically coupled via the common surface.

21. The UICC of claim 20, wherein the first electrical contact has a first dimensional profile or shape and the second electrical contact has a second dimensional profile or shape.

22. The UICC of claim 21, wherein the first dimensional profile or shape is different than the second dimensional profile or shape.

23. A UICC apparatus comprising:
   a contact pad;
   a first plurality of electrical contacts positioned on the contact pad to provide a first electrical contact pattern;
   a second plurality of electrical contacts positioned on the contact pad to provide a second electrical contact pattern, the first electrical contact pattern different than the second electrical contact pattern; and
   a third plurality of electrical contacts positioned on the contact pad to provide a third electrical contact pattern, the third electrical contact pattern being different than the first and second electrical contact patterns.

24. The UICC of claim 23, wherein the first plurality of electrical contacts includes a first row of electrical contacts, the second plurality of electrical contacts includes a second row of electrical contacts, and the third plurality of electrical contacts includes a third row of electrical contacts.

25. The UICC of claim 24, wherein at least one electrical contact in the first row of electrical contacts has a dimensional profile or shape that is different than a dimensional profile or shape of an electrical contact of the second row of electrical contacts.

26. The UICC of claim 24, wherein the second row of electrical contacts is positioned between the first and third rows of electrical contacts.

27. The UICC of claim 26, wherein the first and third rows of electrical contacts define the first electrical contact pattern and the second row of electrical contacts defines the second electrical contact pattern.

28. The UICC of claim 27, wherein the first and third rows of electrical contacts provide a grid-like pattern and the second row of electrical contacts provides a single-row configuration.

29. The UICC of claim 24, further comprising a fourth row of electrical contacts positioned between the first and third rows of electrical contacts and adjacent the second row of electrical contacts.

30. The UICC of claim 29, wherein the fourth row of electrical contacts further defines the first electrical contact pattern or the second electrical contact pattern.

31. The UICC of claim 24, wherein the first plurality of electrical contacts have a dimensional profile or shape that is different than a dimensional profile or shape of the second plurality of electrical contacts.

32. The UICC of claim 31, wherein a portion of the first plurality of electrical contacts in the second row of electrical contacts and the second plurality of electrical contacts in the second row of electrical contacts define the second electrical contact pattern, wherein the second electrical contact pattern comprises a single-row configuration.

33. The UICC of claim 31, wherein the first row of electrical contacts and the second plurality of electrical contacts in the second row of electrical contacts define a third electrical contact pattern.

34. The UICC of claim 31, wherein at least a portion of the first plurality of electrical contacts in the second row of electrical contacts and the third row of electrical contacts define a fourth electrical contact pattern.

35. The UICC of claim 23, wherein the third plurality of electrical contacts has a dimensional profile or shape that are different than the dimensional profile or shape of the first plurality of electrical contacts or the second plurality of electrical contacts.

36. The UICC of claim 23, wherein an electrical contact from the third plurality of electrical contacts is positioned adjacent to at least two electrical contacts from the second plurality of electrical contacts.

37. The UICC of claim 23, wherein a first electrical contact from the first plurality of electrical contacts and a second electrical contact from the second plurality of electrical contacts have common electrical contact classifications or properties.

38. A UICC apparatus comprising:
   a contact pad;
   a first plurality of electrical contacts positioned on the contact pad to provide a first electrical contact pattern; and
   a second plurality of electrical contacts positioned on the contact pad to provide a second electrical contact pattern, the first electrical contact pattern different than the second electrical contact pattern, and wherein a first electrical contact from the first plurality of electrical contacts and a second electrical contact from the second plurality of electrical contacts have common electrical contact classifications or properties, wherein the first electrical contact pattern provides a grid-like pattern and the second electrical contact pattern provides a single-row pattern.

* * * * *